(12) United States Patent
Ecclestone et al.

(10) Patent No.: US 12,100,153 B2
(45) Date of Patent: Sep. 24, 2024

(54) PHOTON ABSORPTION REMOTE SENSING SYSTEM FOR HISTOLOGICAL ASSESSMENT OF TISSUES

(71) Applicant: ILLUMISONICS INC., Waterloo (CA)

(72) Inventors: Benjamin Ecclestone, Waterloo (CA); James Tweel, Waterloo (CA); Michael Bishop, Waterloo (CA); Parsin Haji Reza, Waterloo (CA)

(73) Assignee: ILLUMISONICS, INC., Waterloo (CA)

(*) Notice: Subject to any disclaimer, the term of this patent is extended or adjusted under 35 U.S.C. 154(b) by 0 days.

(21) Appl. No.: 18/436,967

(22) Filed: Feb. 8, 2024

(65) Prior Publication Data
US 2024/0265530 A1 Aug. 8, 2024

Related U.S. Application Data

(60) Provisional application No. 63/483,854, filed on Feb. 8, 2023.

(51) Int. Cl.
*G06T 7/00* (2017.01)

(52) U.S. Cl.
CPC .. *G06T 7/0012* (2013.01); *G06T 2207/10024* (2013.01); *G06T 2207/10064* (2013.01); *G06T 2207/30024* (2013.01)

(58) Field of Classification Search
None
See application file for complete search history.

(56) References Cited

U.S. PATENT DOCUMENTS

| 5,070,733 A | 12/1991 | Nagata et al. |
| 5,479,259 A | 12/1995 | Nakata et al. |

(Continued)

FOREIGN PATENT DOCUMENTS

| CN | 101526483 A | 9/2009 |
| CN | 103048271 A | 4/2013 |

(Continued)

OTHER PUBLICATIONS

Perspective: Principles and specifications of photothermal imaging methodologies and their applications to non-invasive biomedical and non-destructive materials imaging Editor's Pick Pantea Tavakolian; Andreas Mandelis ; Oct. 29, 2018 (Year: 2018).*

(Continued)

*Primary Examiner* — Nancy Bitar
(74) *Attorney, Agent, or Firm* — Bookoff McAndrews, PLLC

(57) ABSTRACT

An imaging apparatus may be used for histological and/or molecular imaging of a tissue sample. An imaging apparatus may include one or more light sources that generate one or more excitation beams directed toward an excitation location being focused on the sample to generate signals in the sample and one or more interrogation beams directed toward a detection location such that a portion of the one or more interrogation beams returning from the sample is indicative of at least some of the generated signals. An imaging apparatus may include a photodetector configured to detect radiative signals from the sample. An imaging apparatus may generate an image of the sample using only pressure (photoacoustic) signals, only temperature (photothermal) signals, and/or both photoacoustic and photothermal signals from the generated signals.

26 Claims, 65 Drawing Sheets

(56) References Cited

U.S. PATENT DOCUMENTS

| | | |
|---|---|---|
| 5,615,675 A | 4/1997 | O'Donnell et al. |
| 5,991,479 A | 11/1999 | Kleinerman |
| 6,016,202 A | 1/2000 | Fuchs et al. |
| 6,078,397 A | 6/2000 | Monchalin et al. |
| 6,256,100 B1 | 7/2001 | Banet et al. |
| 6,973,830 B2 | 12/2005 | Pepper et al. |
| 6,992,829 B1 | 1/2006 | Jennings et al. |
| 7,068,842 B2 | 6/2006 | Liang et al. |
| 8,004,689 B2 | 8/2011 | Monchalin et al. |
| 8,180,134 B2 | 5/2012 | Wang |
| 8,454,512 B2 | 6/2013 | Wang et al. |
| 8,692,155 B2 | 4/2014 | Bischoff et al. |
| 9,057,778 B2 | 6/2015 | Gurton et al. |
| 9,153,931 B2 | 10/2015 | Ichihara et al. |
| 9,999,354 B2 | 6/2018 | Rousseau et al. |
| 11,122,978 B1 | 9/2021 | Haji Reza et al. |
| 11,774,354 B2 | 10/2023 | Prater et al. |
| 11,786,128 B2 | 10/2023 | Haji Reza et al. |
| 2006/0184042 A1 | 8/2006 | Wang et al. |
| 2006/0262316 A1 | 11/2006 | Baney |
| 2007/0187632 A1* | 8/2007 | Igarashi ............... A61B 5/0059 250/559.36 |
| 2008/0123083 A1 | 5/2008 | Wang et al. |
| 2008/0194929 A1 | 8/2008 | Pesach et al. |
| 2009/0170149 A1 | 7/2009 | Viator et al. |
| 2010/0068752 A1 | 3/2010 | Pande et al. |
| 2010/0268042 A1 | 10/2010 | Wang et al. |
| 2012/0061586 A1 | 3/2012 | Yao et al. |
| 2012/0200845 A1* | 8/2012 | Rousseau ............. A61B 5/0093 356/72 |
| 2012/0320368 A1 | 12/2012 | Jiao et al. |
| 2013/0281889 A1 | 10/2013 | Gertner |
| 2014/0009808 A1 | 1/2014 | Wang et al. |
| 2014/0118749 A1 | 5/2014 | Nakajima et al. |
| 2014/0185055 A1* | 7/2014 | Wang ................... A61B 5/0066 600/407 |
| 2014/0247456 A1 | 9/2014 | Horstmann et al. |
| 2015/0031990 A1 | 1/2015 | Boctor et al. |
| 2015/0077819 A1 | 3/2015 | Schnell et al. |
| 2015/0148655 A1 | 5/2015 | Haupt et al. |
| 2015/0150465 A1 | 6/2015 | Irisawa et al. |
| 2015/0153269 A1 | 6/2015 | Nakatsuka |
| 2015/0164337 A1 | 6/2015 | Kim et al. |
| 2015/0185187 A1 | 7/2015 | Wang et al. |
| 2015/0221081 A1 | 8/2015 | Chang et al. |
| 2015/0265156 A1 | 9/2015 | Tanaka |
| 2016/0011175 A1 | 1/2016 | Gostjeva et al. |
| 2016/0113507 A1* | 4/2016 | Reza .................... A61B 5/0095 356/450 |
| 2016/0156148 A1 | 6/2016 | Thomsen et al. |
| 2016/0249812 A1 | 9/2016 | Wang et al. |
| 2016/0296208 A1 | 10/2016 | Sethuraman et al. |
| 2017/0215738 A1 | 8/2017 | Haji Reza et al. |
| 2018/0275046 A1* | 9/2018 | Haji Reza ............. G01N 21/49 |
| 2019/0104944 A1 | 4/2019 | Haji Reza et al. |
| 2020/0237228 A1* | 7/2020 | Bhawalkar ........... A61N 5/0616 |
| 2020/0379227 A1 | 12/2020 | Calvin |
| 2022/0007944 A1* | 1/2022 | Wang ................. G01N 29/2418 |
| 2022/0068496 A1 | 3/2022 | Khan et al. |
| 2023/0175965 A1 | 6/2023 | Cheng et al. |
| 2024/0044777 A1 | 2/2024 | Haji Reza et al. |

FOREIGN PATENT DOCUMENTS

| | | |
|---|---|---|
| CN | 106124469 A | 11/2016 |
| CN | 108102408 A | 6/2018 |
| CN | 109363639 A | 2/2019 |
| CN | 110823809 A | 2/2020 |
| DE | 102010012809 A1 | 9/2011 |
| WO | 2013166044 A1 | 11/2013 |
| WO | 2014027316 A2 | 2/2014 |
| WO | 2014036405 A2 | 3/2014 |
| WO | 2014062529 A1 | 4/2014 |
| WO | 2014160116 A1 | 10/2014 |
| WO | 2014168930 A1 | 10/2014 |
| WO | 2019145764 A1 | 8/2019 |
| WO | 2020188386 A1 | 9/2020 |
| WO | 2021123893 A1 | 6/2021 |
| WO | 2021255695 A1 | 12/2021 |
| WO | 2022221290 A1 | 10/2022 |
| WO | 2022238956 A1 | 11/2022 |
| WO | 2023212402 A1 | 11/2023 |
| WO | 2024013663 A1 | 1/2024 |

OTHER PUBLICATIONS

Photothermal Microscopy: Imaging the Optical Absorption of Single Nanoparticles and Single Molecules Subhasis Adhikari, Patrick Spaeth, Ashish Kar, Martin Dieter Baaske, Saumyakanti Khatua*, and Michel Orrit* (Year: 2020).*

Beard, Paul. "Biomedical Photoacoustic Imaging." Interface Focus 1.4 (2011): 602-631. PMC. Web. Dec. 12, 2017.

Hongli Ni et al., "Millimeter-deep micron-resolution vibrational imaging by shortwave infrared photothermal microscopy." , 2023.

Kevan L. Bell et al., "Coherence-gated photoacoustic remote sensing microscopy", Optics Express, vol. 26, No. 18, Sep. 3, 2018, 16 pp.

Zhihua Ding et al., "Real-time phase-resolved optical coherence tomography and optical Doppler tomography", Optics Express, vol. 10, No. 5, Mar. 11, 2002, 10 pages.

Cedric Blatter et al., "Intrasweep phase-sensitive optical coherence tomography for noncontact optical photoacoustic imaging", Optics Letters, vol. 37, No. 21, Nov. 1, 2012, 4 pp.

Tavakolian et al., "Perspective: Principles and specifications of photothermal imaging methodologies and their applications to non-invasive biomedical and non-destructive materials imaging," J. Appl. Phys. 124, 160903 (2018) (13 pages).

Adhikari et al, "Photothermal Microscopy: Imaging the Optical Absorption of Single Nanoparticles and Single Molecules," ACS Nano 2020, 14 (12), 16414-16445 (32 pages).

Abbasi, S. R., "Virtual Histology with Photoacoustic Remote Sensing". MS thesis, University 1-26 of Waterloo, Sep. 1, 2020 (Sep. 1, 2020), pp. 1-86, [online] [retrieved on May 9, 2024 (May 9, 2024)]. Retrieved from the Internet: * Entire Document *.

International Search Report, PCT/IB2024/051178, mailed Jun. 25, 2024. (5 pages).

Shah, J. et al., "Photoacoustic imaging and temperature measurement for photothermal cancer therapy". Journal of Biomedical Optics, May 1, 2008 (May 1, 2008), vol. 13, Issue3, pp. 1-9, [online] [retrieved on May 9, 2024 (May 9, 2024)]. Retrieved from the Internet: * Entire Document *.

* cited by examiner

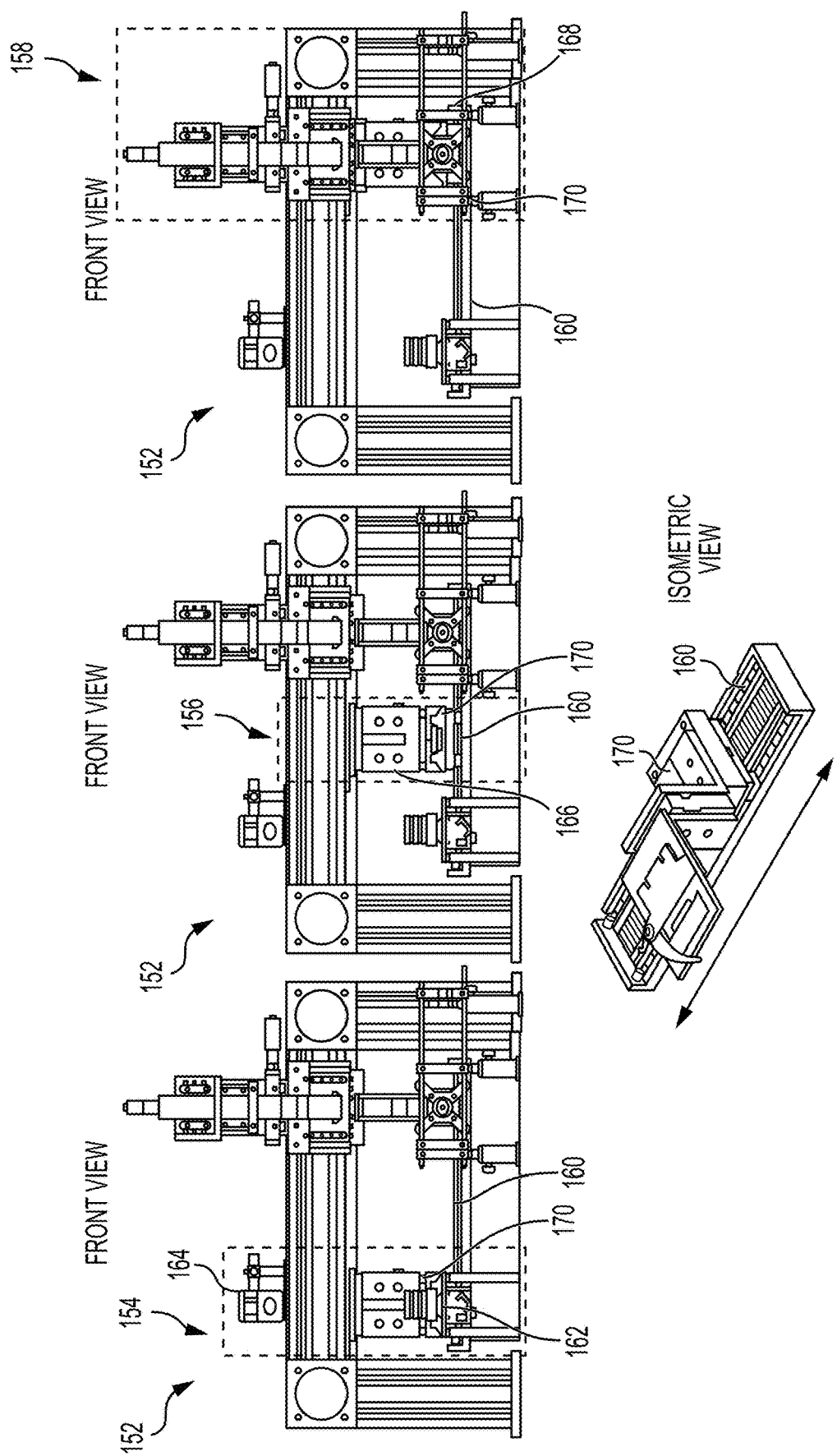

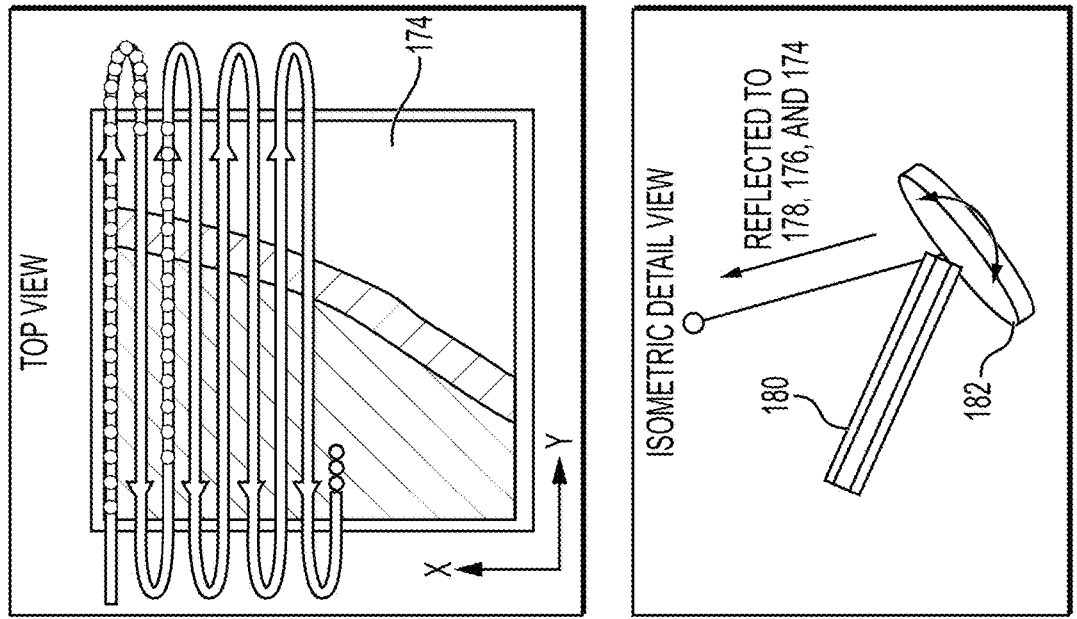
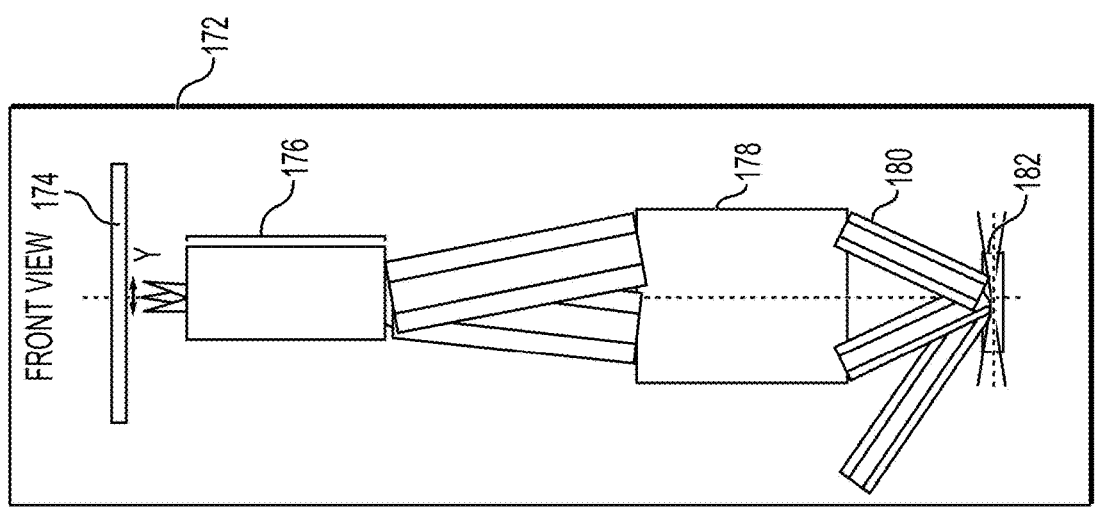
FIG. 1F

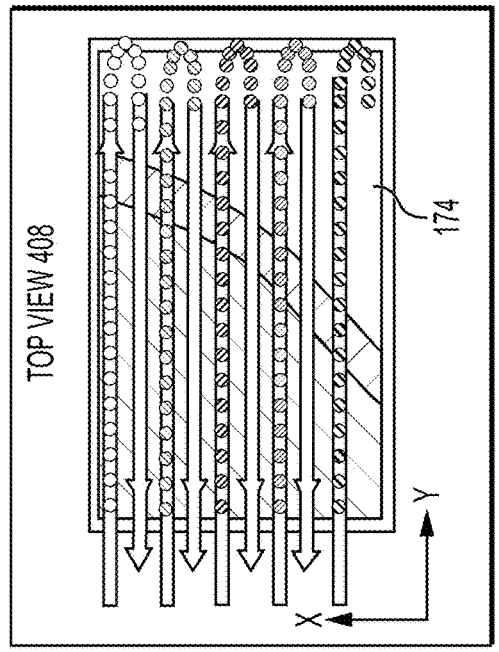
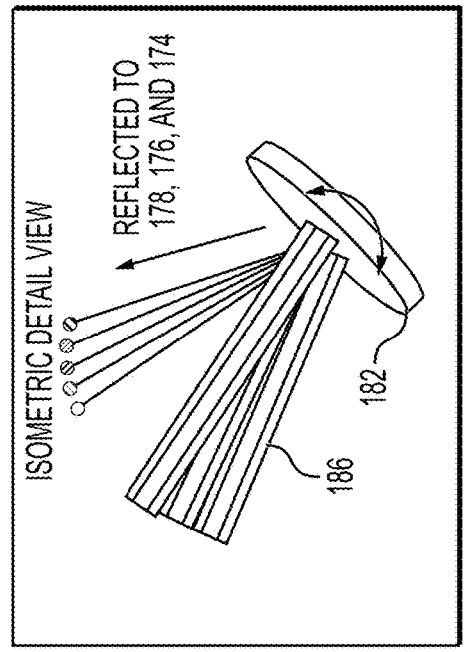
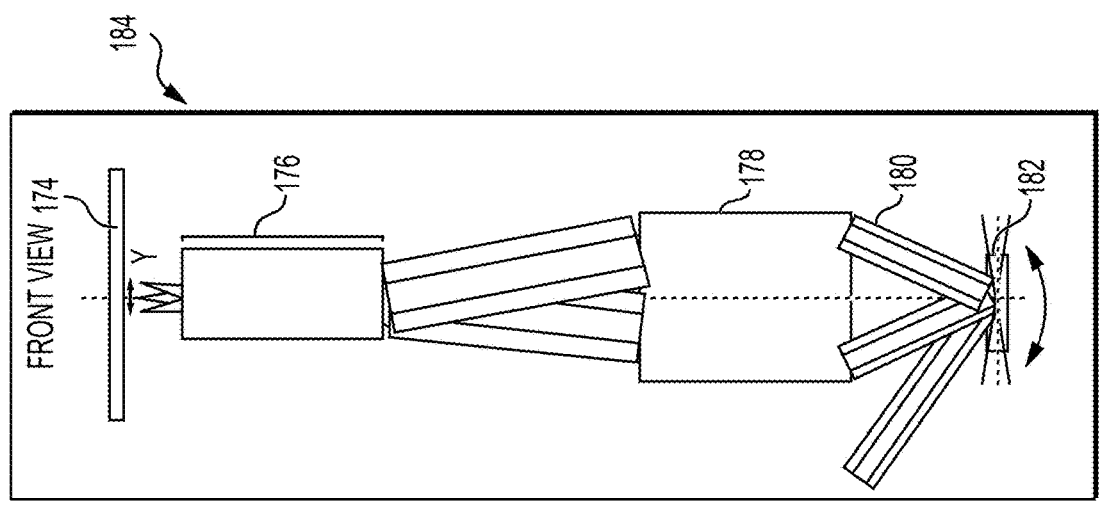
FIG. 1G

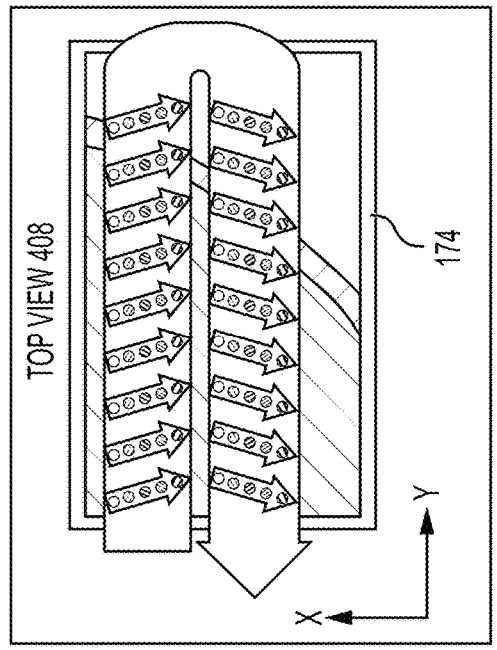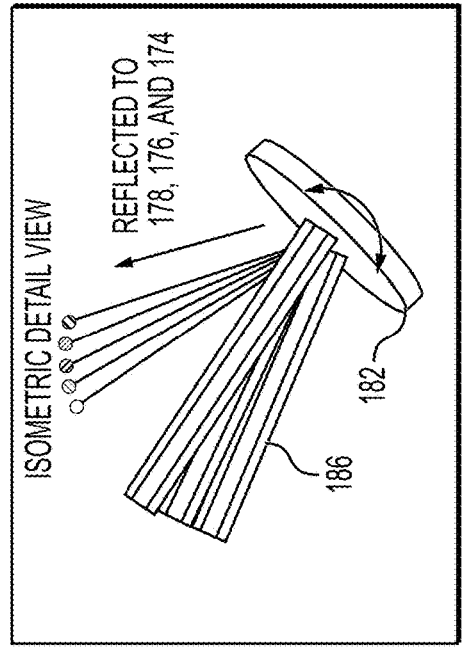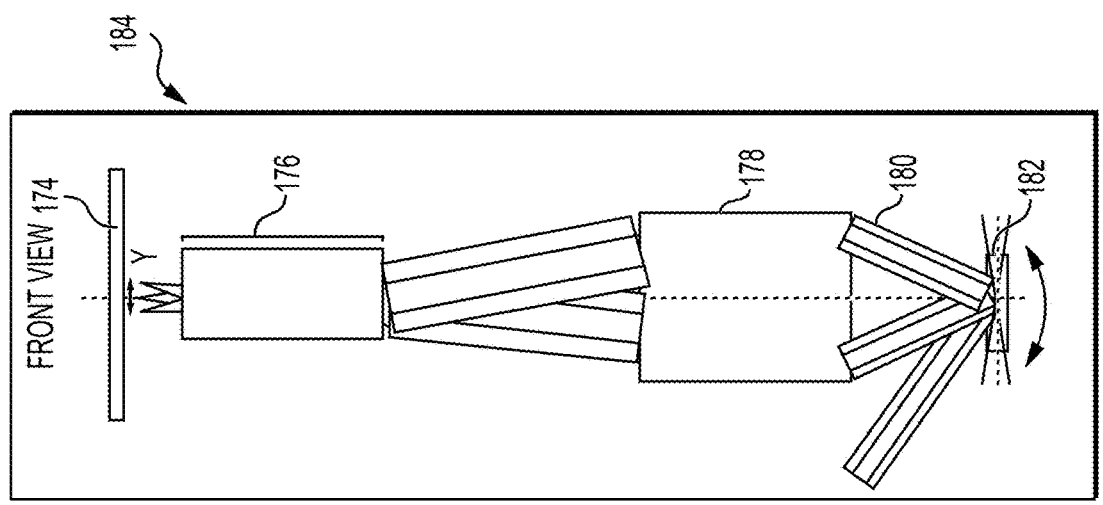
FIG. 1M

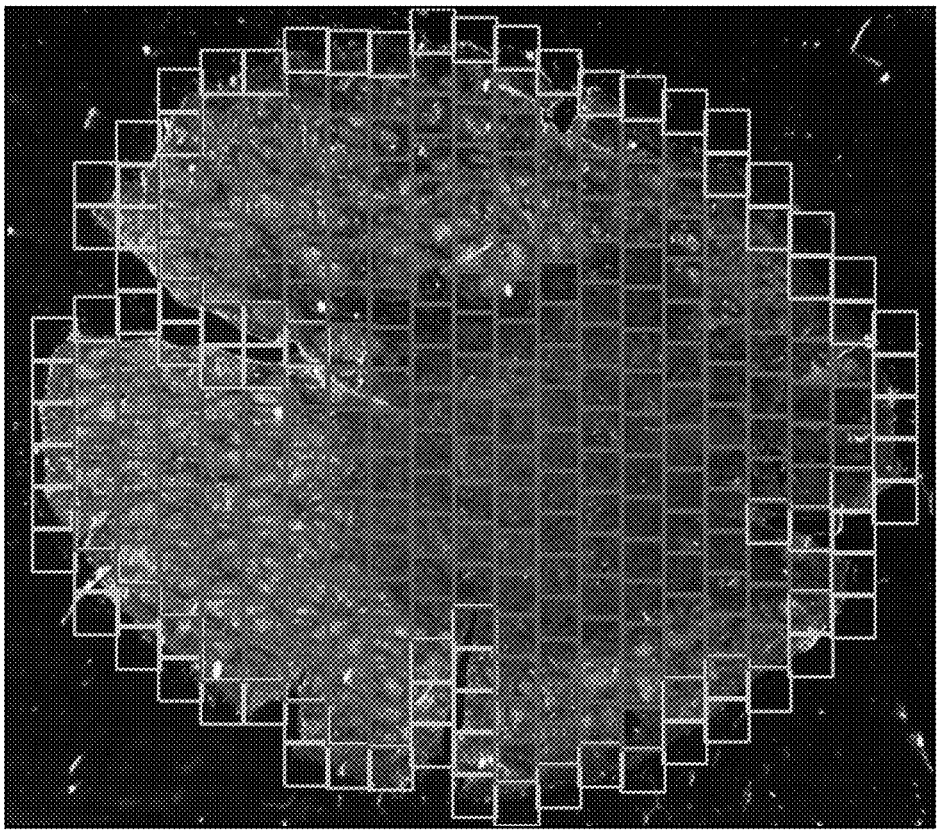
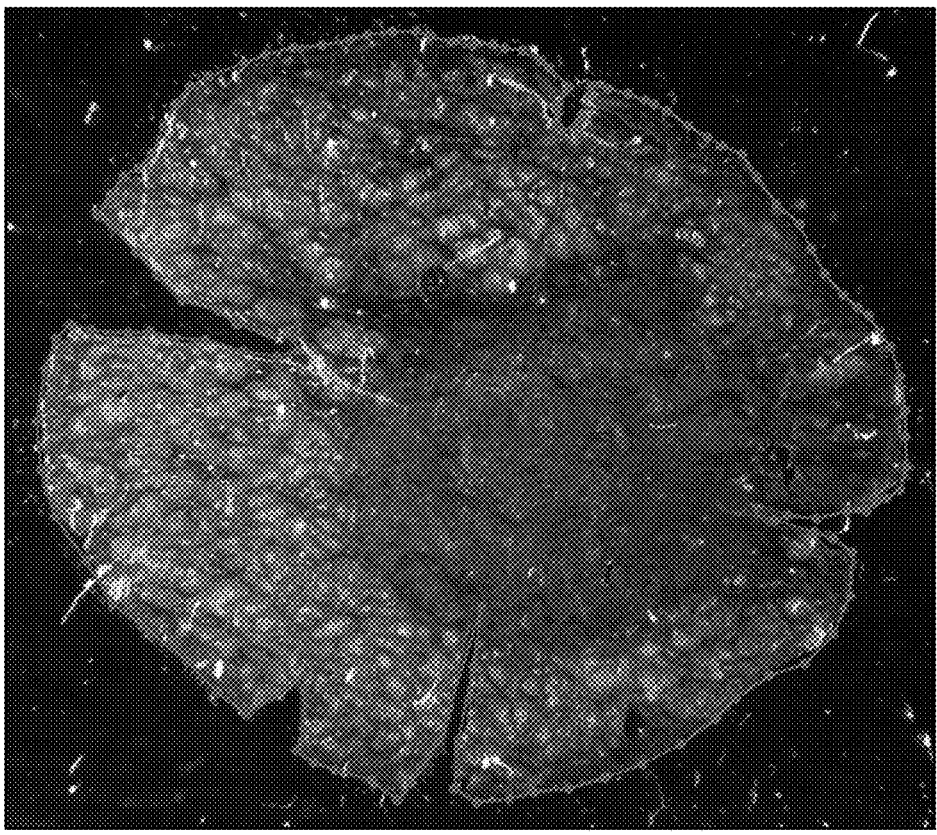
FIG. 23

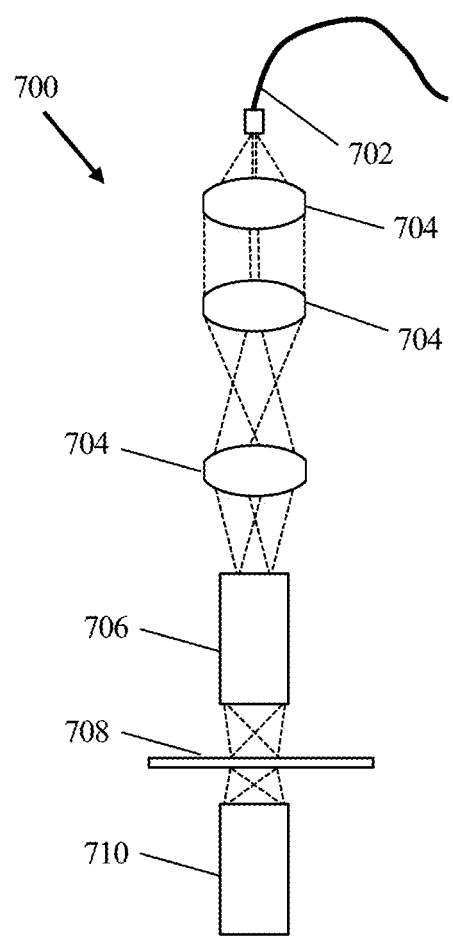 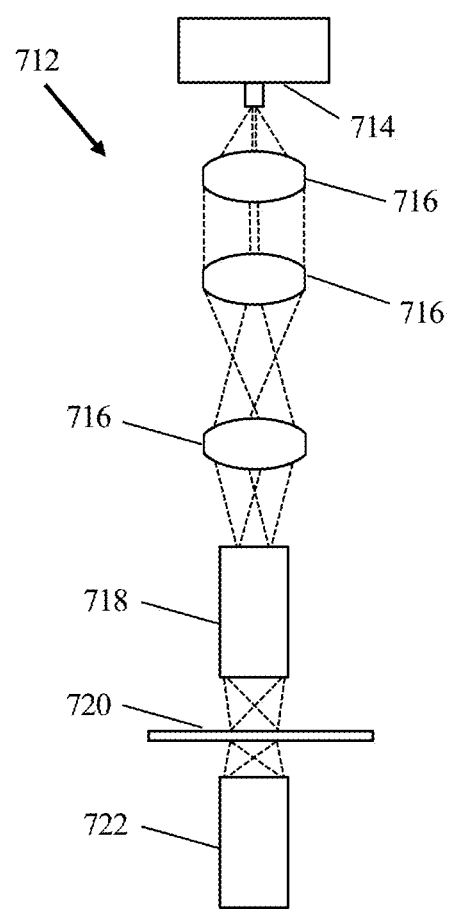
FIG. 36A  FIG. 36B

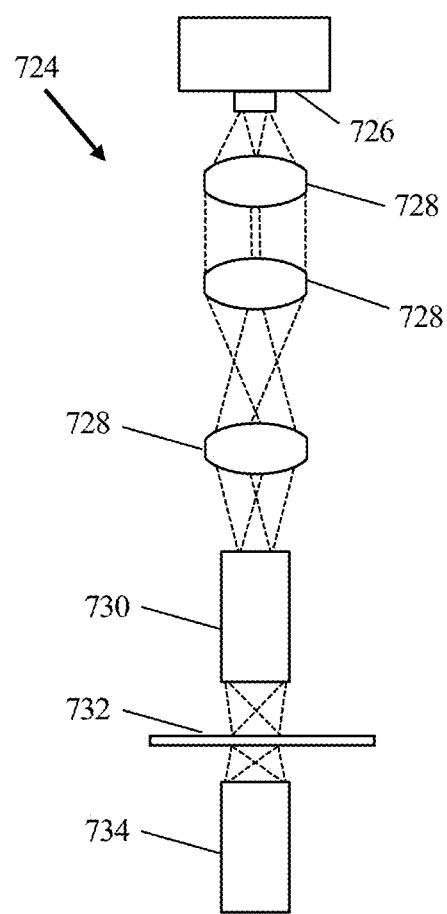
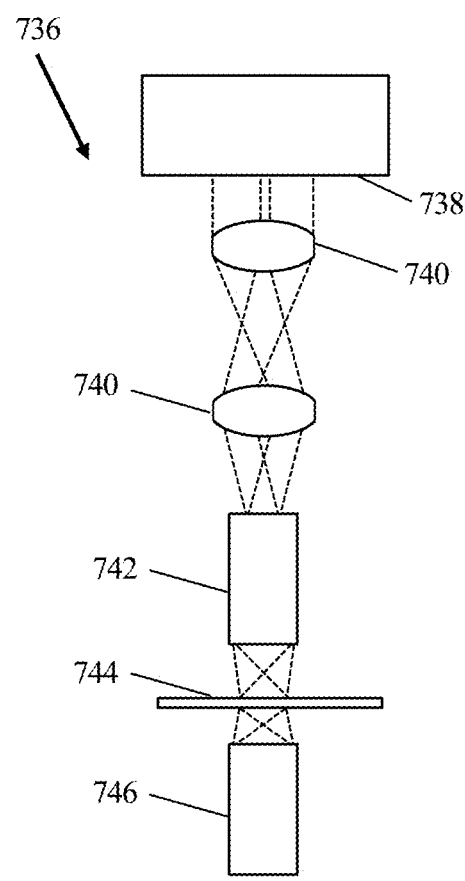
*FIG. 36C*     *FIG. 36D*

PHOTON ABSORPTION REMOTE SENSING SYSTEM FOR HISTOLOGICAL ASSESSMENT OF TISSUES

CROSS-REFERENCE TO RELATED APPLICATION(S)

This application claims the benefit of priority to U.S. Provisional Application No. 63/483,854, filed on Feb. 8, 2023, which is incorporated herein by reference in its entirety.

FIELD

The present disclosure relates to the field of optical imaging and, in particular, to a photon absorption remote sensing and method for non-contact imaging of samples such as biological tissues in vivo, ex vivo, or in vitro.

BACKGROUND

In some fields of imaging, conventional imaging technologies often require samples to be stained or colored prior to being imaged. For example, in histological imaging, the traditional histopathological workflow requires samples to be preserved, embedded, and then sectioned into thin translucent samples before imaging. This process can take days, or even weeks. Furthermore, samples prepared in this fashion can only be stained once and/or with one stain set, which causes these samples to often be suitable for only one particular purpose. However, when several assessments must be carried out, many stained samples may be required, each using one specific stained sample. This can complicate and delay the diagnostic pathway, especially in the case of small tissue specimens.

Accordingly, there is a need for an imaging technique, architecture, system, or method capable of capturing sufficient details to perform cellular and subcellular assessment of tissues, while mitigating the need for sample processing and/or staining and circumventing many of the sample collection and preparation challenges associated with traditional pathology workflows, such as in histopathology.

SUMMARY

Aspects disclosed herein may be used with and/or receive or collect signals from any of the photoabsorption or photoacoustic remote sensing systems, methods, or signals disclosed in the following U.S. patent applications, which are incorporated herein by reference: U.S. application Ser. No. 16/847,182 filed Apr. 13, 2020 (titled Photoacoustic Remote Sensing (PARS)), U.S. application Ser. No. 17/091,856 filed Nov. 6, 2020 (titled Non-Interferometric Photoacoustic Remote Sensing (NI-PARS)), U.S. application Ser. No. 16/814,538 filed Mar. 10, 2020 (now U.S. Pat. No. 11,022,540) (titled Camera-Based Photoacoustic Remote Sensing (C-PARS)), U.S. application Ser. No. 16/753,887 filed Apr. 6, 2020 (titled Coherence Gated Photoacoustic Remote Sensing (CG-PARS)), U.S. application Ser. No. 16/647,076 filed Mar. 13, 2020 (titled Single Source Photoacoustic Remote Sensing (SS-PARS)), U.S. application Ser. No. 16/629,371 filed Jan. 8, 2020 (titled Photoacoustic Remote Sensing (PARS), and Related Methods Of Use), U.S. application Ser. No. 17/394,919 filed Aug. 5, 2021 (titled PARS Imaging Methods), and U.S. provisional application No. 63/241,170 filed Sep. 7, 2021 (titled Non-Linear PARS Methods). Aspects disclosed herein may be used with any of the PARS systems described in the above-mentioned applications, such as: time-domain PARS or TD-PARS, total absorption PARS or TA-PARS, multi-pass PARS or MP-PARS, multi-photon excitation PARS or multi-photon PARS, thermally enhanced PARS or TE-PARS, temperature sensing PARS or TS-PARS, super-resolution PARS or SR-PARS, spectrally-enhanced PARS or SE-PARS, smart-detection PARS or SD-PARS, Camera-Based PARS or C-PARS, Non-Interferometric PARS or NI-PARS, Coherence Gated PARS or CG-PARS, Single Source PARS or SS-PARS, optical-resolution PARS or OR-PARS, dual-modality PARS combined with optical coherence tomography (PARS-OCT), and/or endoscopic PARS combined with optical coherence tomography (EPARS-OCT).

In some aspects, the techniques described herein relate to an imaging apparatus for histological and/or molecular imaging of a tissue sample, the apparatus including: one or more light sources, wherein the one or more light sources are configured to generate: i) one or more excitation beams configured to be directed toward an excitation location being focused on the tissue sample, to generate signals in the tissue sample; and ii) one or more interrogation beams configured to be directed toward a detection location, wherein a portion of the one or more interrogation beams returning from the tissue sample is indicative of at least some of the generated signals; a photodetector configured to detect radiative signals from the tissue sample; and one or more processors configured to: generate an image of the tissue sample using only pressure (photoacoustic) signals from the generated signals; generate an image of the tissue sample using only temperature (photothermal) signals from the generated signals; and generate an image of the tissue sample using both photoacoustic signals and photothermal signals from the generated signals.

In some aspects, the techniques described herein relate to an apparatus, wherein photoacoustic signals used to generate an image of the tissue sample are measured in the range of one picosecond to 500 milliseconds of an excitation event caused by the one or more excitation beams.

In some aspects, the techniques described herein relate to an apparatus, wherein photothermal signals used to generate an image of the tissue sample are measured in the range of one microsecond to 500 milliseconds of the excitation event caused by the one or more excitation beams.

In some aspects, the techniques described herein relate to an apparatus, wherein the one or more light sources includes a first excitation light source configured to emit light at a first wavelength, and a second excitation light source configured to emit light at a second wavelength different than the first wavelength.

In some aspects, the techniques described herein relate to an apparatus, wherein the first and second wavelengths of light are configured to target unique radiative and non-radiative absorption properties of local biomolecules in the tissue sample.

In some aspects, the techniques described herein relate to an apparatus, wherein the one or more processors are configured to generate images, based on photoacoustic and/or photothermal signals from: excitation using only the first wavelength; and excitation using only the second wavelength.

In some aspects, the techniques described herein relate to an apparatus, wherein the one or more processors is configured to generate an absorption differential image based on relative differentials of 1) the photoacoustic signals and photothermal signals from excitation using only the first wavelength, and 2) the photoacoustic signals and photothermal signals from excitation using only the second wavelength.

In some aspects, the techniques described herein relate to an apparatus, wherein the one or more processors is configured to generate a transmission and reflection attenuation map via optical scattering contrast image of the one or more interrogation or excitation beams.

In some aspects, the techniques described herein relate to an apparatus, wherein biomolecules or targets of interest appear in the optical scattering contrast image as relatively darker spots than surrounding non-absorbing media.

In some aspects, the techniques described herein relate to an apparatus, wherein the tissue sample includes one or more of freshly resected tissue specimens, preserved tissue specimens, prepared tissue specimens, extracted tissue specimens, or in vivo tissue.

In some aspects, the techniques described herein relate to an apparatus, further including a temperature control device configured to regulate the temperature of the tissue sample.

In some aspects, the techniques described herein relate to an apparatus, further including a slide for containing the tissue sample, wherein the slide includes a UV-transparent material configured to allow imaging through the slide.

In some aspects, the techniques described herein relate to an apparatus, wherein the one or more processors is further configured to: calculate an intensity of the generated signals prior to excitation; subtract the calculated intensity prior to excitation from an intensity of the generated signals after excitation to determine a remaining modulation; integrate the remaining modulation is integrated; and use the integral to estimate a total absorption level of radiative or non-radiative signals.

In some aspects, the techniques described herein relate to an apparatus, wherein the one or more processors are configured to apply de-noising or filtering prior to extracting the integral.

In some aspects, the techniques described herein relate to an apparatus, wherein the one or more processors is configured to generate an image using all of the photoacoustic signals, the photothermal signals, and the radiative signals.

In some aspects, the techniques described herein relate to an apparatus, wherein the one or more processors is configured to generate an image using a QER ratio of 1) the photoacoustic signals and the photothermal signals to 2) the radiative signals.

In some aspects, the techniques described herein relate to an apparatus, wherein the one or more processors is configured to generate a combined QER-total absorption image using: i) the QER ratio to define colors of the combined QER-total absorption image; and ii) all of the photoacoustic signals, the photothermal signals, and the radiative signals to define an intensity of the combined QER-total absorption image.

In some aspects, the techniques described herein relate to an apparatus, wherein the color provides information on a type of biomolecule in the combined QER-total absorption image, and the intensity of the combined QER-total absorption image provides information on a concentration of the biomolecule.

In some aspects, the techniques described herein relate to an apparatus, wherein the one or more processors is further configured to extracted time domain characteristics to form visualizations that differentiate different biomolecules with different colors.

In some aspects, the techniques described herein relate to an apparatus, further including a secondary imaging head, wherein the secondary imaging head is a camera-based detector configured to perform wide area, high resolution imaging at a high rate of speed.

In some aspects, the techniques described herein relate to an apparatus, wherein the one or more light sources are one or more of the following: i) a white light source; and ii) an isolated wavelength; wherein the one or more light sources are configured to provide one or more of the following: i) brightfield images; ii) measurement of light attenuation within specimens; and iii) measurement of autofluorescence within specimens.

In some aspects, the techniques described herein relate to an apparatus, wherein the one or more excitation beams and/or the one or more interrogation beams underfill an objective lens used for histological and/or molecular imaging of the tissue sample.

In some aspects, the techniques described herein relate to an apparatus, wherein the one or more excitation beams and/or the one or more interrogation beams exactly fill or overfill an objective lens used for histological and/or molecular imaging of the tissue sample.

In some aspects, the techniques described herein relate to an apparatus, the one or more processors further configured to generate an image using radiative signals detected by the photodetector, the radiative signals being autofluorescent.

In some aspects, the techniques described herein relate to an apparatus, the photodetector configured to detect non-radiative signals dominated by temperature (photothermal) signals.

In some aspects, the techniques described herein relate to an apparatus, the photodetector configured to detect non-radiative signals dominated by pressure (photoacoustic) signals.

In some aspects, the techniques described herein relate to a method for configuring a scanning system to scan a sample at different pixels spaced a determined distance from one another, the different pixels corresponding to different locations of excitation events, the method including: conducting a first scan in a region of the sample at more than one pixel; determining, from the first scan, the determined distance between each pixel, wherein the determined distance corresponds to a minimum distance that enables extracting signals from a certain pixel such that the certain pixel is entirely isolated and the sample is allowed to return to thermal equilibrium before the sample is excited again; synchronizing a vibrational frequency of a MEMS mirror and a pulse repetition frequency (PRF) of a laser source; and optically scanning a beam generated by the laser source across the sample, via the MEMS mirror, at each pixel in a subgroup, wherein the vibrational frequency synchronized with the PRF enables the beam to be pulsed onto the sample at the determined distance.

In some aspects, the techniques described herein relate to a method, the method further including: one or more additional beams generated by the laser source and/or one or more additional laser sources, wherein each beam of the one or more additional beams corresponds to a separate subgroup of pixels; and optically scanning each beam of the one or more additional beams across the sample, via the MEMS mirror, at each pixel in the corresponding subgroup, wherein the synchronized scanning frequency and the PRF enables the one or more additional beams to be pulsed onto the sample at the determined distance.

In some aspects, the techniques described herein relate to a method, wherein the beam and each beam of the one or more additional beams are distanced from one another by the determined distance.

In some aspects, the techniques described herein relate to a method for configuring a scanning system to scan a sample at different pixels spaced a determined distance from one another, the different pixels corresponding to different locations of excitation events, the method including: conducting a first scan in a region of the sample at more than one pixel; determining, from the first scan, the determined distance between each pixel, wherein the determined distance corresponds to a minimum distance that enables extracting signals from a certain pixel such that the certain pixel is entirely isolated and the sample is allowed to return to thermal equilibrium before the sample is excited again; pulsing a plurality of beams generated by one or more laser sources at a pulse repetition frequency (PRF), wherein each beam of the plurality of beams corresponds to a separate subgroup of pixels; and optically scanning the plurality of beams, via a MEMS mirror, across the sample at each pixel in the corresponding separate subgroup such that the plurality of beams are pulsed onto the sample at the determined distance.

In some aspects, the techniques described herein relate to a method, wherein the PRF is greater than a vibrational frequency of the MEMS mirror.

BRIEF DESCRIPTION OF THE DRAWINGS

In this patent document, the terms "comprises," "comprising," "including," and "having," are inclusive and therefore specify the presence of features, steps, operations, elements, and/or components, but do not preclude the presence or addition of one or more other features, steps, operations, elements, and/or components thereof. A reference to an element by the articles "a," "an," and "the" does not require that there be one and only one of the elements and may include the plural forms as well, unless the context clearly indicates otherwise. Terms "about," approximately," "substantially," and the like, when used in describing a numerical value, denote a variation of +/−10% of that value, unless specified otherwise.

The accompanying drawings, which are incorporated in and constitute a part of this specification, illustrate exemplary embodiments of the present disclosure and together with the description, serve to explain the principles of the disclosure.

FIG. 1E shows an exemplary PARS shuttle stage system.

FIG. 1F shows an exemplary single point scanning architecture, which uses single point scanning.

FIG. 1G shows an exemplary multi-point scanning architecture, which uses multi-point scanning

FIG. 1M shows an exemplary multi-point scanning architecture to achieve ultra-fast single point scanning.

FIG. 1O shows several exemplary detection sources and exemplary excitation sources to provide input beams for sequential multi-point scanning embodiments.

FIG. 23 shows two annotated PARS images, one image illustrating tissue sample border detection/selection and another image illustrating titling of a tissue sample area into smaller sub regions.

FIGS. 36A-D show different exemplary embodiments of a collection cell.

DETAILED DESCRIPTION

Figure 1A:
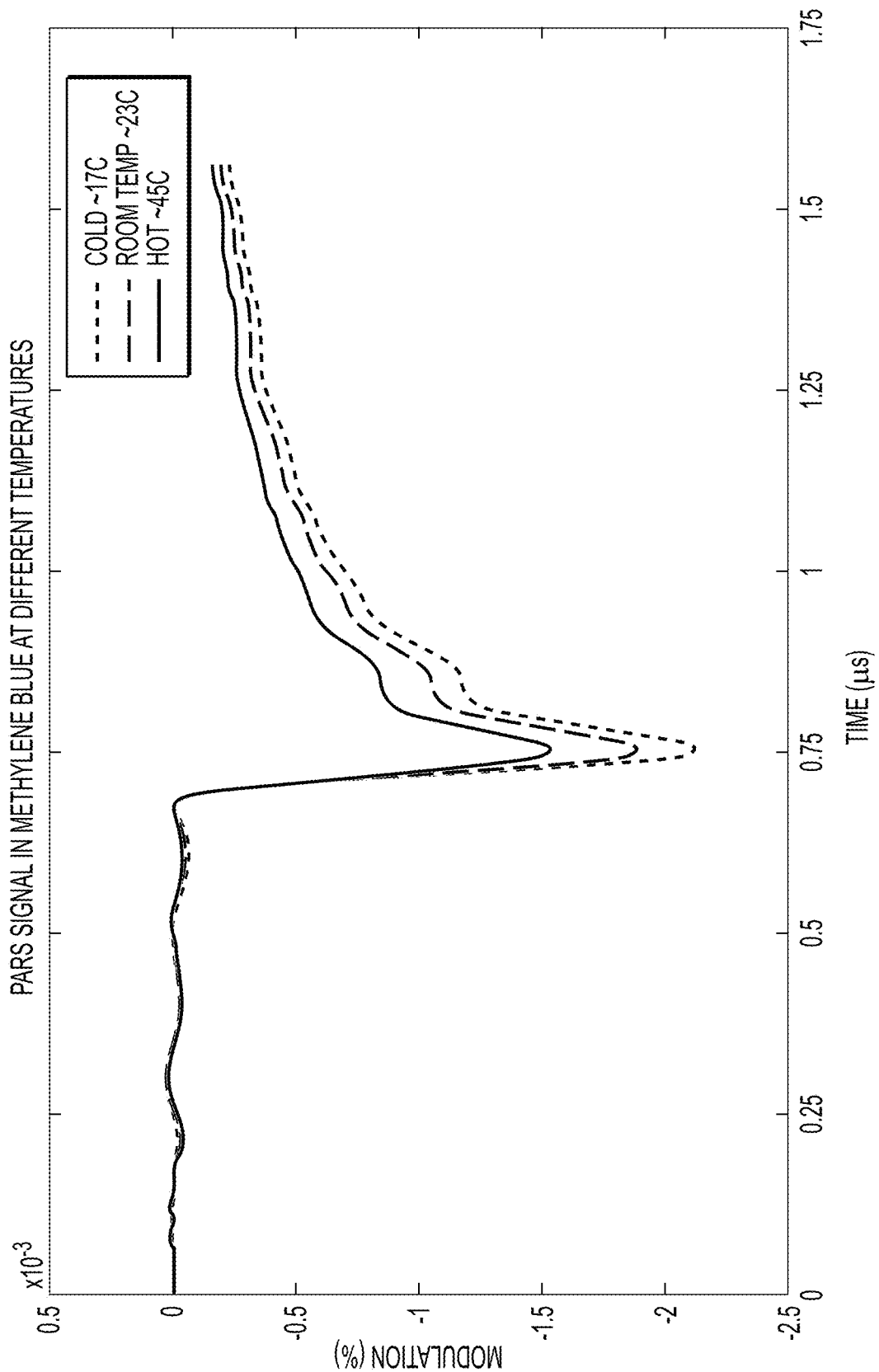
FIG. 1A shows a graph of the PARS signal in methylene blue at different temperatures.

The present disclosure generally relates to photon absorption remote sensing (PARS) and to related architectures, systems, and methods.

As will be discussed in detail below, PARS (and related architectures, systems, and methods) may capture a plurality of direct optical absorption (radiative and non-radiative) signals, indirect optical absorption signals, and optical scattering signals from a biological sample, such as a biological (e.g., cell, or tissue) specimen. An excitation event may be induced by the excitation source, then the subsequent time evolving relaxation processes may be captured. Thereafter, a plurality of signal features (e.g., amplitude, frequency content, phase modulation) may be extracted through processing at least one of the plurality of generated signals. These signal features may then be used to directly form visualizations, may be processed to form visualizations, and/or may be combined into a feature vector characteristic, which may be used in further processing. In such cases, the feature vector characteristic may be used for a wide variety of applications, such as powering AI diagnostic tools, or developing AI based colorizations.

Pars Mechanism

PARS is an all-optical, non-contact absorption microscopy technique. PARS uses excitation and detection laser sources to generate and detect optical absorption and scattering contrast in a variety of samples.

As will be further discussed below, an excitation source, such as an excitation laser, is used to deposit optical energy into a sample. When the light is absorbed by a chromophore, the energy causes the sample to enter an excited state. In some cases, such as inelastic scattering events (e.g., stimulated Raman or Brillouin scattering events), only a portion of energy of the incident photons will be captured. Depending on the quantity of energy captured from the absorbed light, the sample may enter any different energy state, for example a different vibrational, virtual, or electronic state. This absorbed energy may then be dissipated through either optical radiation (radiative) or non-radiative relaxation.

During non-radiative relaxation, absorbed optical energy is converted into heat. This heating causes modulations in the local material properties of the specimen by affecting the material density, stresses, etc. These changes in temperature and the corresponding modification of optical properties are the basis of photothermal microscopy. In certain settings, the generation of heat may also cause additional effects within the heated region. In some cases, the rapid heating and subsequent thermoelastic expansion may result in the generation of pressure. This is referred to as photoacoustic pressure, the effect which forms the basis of photoacoustic microscopy. One effect caused by the generated pressure causes corresponding modulations to the local material properties of the sample by affecting the material density, stresses etc. Moreover, generated pressures may also cause additional effects such as ultrasound absorption, which may further modulate material properties. In PARS, these localized (non-radiative) temperature and pressure modulations are observed using the detection source. The perturbations in the sample's optical and material properties may be captured as backscattered time-evolving intensity modulations in the detection laser.

During radiative relaxation, absorbed optical energy is released through the emission of photons. Generally, emitted photons exhibit a different energy level as compared to the absorbed photons. Modalities such as fluorescence microscopy, multiphoton fluorescence, or harmonic generation, rely on radiative relaxation effects for contrast. In PARS, the radiative contrast may be captured by measuring the emission of non-excitation photons from the specimen.

During inelastic scattering events, photons will exhibit a different energy level as compared to the input photons. Modalities such as spontaneous or stimulated Brillouin scattering, or spontaneous or stimulated Raman scattering, rely on these events for contrast. In PARS, the inelastic scattering contrast may be captured by measuring the photons scattered from the sample which exhibit different energies as compared to the input photons.

It will be appreciated that, in total, PARS may capture nearly all the optical properties of a chromophore simultaneously. This includes the non-radiative and radiative direct optical absorption contrast and their effects, in addition to the indirect optical absorption provided by the scattering signals of the excitation and detection beams. This may facilitate unique contrasts and visualizations. Furthermore, PARS may provide enhanced sensitivity to any range of chromophores (e.g., 100 nm to 16 µm) as compared to other independent modalities. Unlike traditional methods which capture radiative or non-radiative absorption independently, PARS contrast may not be limited by common efficiency factors such as the photothermal conversion efficiency or fluorescence quantum yield.

A detailed discussion of PARS detection mechanisms is now provided. As previously mentioned, all the optical interactions of the detection and excitation beams with the sample may be collected by PARS. This includes indirect and direct absorption effects, linear scattering, non-linear scattering, etc. These features may then be used to generate a feature vector characteristic of the biomolecules, or mixture of biomolecules located at the focus of the beams.

Generally, the optical interactions captured by the PARS can be categorized into optical scattering, both elastic and inelastic, and optical absorption contrast. The absorption effects are further classified into radiative and non-radiative events based on their relaxation processes. During non-radiative relaxation, absorbed optical energy is converted into heat. During radiative relaxation, absorbed optical energy is released through the emission of photons. In most cases, the optical interactions, and subsequent effects are not isolated. That is, most interactions, except elastic scattering events, will induce some radiative and some non-radiative relaxation properties. For example, stimulated Raman scattering, an inelastic scattering effect, may induce some non-radiative relaxation.

Regarding the absorption event, there are a number of different absorption mechanisms which may contribute in PARS. For example, both linear (e.g., single-photon) absorption interactions and non-linear (e.g., multi-photon such as two-photon or three-photon) absorption interactions may induce and/or generate PARS signals. Other effects may also be leveraged such as stimulated Raman absorption, vibrational absorption, electronic absorption and surface resonance plasmon absorption. In a single excitation event, any number of these, or other, effects may contribute to the absorption which induces and/or generates PARS radiative and non-radiative signals.

PARS may capture non-radiative contrast using one or more detection source(s). All non-radiative relaxation causes perturbations in the specimen's local physical and optical properties. These time-evolving perturbations are then captured by observing their effect on the interaction of the detection laser with the specimen.

In some cases, non-radiative relaxation processes captured by PARS may exhibit temperature-based (e.g., photothermal) effects. In these cases, the non-radiative signal may be considered dominated by photothermal signals. While the sample may generate pressure, the PARS detection mechanism may not collect the pressure signals because the detection mechanism is not fast enough. Thus, the signal collected may be primarily photothermal (e.g., dominated by temperature-based signals). For example, in instances where a non-radiative relaxation event occurs, the deposited energy will result in the generation of localized heating and subsequent thermo-elastic expansion. This is the base effect leveraged in conventional modalities such as Photothermal Microscopy, Time Domain Photothermal Microscopy, Thermal Lensing, Thermal Lens Microscopy, and Photothermal Deflection Microscopy. Localized heating causes changes in the material properties, such as the density, birefringence, refractive index, absorption coefficient, or scattering behavior.

In some cases, non-radiative relaxation processes captured by PARS may exhibit pressure-based (e.g., photoacoustic) effects. In these cases, the non-radiative signal may be considered dominated by photoacoustic signals. This is because the pressure-based signal may be much more (e.g., stronger, larger, more dominant, etc.) than the temperature-based signal. The PARS may collect a pressure-based signal that is double, triple, or even more than that of the temperature-based signal. For example, if a specimen is heated sufficiently quickly, the material is constrained from undergoing heat induced thermo-elastic expansion. The heated region then builds up pressure as it pushes against this constraint. This results in the generation of photoacoustic pressure. Generally, this initial pressure will be generated if the energy is deposited faster than the stress confinement time; the time it takes for pressure to propagate from the excited region. As such, depending on the PARS architecture (e.g., apparatus or system) and specimen/sample parameters, pressure confinement times may range on the scale of femtoseconds to microseconds.

Initial pressure generation may cause numerous effects. The dominant effects of initial pressure generation may include initial pressure optical modulations, stress, deformation/displacement, or cavitation. In cases where the dominant effect of initial pressure generation is initial pressure optical modulation, the large mega Pascal scale initial pressures generated during an excitation event may directly affect the local optical (e.g., refractive index, scattering cross section) and material properties (e.g., density, heat capacity) of the specimen. In cases where the dominant effect of initial pressure generation is stress, the generation of initial pressures may cause stress and strain field within the specimen. These may cause changes to the optical properties (e.g., polarizability, reflectivity) of the sample. In cases where the dominant effect of initial pressure generation is deformation/displacement, the pressure generation may cause deformation and displacement of scatterers, surfaces, or subsurface features of the sample, resulting in distortion and modification of the scattering profile. In cases where the dominant effect of initial pressure generation is cavitation, the generation of the large initial pressure, and subsequent negative pressure can result in cavitation. Cavitation may cause a rapid modulation in the local optical properties at the detection laser source location(s) resulting in an observable PARS signal.

The additional effects of initial pressure generation may include ultrasound absorption, resonance, secondary reflections, surface oscillations, or vibrations. In cases where the additional effect of initial pressure generation is ultrasound absorption, the initial pressures induced by the excitation event will propagate away from the excited location as ultrasound waves. These high frequency ultrasound waves will be attenuated by the surrounding sample, resulting in the generation of localized heating. In cases where the additional effect of initial pressure generation is resonance, depending on the frequency of the generated pressures, the excitation event may induce a resonant vibration within the specimen, resulting in an observable modulation. In cases where the additional effect of initial pressure generation is secondary reflections, following the initial pressure generation, the pressure wave may interact with interfaces within the specimen resulting in secondary reflections of the ultrasound wave. These secondary reflections may result in analogous effects to the primary pressure interactions after some time delay. In cases where the additional effect of initial pressure generation is surface oscillation, acoustic signals propagating to the surface of the sample can generate surface oscillation which may also induce observable changes in the PARS signal (e.g., phase modulation, intensity modulations). In cases where the additional effect of initial pressure generation is vibrations, generated pressures may also induce effects such as scatterer surfaces, or subsurface position modulation/vibration.

In some cases, non-radiative relaxation processes captured by PARS may exhibit temperature (i.e., photothermal) and pressure (i.e., photoacoustic) based effects. Many of the listed effects are not completely independent phenomena, and as a result, there may be interplay between the mechanisms and effects on material and optical properties of the specimen. The pressure and temperature induced from previous and current excitation events can produce measurable differences in current PARS excitations and PARS time domain signal excitations. This may be expressed through variations in the local material and optical properties such as density, birefringence, refractive index, absorption coefficient, scattering behavior, etc.

Concurrently, differences in the sample and scanning environment may have effects on the measured PARS signals. For example, as material properties are dependent on ambient temperature, there is a corresponding temperature dependence in the PARS signal. Another example may involve introducing mechanical stress to the sample (such as bending), which may in turn effect the material properties of the sample (e.g., density or local optical properties such as birefringence, refractive index, absorption coefficient, scattering behavior). This may perturb generated PARS signals as compared to those which would have been generated without having introduced this mechanical stress.

Conventionally, non-radiative relaxation effects are observed as backscattered, or transmitted, amplitude modulations in the detection source. These amplitude modulations may be caused by the previously described effects such as the refractive index modulation, scatterer motion, surface deformation, etc. However, there are many other aspects of the detection beam which can be used. For example, other optical characteristics which can be leveraged may include polarization, phase, or frequency.

PARS non-radiative relaxation signals may also have dependence on some aspects of the detection laser such as the wavelength, spectral linewidth, coherence length, beam size, or fluence, since the modulated signals are observed indirectly by the detection. Moreover, the observed non-radiative signals may also depend on the interaction of the detection beam with the sample. This means signals may have some dependence on properties such as sample temperature, scatterer size, sample morphology, conductivity or density. For example, some of the scattering, polarization, frequency, and phase content with a PARS signal may be attributed to the size, shape, features, and dimensions of the region which generated that signal. These details may be leveraged to recover unique information which may be used to improve final image fidelity, classifying sample regions, sizing constituent chromophores, and classifying constituent chromophores to name a few.

In some cases, the detection source intensity is directly measured using a single intensity sensor, such as a photodiode, avalanche photodiode, or photomultiplier tube. Other embodiments may use multiplexed sensors to measure the detection interaction at multiple locations simultaneously. This may include line-array sensors (e.g., linear photodiode), avalanche photodiode arrays, or 2-dimensional sensors (e.g., CMOS, CCD, or SPAD sensors). Exemplary detections sources and methods are described in U.S. Pat. No. 11,022,540 (C-PARS), which is incorporated herein by reference in its entirety.

In PARS, non-radiative absorption measurements may also be obtained simultaneously with complementary techniques. In one example, the pressure induced effects of non-radiative relaxation may be captured using traditional acoustically coupled ultrasound transducers such as piezoelectric sensors, capacitive micromachined ultrasound transducers (CMUT), or Fabry Perot sensors. Moreover, other methods such as air coupled ultrasound detectors, or optical ultrasound detectors (e.g., speckle decorrelation measurement) could also be used. In another alternative example, the thermal relaxation may be captured by visualizing the blackbody radiation emitted from the heated sample. A photodetector may be used to measure infrared radiation, determining the local heating of a specimen subsequently measuring the thermal relaxation of the excitation event.

Radiative relaxation and inelastic scattering may be captured by measuring the emission of non-excitation photons from the specimen. There are several main effects, and numerous related phenomena, that may be characterized as radiative relaxation. Some examples of effects which may be induced by the absorption of any of the optical beams include, but are not limited to, stimulated emissions at the detection wavelength, stimulated Raman scattering, spontaneous Raman scattering, coherent Anti-Stokes Raman scattering, harmonic generation microscopy (e.g., second or third harmonic), (auto)fluorescence and (auto)fluorescent lifetimes, or Brillion scattering.

Radiative and inelastic scattering effects may be captured as an aggregate measurement encapsulating all optical emissions from the specimen, or as isolated measurements specifically targeting independent radiative and inelastic scattering effects. As discussed below, effects may be separated by methods such as timing, or chromatic or polarization-based filtering. Isolated contrasts may be observed on independent photodetectors or may be time delayed and captured on a single detector.

Camera based radiative and inelastic scattering signals may be measured using a variety of photodetectors such as CMOS sensors, CCD sensors, photodiodes, avalanche photodiodes, or photomultiplier tubes. In some examples, photodetectors may be arranged as either a single sensor or as an array of sensors. Depending on the sensor array, the radiative and inelastic scattering emissions may be measured at more than one location simultaneously by using spatially multiplexed detectors. In some cases, the same radiative and inelastic scattering signals may be captured on several different or similar photodetectors to facilitate noise reduction methods leveraging measurement redundancy. In other cases, the radiative and inelastic scattering emissions may be separated chromatically, where each chromatic band is measured on an individual photodetector, or different region of a multiplexed photodetector. This may provide measurements of the intensity of radiative and inelastic scattering emissions with respect to the wavelength of emission.

In addition to the direct absorption measurements captured through the radiative and non-radiative absorption contrast, the PARS may also assess optical absorption through indirect methods. For example, the scattered intensity of the excitation and detection beams will have a dependence on the local absorption properties. Subsequently, the PARS may also capture indirect absorption contrast by using the optical scattering signals to estimate the level of absorption at a given wavelength. The wavelength range may vary greatly. In some aspects, the wavelength may be between 100 nm and 500 nm. In other aspects, the wavelength may be between 500 nm and 1 µm. In further aspects the wavelength may be between 1 µm and 10 µm. Some embodiments may have a wavelength between the range of 10 µm and 16 µm. Generally, the wavelength may be in the range from at or about 100 nm to at or about 16 µm. The indirect absorption may be measured by using any type of photodetector by measuring the transmitted or reflected intensity of light to calculate indirect optical absorption. In some embodiments this may be done using a photodiode, avalanche photodiode, or photomultiplier tube. In other cases, multiplexed detectors such as photodiode arrays (linear or two-dimensional), avalanche detector arrays (linear or two-dimensional), CCD sensors, CMOS sensors, or SPAD sensors may be used. FIGS. 2D, 2G, 2K, 2L, and 2M show exemplary architecture for camera-based systems.

In addition to the aforementioned optical absorption effects, the PARS can also capture the optical scattering contrast of each excitation and detection wavelength. In these embodiments, any number of different optical scattering features may be assessed for each wavelength. Some techniques may monitor scattering intensities across any range of angles, or the scattering distribution/profile. Additional features such as polarization, frequency, and phase content may also be assessed within each of the scattered signals. Such assessment may be performed on transmitted or reflected light, or may be assessed at any observation angle which is reasonable in a given architecture. This means the PARS may provide equivalent contrast to conventional scattering modalities such as differential interference microscopy, optical coherence tomography, and laser interference microscopy. The scattering may be measured using any type of photodetector by measuring the transmitted or reflected intensity of light. In some embodiments this may be done using a photodiode, avalanche photodiode, or photomultiplier tube. In other cases, multiplexed detectors such as photodiode arrays (linear or two-dimensional), avalanche detector arrays (linear or two-dimensional), CCD sensors, CMOS sensors, or SPAD sensors may be used. FIGS. 2D, 2G, 2K, 2L, and 2M show exemplary architecture for camera based systems.

Pars Architectures and Systems

PARS, in some embodiments, can be a point scanning microscope. That is, when forming PARS images, the measurement point is required to be moved relative to the sample. Two different methods to perform the task of moving the measurement point are discussed in the present disclosure, those methods being mechanical scanning and optical scanning.

In mechanical scanning, the optical excitation spot remains stationary while the sample is physically moved across the optical spot. In this case, collecting signals may be a more straightforward process, as all signals originate from a stationary location. A detection system may be focused on this location such that all optical signals are collected and mapped to detectors. Examples of such are shown in FIGS. 2A-M.

In optical scanning, the PARS interrogation point is scanned across the sample using an optical scanning device (e.g., micro-electro-mechanical systems ("MEMS") mirror, galvanometer mirrors, and polygon mirror). Example of optical scanning are shown in FIG. 1F-G. In these cases, collecting the PARS optical signals may not be as straightforward.

As the PARS interrogation spot moves optically across the sample, additional consideration must be taken to collect the signals from the different locations. A collection cell may be added to collect the optical signals from different locations across the sample, and redirect these signals for analysis. The collection cell may use any combination of optical components (e.g., mirrors, lenses, etc.) to collect and redirect optical signals from different physical locations to the appropriate location for measurement. Exemplary embodiments of a collection cell are shown in FIGS. 36A-D.

Figure 37:
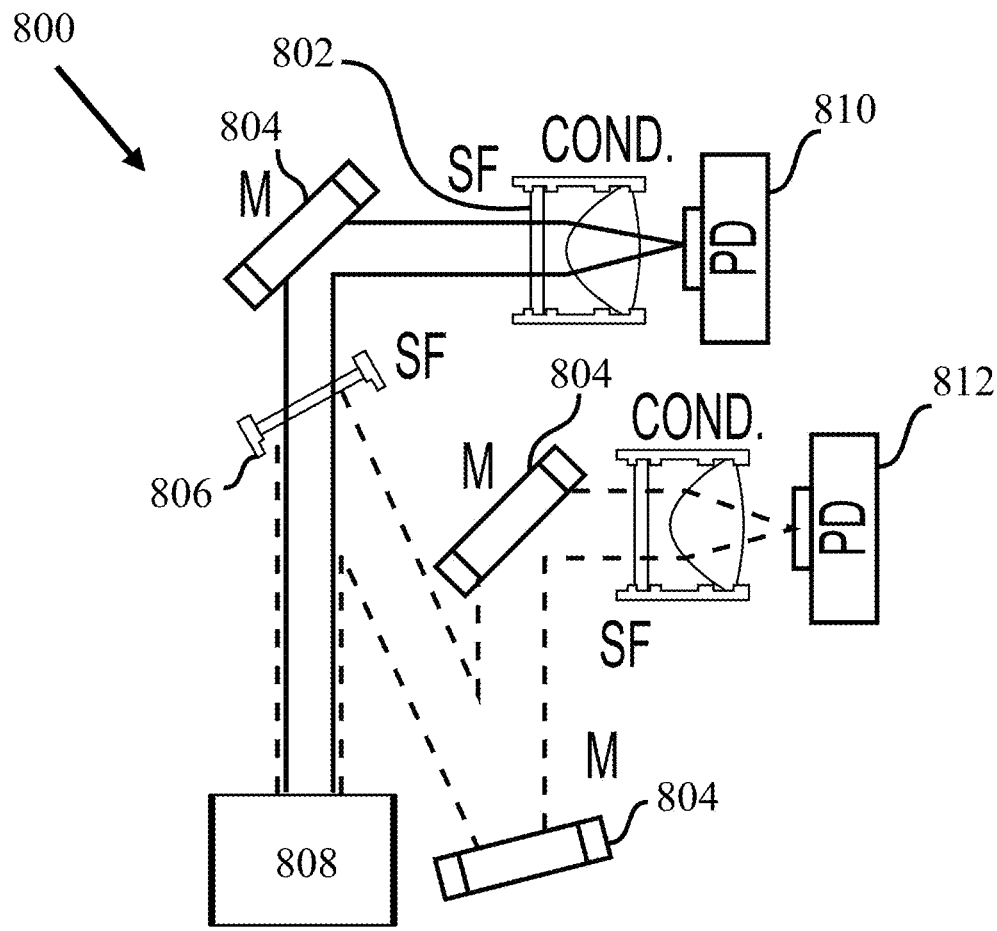
FIG. 37 shows an exemplary optical processing unit.

Collection cell 700 illustrated in FIG. 36A includes an input objective lens 710, a sample 708, a receiving objective lens 706, mirrors 704, and an optical fiber 702 (single mode or multimode). Input objective lens 710 optically scans sample 708 and directs the scans to receiving objective lens 706 to collect the optical signals. Receiving objective lens 706 then directs the signals through a series of mirrors 704. The signals are finally redirected to optical fiber 702 which can transport the light to a different location where an optical processing unit is used to split out and measure the different PARS signal components. An exemplary processing unit capable of doing so is shown in FIG. 37.

Collection cell 712 illustrated in FIG. 36B includes an input objective lens 722, a sample 720, a receiving objective lens 718, mirrors 716, and a photodetector 714. Input objective lens 722 optically scans sample 720 and directs the scans to receiving objective lens 718 to collect the optical signals. Receiving objective lens 718 then directs the signals through a series of mirrors 716. The signals are finally redirected to photodetector 714 which can directly measure the optical signals derived from the sample 720. In this case, different optical filters (e.g., wavelength filters, power filters, polarization filters, etc.) may be added to the beam path to separate different portions of the PARS optical signals for measurement.

Collection cell 724 illustrated in FIG. 36C includes an input objective lens 734, a sample 732, a receiving objective lens 730, mirrors 728, and a camera (or other multiplexed array) 726. Input objective lens 734 optically scans sample 732 and directs the scans to receiving objective lens 730 to collect the optical signals. Receiving objective lens 730 then directs the signals through a series of mirrors 728. The signals are finally redirected to camera 726 which may perform a substantially similar measurement functionality as the photodetector 714 in FIG. 36B, while providing an additional dimension of spatial resolution. Thus, camera 726 may aid in revealing where on the sample 732 the interrogation event occurred.

Collection cell 736 illustrated in FIG. 36D includes an input objective lens 746, a sample 744, a receiving objective lens 742, mirrors 740, and an optical system 738. Input objective lens 746 optically scans sample 744 and directs the scans to receiving objective lens 742 to collect the optical signals. Receiving objective lens 742 then directs the signals through a series of mirrors 740. The signals are finally redirected to optical system 738. In this case, the collection cell 736 may be designed to "pre-process" light, rendering it compatible with a plurality of optical systems such as the optical processing unit described in FIG. 37, which is used to split out and measure the different PARS signal components. Therefore, optical system 738 may be any type of optical system configured to process the optical signals.

Optical processing unit or PARS signal detection cell 800 illustrated in FIG. 37 includes spectral filters 802 and 806, one or more mirrors 804, beam input 808, photodetector 810, and photodetector 812. PARS signal detection cell 800 separates and measures the radiative and non-radiative signals intensity. Photodetector 810 may be configured to provide radiative detection while photodetector 812 may be configured to provide non-radiative detection. A collection cell (e.g., collection cell 700 or collection cell 736) may be configured to provide PARS signal detection cell 800 with beam input 808. Further, PARS signal detection cell 800 may be substantially similar to the transmission side of any one of the architectures illustrated in FIGS. 2A-D and 2H-M.

The collection cell may be more important for transmission mode PARS imaging. This is because, in reflection mode imaging, the optical beams propagate along the same path when travelling to and returning from the sample. That is, the beams pass back through the optical scanning system as they reflect from the sample. Since the beams pass back through the optical scanning system in reverse, they may perform the same function as the collection cell, effectively mapping interrogation points from across the sample back to the same location for detection.

The present disclosure also provides PARS architectures and systems for imaging of samples, and in some cases, for histological and/or molecular imaging of any form of sample. For example, the PARS architectures and systems of the present disclosure may be used for label-free histological imaging of unprocessed and/or unstained/unlabeled samples. As used herein, the terms "label-free", "unlabeled" refers to a tissue that is not stained with a stain used in histology. For example, label-free tissue is not stained with a stain such as hematoxylin, eosin, an acid dye, a basic dye, a periodic acid-Schiff reaction stain, a Masson's stain, an Alcian blue stain, a Van Gieson stain, a Reticulin stain, a Giemsa stain, a toluidine blue stain, a silver and gold stain, a chrome alum stain, a hematoxylin stain, an Isamin blue stain, an osmium stain, PAS, T-blue, Congo Red, Crystal Violet, or the like. In other examples, the samples may be free or essentially free from any staining and/or may not include any stain.

Suitable samples may include any biological specimens (liquid or solid), including any combination of histological or cytological specimens. Histological or cytological specimens may be, but are not limited to, cellular tissue specimens, freshly resected tissue specimens (i.e., tissue smears, cytological samples, endoscopic tissue biopsies, needle core biopsies, liquid tissue biopsies, gross surgical resections), preserved tissue specimens (i.e., formalin fixed tissues or cells, ethanol fixed tissues or cells, acetic acid fixed tissues or cells), prepared tissue specimens (i.e., formalin fixed paraffin embedded tissues or cells, formalin fixed paraffin embedded thin tissue sections, frozen sections), and/or extracted tissue specimens (i.e., purified protein samples, cell cultures). Thin tissue samples can be from tissue smears as thin as single cells, standard frozen sections, standard paraffin embedded slides, standard paraffin embedded tissue blocks, or as thick as bulk unprocessed freshly resected tissue of any thinness. Additionally, the penetration depth of the optical system may determine the preferred tissue thickness.

In some examples, to further facilitate imaging, the samples may be mounted on a slide. The slide may be formed of any material configured: to allow imaging there through, to allow the tissue to lay flat against the slide to reduce or prevent surface fluctuations, to allow the imaging of liquid samples and/or samples that are not completely fixed to the slide, to reduce or prevent dripping or spillage of the sample, and/or to be compatible with fresh tissue and fixed slides. For example, the material may include various types of glass, such as a UV-transparent material (e.g., quartz or UV fused silica). In certain cases, the slides may be configured to allow temperature control of the slide and/or to stabilize direct current (DC) values of the signals. In these cases, the PARS architectures and systems may include a heater or a thermoelectric cooler (TEC) (e.g., Peltier device or cooler) to control a temperature of the slide such that a DC value of the signals may be more stable, may return to a same DC value, and/or to facilitate contrast stability over time. The temperature control device is configured to regulate the temperature of the slide. FIG. 1A shows a graph of the PARS signal in methylene blue at different temperatures with modulation plotted on the y-axis and time plotted on the x-axis.

In some examples, the PARS system may be used for in vivo applications. For example, the histology samples may be replaced by any in vivo target. As such, it is contemplated in the present disclosure to use in vivo targets instead of histology samples in any of the embodiments described herein. An exemplary in vivo application may include placing a patient's hand under the microscope to perform the various functions mentioned in the present disclosure. Another exemplary in vivo application may include placing the microscope on a surgical arm and then placing the surgical arm on top of the patient; once again allowing for the various functions mention in the present disclosure to be performed.

In some examples, the PARS system may feature a secondary imaging head which uses a camera-based detector to perform wide area, high resolution imaging at a high rate of speed. This system may have multiple illumination sources, and multiple detection filter options to provide different contrasts within specimens. For example, illumination may be selected as a white light source to provide "brightfield images," as an isolated wavelength (UV to IR) to provide measurement of light attenuation within specimens, or as an isolated wavelength (UV to IR) to provide autofluorescence measurement within specimens. These images may be used to guide PARS imaging or enhance the PARS contrast. For example, when combined with methods such as automatic edge detection, these images may be leveraged to select only regions of interest for PARS scanning. Alternatively, fluorescence or attenuation measurements may be registered with the PARS images and added to the PARS data vector collected at each pixel.

When a secondary imaging head is used for margin assessment, the goal is to identify if the extracted surface is cancer free. More specifically, the goal is to conclude if the extracted surface is cancer free for margin assessment as soon as possible. In this design, the secondary imaging head shows high probability cancerous regions; the PARS imaging head can then scan in those regions to assess positive or negative regions. The secondary imagine head is capable of showing high probability cancerous regions because it can quickly give an overview of the tissue and a user can automatically (or manually) select the rim of the tissue which looks cancerous. Confirmation can be received later on with the PARS primary imaging head (or precise optical head). Additionally, the secondary imaging head can identify coarse features such as nuclear dense tumor tissue and bulk tissue deformities like necrosis or inflammation. These assessments may be done at a low resolution of about 10 to 15 times magnification. This modality is useful in samples with a large sample area, such as breast cancer margin assessment. In other applications like Mohs, where samples are smaller, it may be more efficient to scan the tissue in its entirety at the highest resolution of the PARS imaging head without the need for the secondary imaging head.

Based on the image and analysis from the secondary imaging head, an outcome may be to indicate what excitation wavelengths are to be used in particular areas of the tissue for scanning in the PARS cell in order to identify biomolecules of interest. By targeting required excitation wavelengths, time scanning in the PARS head may decrease to then focus more on the analysis required.

As will be discussed below, the PARS architectures and systems of the present disclosure may comprise at least one excitation and detection beam. There may be two or more excitation spots, and/or there may be one or more detection spots. The excitation and/or detection beam may arise from different laser sources, or the excitation and/or detection beam may be derived as portions of the same laser source, or harmonics of the same laser source. Each of the excitation and detection beams may be either a pulsed or continuous source, with pulse widths varying from femtoseconds to microseconds or even longer in some cases. It will be appreciated that the PARS architectures and systems of the present disclosure may be designed and/or optimized in view of the desired imaging result. Accordingly, the PARS architectures and systems possess several unique design features to provide substantially enhanced sensitivity in histological samples.

The PARS system may feature specific optimizations to the non-radiative detection pathway which enhance sensitivity. For example, the detection and/or excitation beams may be made to intentionally underfill the objective lens. This means the beam is smaller than the intended input beam for the optic. In this case, the PARS detection may provide a loose forwards focus, while achieving high efficiency collection of the backscattered intensity modulations. This design may make the PARS detection more sensitive to the non-radiative modulations, as compared to fully filling the objective lens. Alternatively, length of the detection pathway, e.g., the distance path between the sample and the photodetector, may be intentionally stretched or compressed. If the path length is tuned in this way, it may provide enhanced sensitivity to deviation in the backscattered non-radiative modulations, which may change the detection beam path. In certain cases, longer paths may provide more sensitivity to smaller modulations in the beam. In addition, spatial filtering such as pinholes may be added to the non-radiative detection pathway to provide enhanced sensitivity to small non-radiative modulations in the detection beam.

In other embodiments, the detection and/or excitation beams may be made to intentionally overfill the objective lens. In contrast, the beam is larger than the intended input beam for the optic. The detection and/or excitation beams may also be made to exactly fill the objective lens.

Some embodiments of the PARS systems of the present disclosure may leverage a multi-pass non-radiative detection architecture, such as the multi-pass PARS system described in International Application No. PCT/IB2022/054433, which is incorporated by reference herein.

Generally, in multi-pass detection architectures, the detection beam, which is captured returning from the sample, is redirected back to the sample. In some embodiments, the re-captured detection beam may be aligned to be confocal with the initial detection spot and the excitation spot, although it is contemplated that non-confocal embodiments are covered by this application. The result is that the detection beam repeatedly interacts with the excitation modulated spot multiple times, picking up further information from the excitation spot each time the detection beam interacts with the sample. As such, in some cases, the non-radiative PARS signals may then be expanded non-linearly. In other words, in multi-pass detection systems, the detection may be redirected to interact with the sample any number of times, resulting in a corresponding degree of non-linear expansion in the non-radiative absorption contrast.

A detailed discussion of the fast scanning "skip pixel" architecture that enables high speed PARS scanning is now provided. The signals and resulting contrast (both radiative and non-radiative channels) at each pixel in PARS architectures relate to an excitation laser event and the corresponding optical absorption from the tissue in the pixel of interest. In order to maximize image quality, it is desirable to extract PARS signals at each pixel solely based on the local optical absorption characteristics at the spot of interest (e.g., focal spot of the excitation and detection beams) without being contaminated by surrounding thermal environment. In addition to achieving high image quality, it is also desirable to image tissues quickly which can be achieved by increasing the repetition rate of the excitation laser.

For example, in an exemplary best case, each pixel is entirely isolated and the sample is allowed to completely return to thermal equilibrium before it is excited again. If the excitation events overlap spatially (e.g., occurring spatially close within the excited region) and temporally (e.g., occurring before sufficient relation time has passed), the non-radiative signal will "stack" atop the previous excitation event and provide erroneous readings. That is, the signal will be impacted by the previous excitation event it is "stacked" on and will not be a true reading from the sample. Thus, there is effectively 0% or near 0% signal overlap.

Turning to an exemplary worst case with two overlapping excitation events, 50% of the measured signal from the second measurement is actually from the first event (e.g., two modulations of amplitude one fully overlap giving a measured amplitude of two, with one coming from the first event, and one coming from the second event).

The fast pitch outlined here is the spatial separation required to ensure there is no pixel overlap. Since a portion of the PARS signals is thermal based, drastically increasing the laser excitation repetition rate can both damage the tissue as well as interfere with signal extraction of an individual pixel and its associated PARS amplitude and time domain signal decay. Due to the energy flux of the excitation laser spot, heat is propagated to neighboring tissue regions outside the pixel area of the intended target. The heat affected region is a function of tissue type, thickness, and embedding paraffin technique (e.g., paraffin type).

To ensure a "new pixel" is not thermally affected by previous excitation event, it is often required to "skip pixels" between successive excitation pulse events. Skipping pixels may be required for image quality perspective as well as protecting the sample from irreversible thermal damage. The ideal distance to separate pixels along the fast axis is referred to as the "fast pitch." In the embodiments where the fast pitch is greater than the final pitch that corresponds to the final desired resolution, the system must make multiple scans of the tissue to fill in the gaps of the fast pitch to ultimately yield the final pixel pitch, and resolution, which is nominally around 250 nm for PARS systems. The pixel pitch may range from a few (e.g., 1-4) nm to several (e.g., 3-7) microns depending on the desired resolution. Standard pathology systems may range from 25 nm pixels to 10 µm pixels. Examples of skipped pixels and the "fast pitch" axis are shown in FIG. 1B.

Figure 1B:
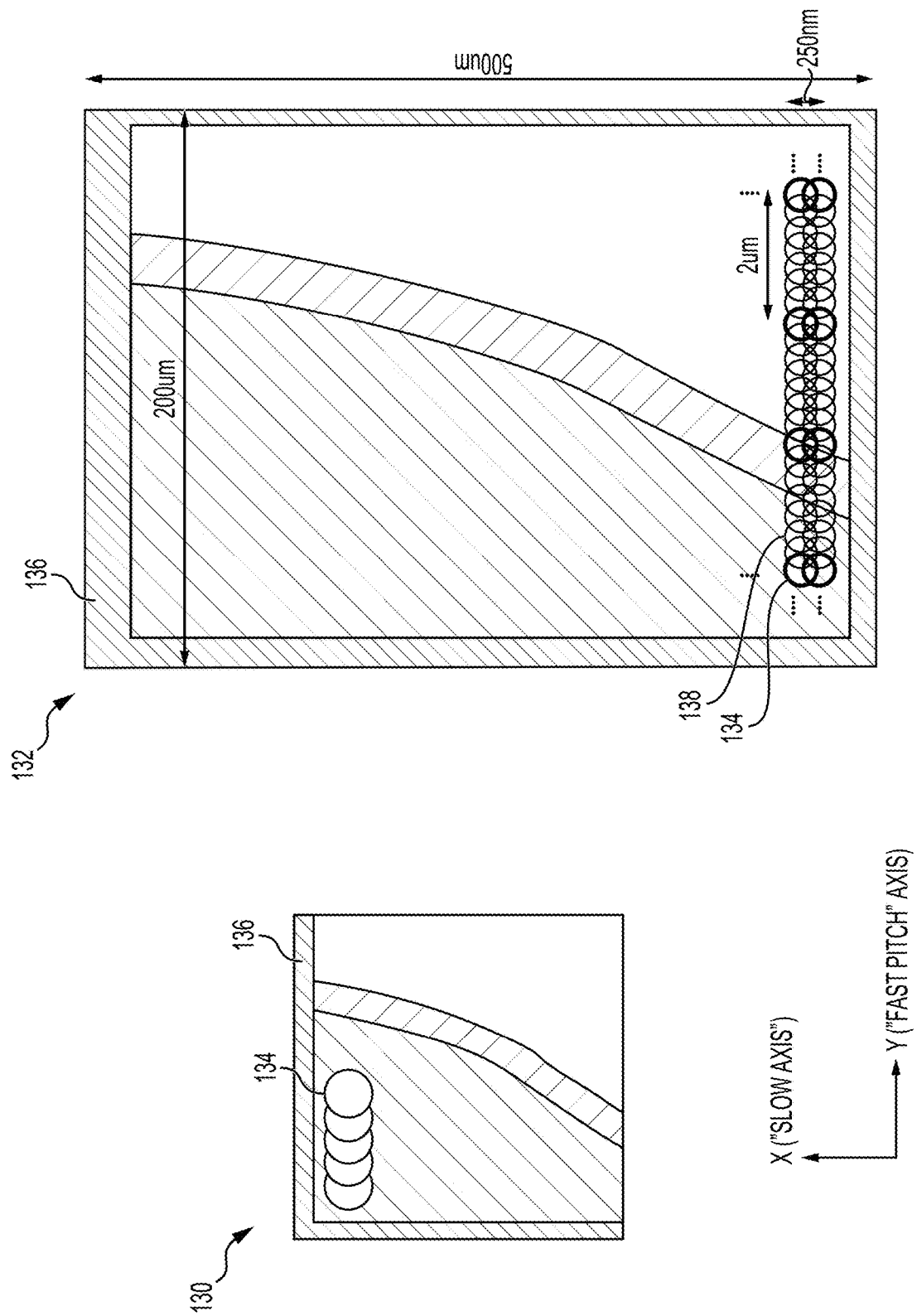
FIG. 1B shows an exemplary final pixel spacing and a skip pixel architecture.

FIG. 1B shows a final pixel spacing 130 and a skip pixel architecture 132. Final pixel spacing 130 includes sample pixels 134 on a portion of a tile 136 at the Nyquist rate with spacing equal to half the resolution. Skip pixel architecture 132 includes sample pixels 134 at isolated spacing due to skip pixels 138 between them. The space between sample pixels 134 may be the fast pitch. In this exemplary embodiment illustrated in FIG. 1B, tile 136 has a length of 500 µm in the x-axis (i.e., "slow axis") and a width of 200 µm in the y-axis (i.e., "fast pitch" axis). For this exemplary embodiment, eight sweeps would need to be conducted in the slow axis to fully populate a final resolution pitch of 250 nm, which is illustrated on tile 136 as eight sample pixels 134 with a fast pitch of 2 µm.

Figure 1C:
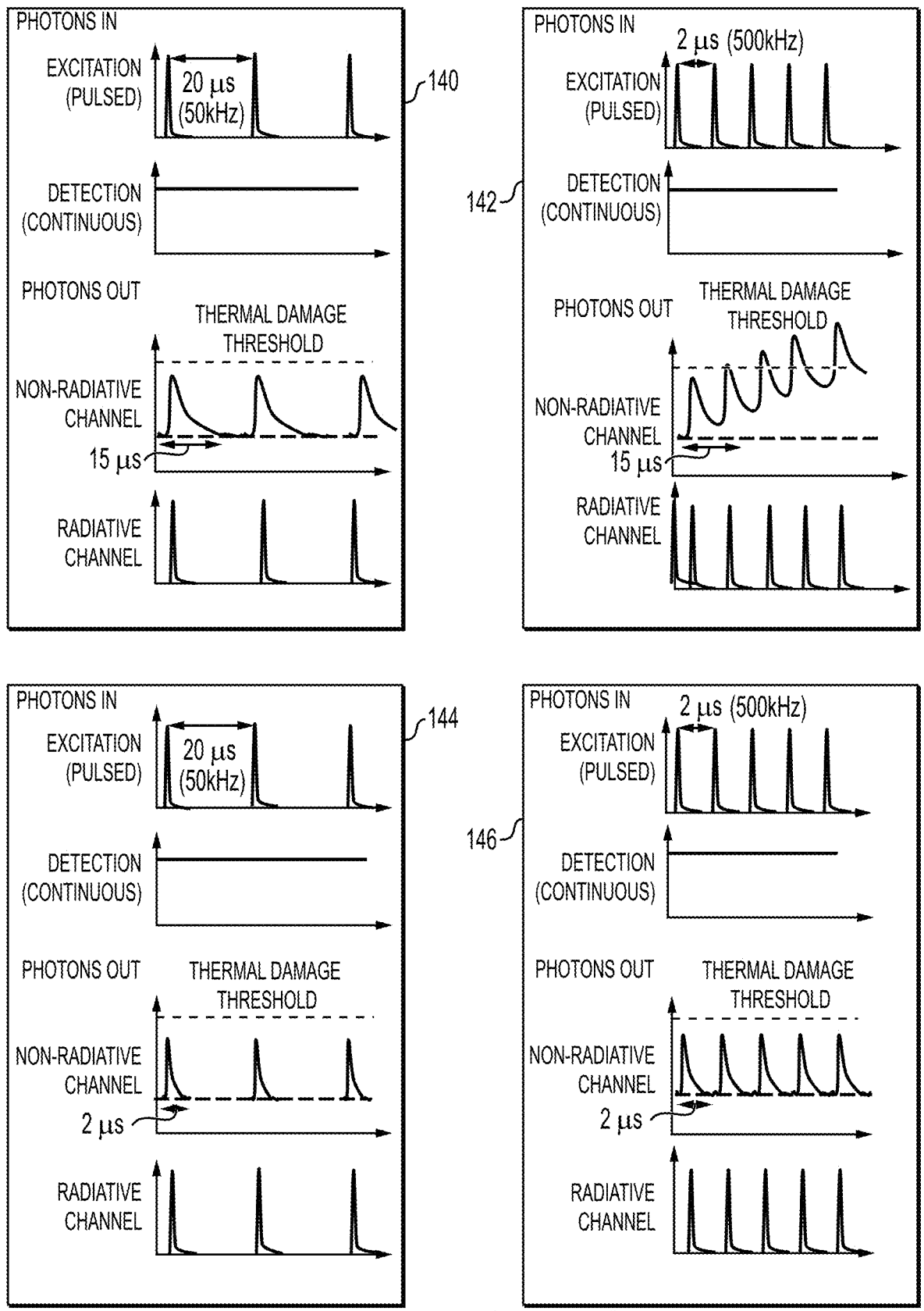
FIG. 1C shows graphs of the difference in radiative and non-radiative channels at different fast pitches and excitation pulse repetition rates.

The ideal fast pitch is the minimum distance between two pixels (n and n+1) such that the SNR and signal waveform from pixel n+1 is not influenced by the excitation event at pixel n. FIG. 1C illustrates the difference in radiative and non-radiative channels at, in section 140, fast pitches at or above the ideal pitch rate at a slow (e.g., 50 kHz) excitation pulse repetition rate or frequency ("PRR" or "PRF" respectively); in section 142, fast pitches below the ideal pitch rate at a faster (500 kHz) excitation pulse repetition rate ("PRR"); in section 144, fast pitches significantly above the ideal pitch rate at a slow (50 kHz) excitation pulse repetition rate or frequency ("PRR" or "PRF" respectively); and in section 146, fast pitches at or above the ideal pitch rate at a faster (500 kHz) excitation pulse repetition rate or frequency ("PRR" or "PRF" respectively). The ideal fast pitch is a function of the sample itself and will vary with sample mechanical properties. As such, there are different methods to determine the fast pitch. These methods may or may not be combined and may be theoretical, empirical, or a combination of theoretical and empirical.

Figure 1D:
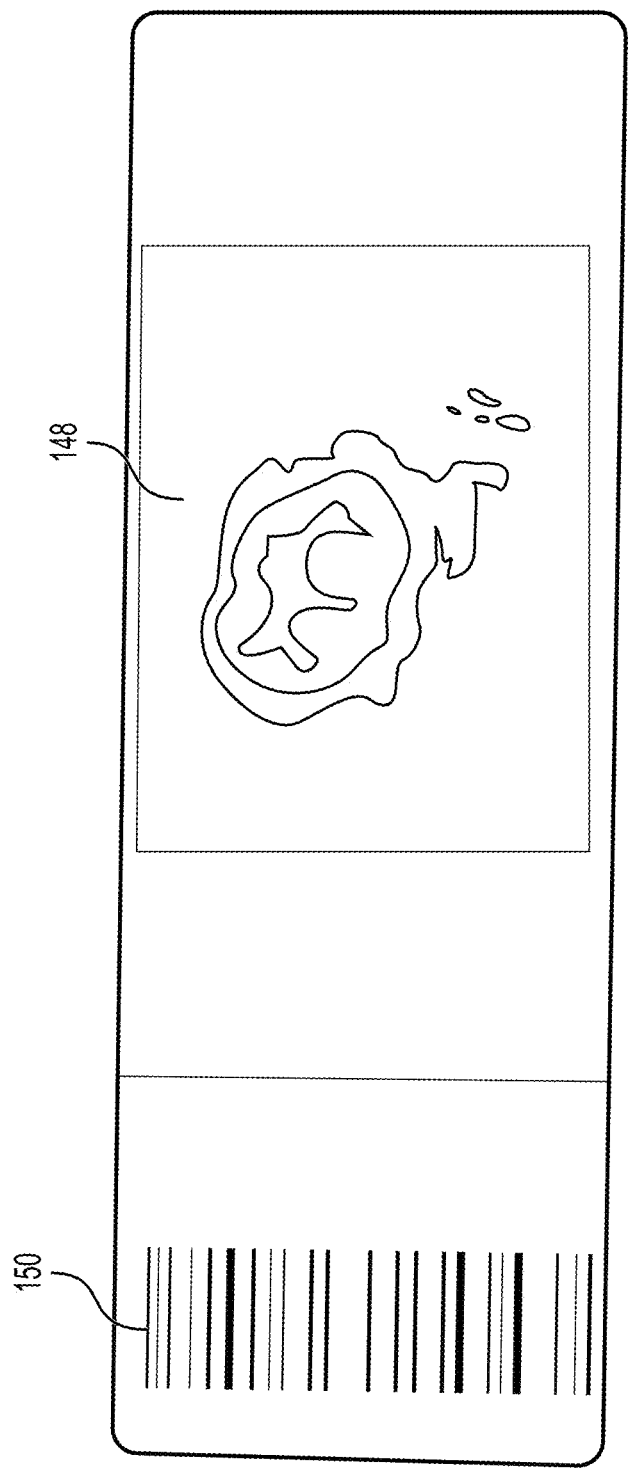
FIG. 1D shows an exemplary sample slide with a barcode.

One method of determining the fast pitch is to scan the barcode of the sample, which will contain information such as the wax type (e.g., paraffin type) and the sample thickness. An exemplary sample 148 with a barcode 150 is shown in FIG. 1D. Scanning barcode 150 may provide information regarding the thermal properties of tissue ahead of time. For example, barcode 150 may contain information regarding sample preparation parameters, tissue thickness, paraffin type, tissue type, etc. Mechanical properties of tissue sample 148 (e.g., density, conductivity, etc.) may be used to calculate the ideal point spacing. In other words, the correct fast pitch in the scanning direction can be calculated so as to not damage sample 148 or negatively impact the signal extraction.

Another method of determining the optical fast pitch is to experimentally measure the time domain signatures of the sample being imaged. The thermal decay characteristics may be measured at one pixel and the ideal fast pitch between pixels may be determined by correlating the time decay to a pre-calculated thermal model (e.g., thermal FEA model). A different way to determine the optical fast pitch with experimental measurements is done by conducting a full scan in a small region at various pitches and experimentally determining the pitch that does not cause thermal interference. This can be done in a region of the sample that is on the edges of the sample or clinically low value areas of the sample as determined by the overview camera so as to not damage critical aspects of the sample under test.

FIG. 1E shows a PARS shuttle stage system 152 according to one or more embodiments of the present disclosure. More specifically, FIG. 1E shows a PARS shuttle stage system 152 when a sample tile 170 is at an overview camera cell 154, a lamp based camera scanner or secondary imaging head (as described herein) cell 156, and a PARS cell 158. FIG. 1E additionally depicts a shuttle stage 160 in an isometric view. PARS shuttle stage system 152 includes a sample load area 162, an overview camera 164, a secondary imaging head 166, and a PARS system 168. Shuttle stage 160 may be configured to enable movement of sample tile 170 between the three different cells. As shown, sample load area 162 and overview camera 164 may be at one end of shuttle stage 160, PARS system 168 may be at the other end of shuttle stage 160, and secondary imaging head 166 may be between sample load area 162 (and overview camera 164) and PARS system 168. In the event sample thickness of the sample is unknown or not recorded in the barcode information, overview camera 164 may determine the thickness of the sample by focusing on the top of the tissue and the bottom of the slide. Overview camera 164 may be fixed such that sample tile 170 can movably engage with overview camera 164 via a mechanical stage (e.g., shuttle stage 160). If the depth of focus of overview camera 164 is too large to differentiate the thickness of the tissue, a different non-contact optical based thickness measurement can be implemented (e.g., laser triangulation, ultrasonic thickness measurement, time-of-flight cameras, interferometry, etc.).

One method of enabling fast scanning architecture utilizes a fast velocity mechanical stage in one axis timed with the excitation repetition rate. Examples of a fast scanning mechanical stage is a voice coil motor (VCM) or actuator. In this method, the velocity of the stage would have to be timed with the excitation repetition rate to enable the desired fast axis pitch. Another group of fast scanning methods creates multiple points simultaneously (i.e., at one time) in either a one dimension or two dimension array as opposed to only using one point at a time as detailed in the methods above and further described below. The simultaneous points need to be spaced at a minimum of the fast axis due signal contamination and sample damage thresholds as described earlier.

Additionally, diffraction grating can be used to generate a point array with a pitch that satisfies the fast pixel requirements. A one dimensional or two dimensional diffractive optical element (DOE) can be used to split the primary collimated beam into a multipoint array. A rotary motor can include an assortment of diffraction gratings, and the diffraction element, and corresponding fast pixel pitch, can be selected based on the current sample being interrogated. Alternatively, a focusing lens on a linear stage can be actuated and varied in order to achieve the ideal fast pitch on the sample.

Generally, skipping pixels in the x-axis and y-axis also allows full images (at lower resolution) to be scanned, processed, and displayed on the screen as the PARS head returns to make multiple passes. The image on the screen can update its resolution as more data and pixels are fully populated. Different architectures can be utilized to enable skipping pixels and/or fast scanning.

One such architecture uses single point optical scanning. An exemplary front view 400, top view 402, and isometric detail view 404 of this scanning architecture is shown in FIG. 1F. The resonant micro-electro-mechanical systems ("MEMS") mirror vibrational frequency (e.g., its scanning frequency) is timed in conjunction (e.g., synchronized) with the excitation pulse repetition rate or frequency ("PRR" or "PRF" respectively) to quickly scan beams optically across a sample tile 174 in the x-y plane of sample tile 174, either in one dimension or two dimensions. As illustrated in FIG. 1F, the entire width of sample tile 174 in the y-axis may be reached by the scanning beam with the MEMS mirror while the x-axis is reached by moving a slow stage in the x-axis mechanically. The beam path may be split into a linear region that extends the width of sample tile 174 substantially parallel to the y-axis and a turnaround region at the sides of sample tile 174 that indicates the change in beam path direction as sample tile 174 is moved mechanically in the x-axis. The fast pitch may be determined by the excitation laser PRR and the scanning frequency of the MEMS mirror.

Scanning architecture 172 includes sample tile 174, an objective lens 176, a telescope 178, single incoming collimated detection and excitation beams 180, and a resonant MEMS mirror 182. In scanning architecture 172, collimated and collinear detection and excitation beams 180 are optically scanned across the field of view ("FOV") of objective lens 176 by using resonant MEMS mirror 182. Resonant MEMS mirror 182 may optionally be replaced with a resonant galvo or a spinning polygon, but the downstream architecture (e.g., telescope 178 and objective lens 176) remains the same. In slower systems, a MEMS mirror or galvo may be operated in linear mode (e.g., not resonant) with other design aspects remaining the same. In order to map the optical scan angle of resonant MEMS mirror 182 to the entrance pupil of objective lens 176, a Keplerian telescope can be used to magnify the beam diameter on the resonant MEMS mirror 182 to fill the entrance pupil diameter of objective lens 176. At the same time, telescope 178 changes the pivot point of the optical angle range to be pivoted at the entrance pupil and linearly reduces the optical scan angle by the magnification of telescope 178. For example, in a typical system, the beam diameter at the MEMS mirror is 1 mm and the MEMS mirror moves +/−2.5 degrees mechanically to create an optical scan angle of +/−5 degrees. A typical magnification of the telescope may be 3, which would result in a beam diameter of 3 mm at the entrance pupil of the objective along with an optical scan angle of +/−1.67 degrees pivoted about the entrance pupil diameter (EPD).

Another architecture uses multipoint optical scanning. An exemplary front view 406, top view 408, and isometric detail view 410 of this scanning architecture is shown in FIG. 1G. Scanning architecture 184 is similar in design as to scanning architecture 172 except, instead of sending a single collimated detection and excitation beams 180 to the scanning mirror (e.g., resonant MEMS mirror 182, resonant galvo, linear drive mirror, polygon, etc.), scanning architecture 184 sends a multipoint spot array to the scanning mirror. As illustrated in FIG. 1G, multi-incoming collimated detection and excitation beams 186 may be scanned using resonant MEMS mirror 182. Scanning architecture 184 reduces the overall scan time by the multiple number of points in the non-scanned direction. A multipoint optical scanning architecture may be useful for systems that require a fast PRF. That is, because the plurality of beams can be pulsed alternately, the PRF can be much faster and, in some cases, can be higher than the maximum vibrational frequency of a MEMS mirror. For example, if two beams each have a PRF of 5 MHZ, the beams can be alternately pulsed at an effective, or equivalent, PRF of 10 MHz to achieve faster imaging times. Since the vibrational frequency of the MEMS mirror is often the upper limit for the PRF in imaging systems, alternately beams allows for greater PRF values without needing the MEMS mirror to have an increase in vibrational frequency. In other words, the MEMS mirror is not required to be any faster to keep the minimum ideal (fast pitch) spacing.

Instead of one co-focused beam spot at a given time, there are multiple co-focused beams simultaneously, which can be scanned across sample tile 174 in the y-axis using the resonant scanning mirror. Each beam, as shown in FIG. 1G, may scan a separate subgroup of pixels, thus providing a faster scan than a single point scanning architecture. One light source may provide each beam, each beam may be provided by a different light source, or any other amount of light sources to provide the plurality of beams is contemplated in the present disclosure. As illustrated in FIG. 1G, the entire width of sample tile 174 in the y-axis may be reached by the multiple scanning beams with the MEMS mirror while the x-axis is reached by moving a slow stage in the x-axis mechanically. The beam paths may be split into a linear region that extends the width of sample tile 174 substantially parallel to the y-axis and a turnaround region at the sides of sample tile 174 that indicates the change in beam path direction as sample tile 174 is moved mechanically in the x-axis. The scanning beams may be configured in such a way that the individual beams are at the same y-value with respect to one another when moving from one side of sample tile 174 to the other side in the y-axis (e.g., the beams may be only offset with respect to the x-axis so that each beam scans the same y-value at a different x-value). The most time-efficient configuration of the scanning beams may be when the pitch between simultaneous scanning spots (e.g., the distance between scanning beams in the x-axis at an instant in time) is the height (i.e., x-dimension) of sample tile 174 divided by the number of scanning beams. The fast pitch may be determined by the excitation laser PRR and the scanning frequency of the MEMS mirror. In a rate limiting case, the number of scanning beams divided by sample tile 174 height is equal to the ideal fast pitch.

Figure 1H:
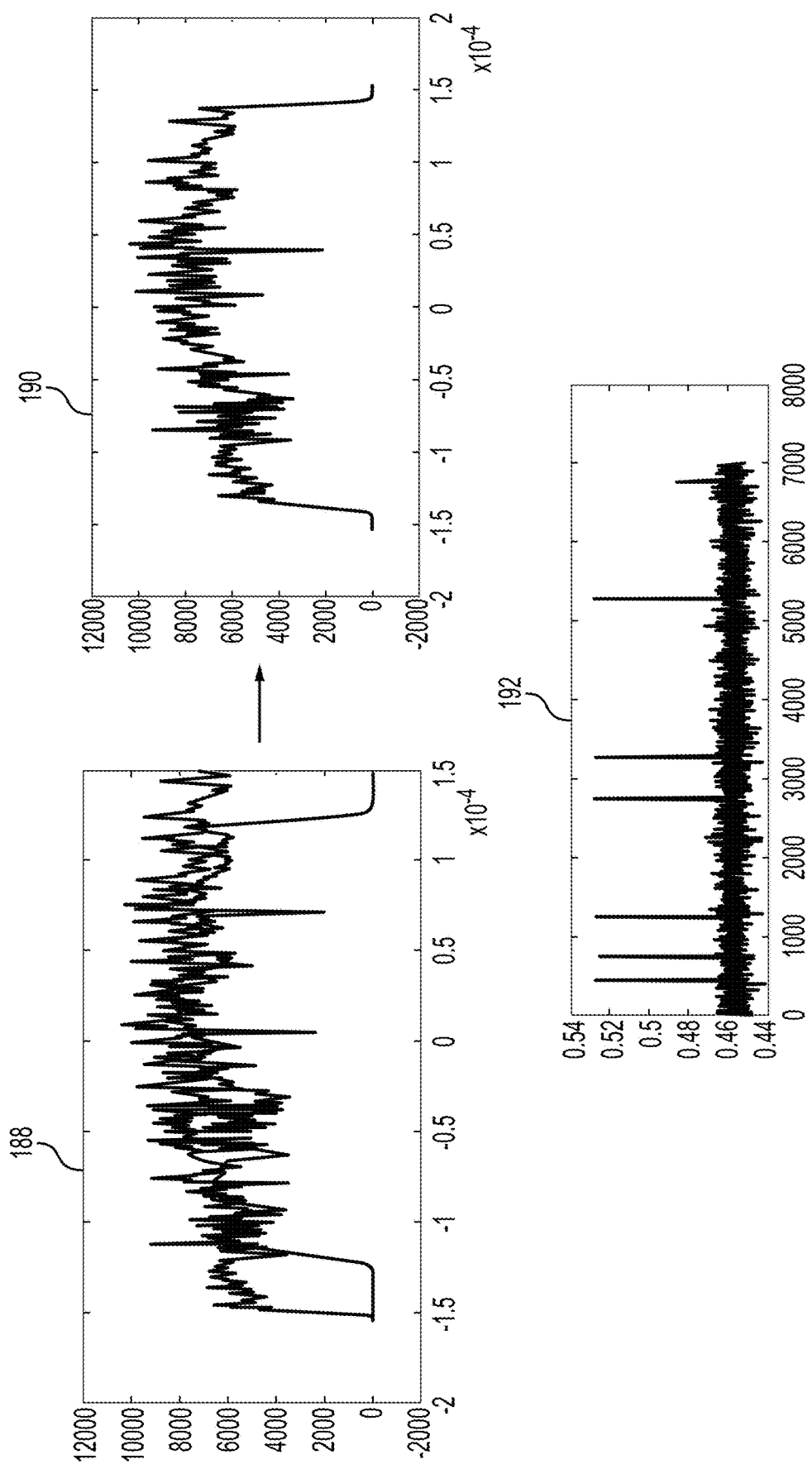
FIG. 1H shows an exemplary correlation process for image reconstruction.
Figure 1I:
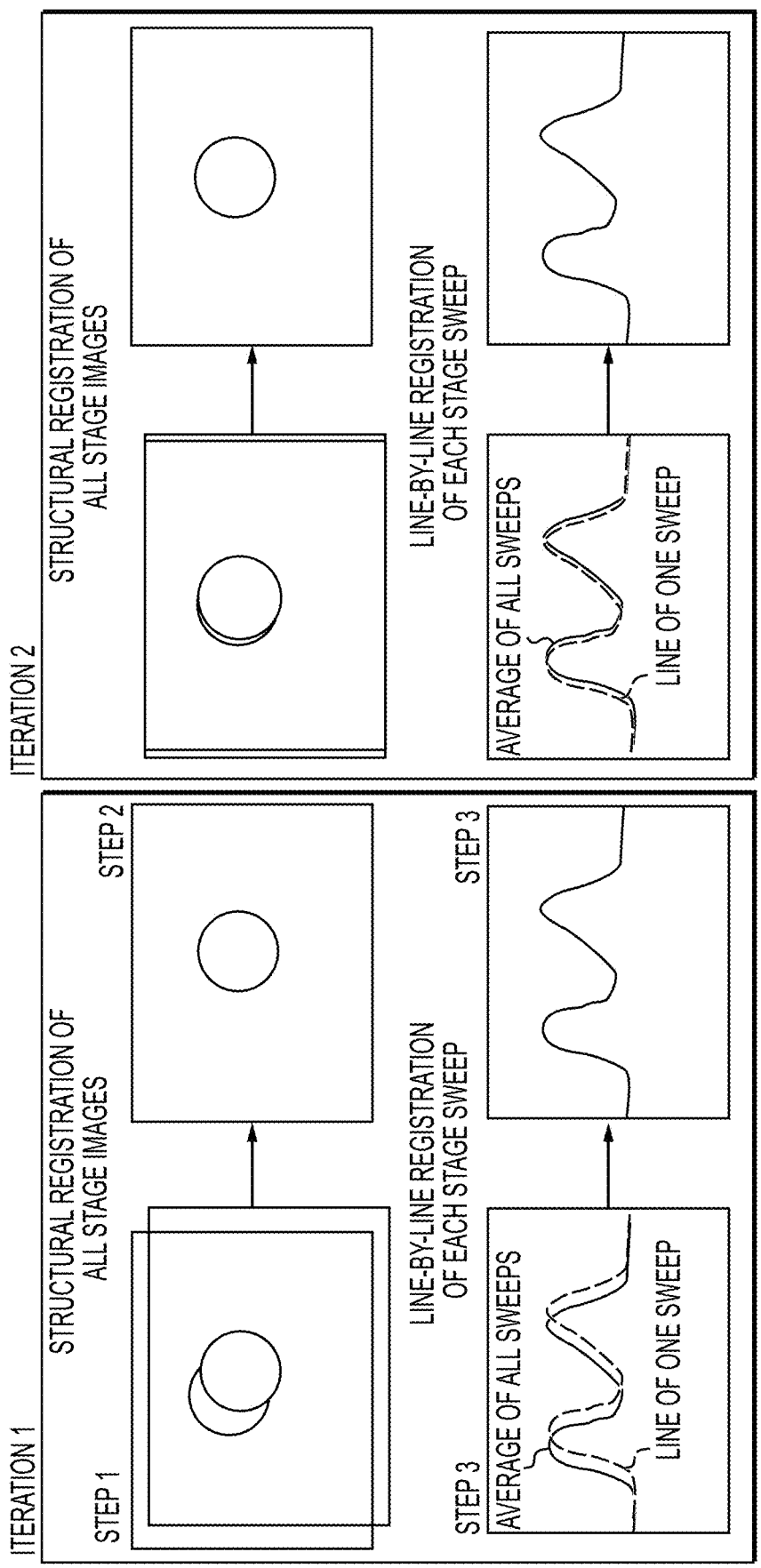
FIG. 1I shows an exemplary iterative process for image reconstruction.
Figure 1J:
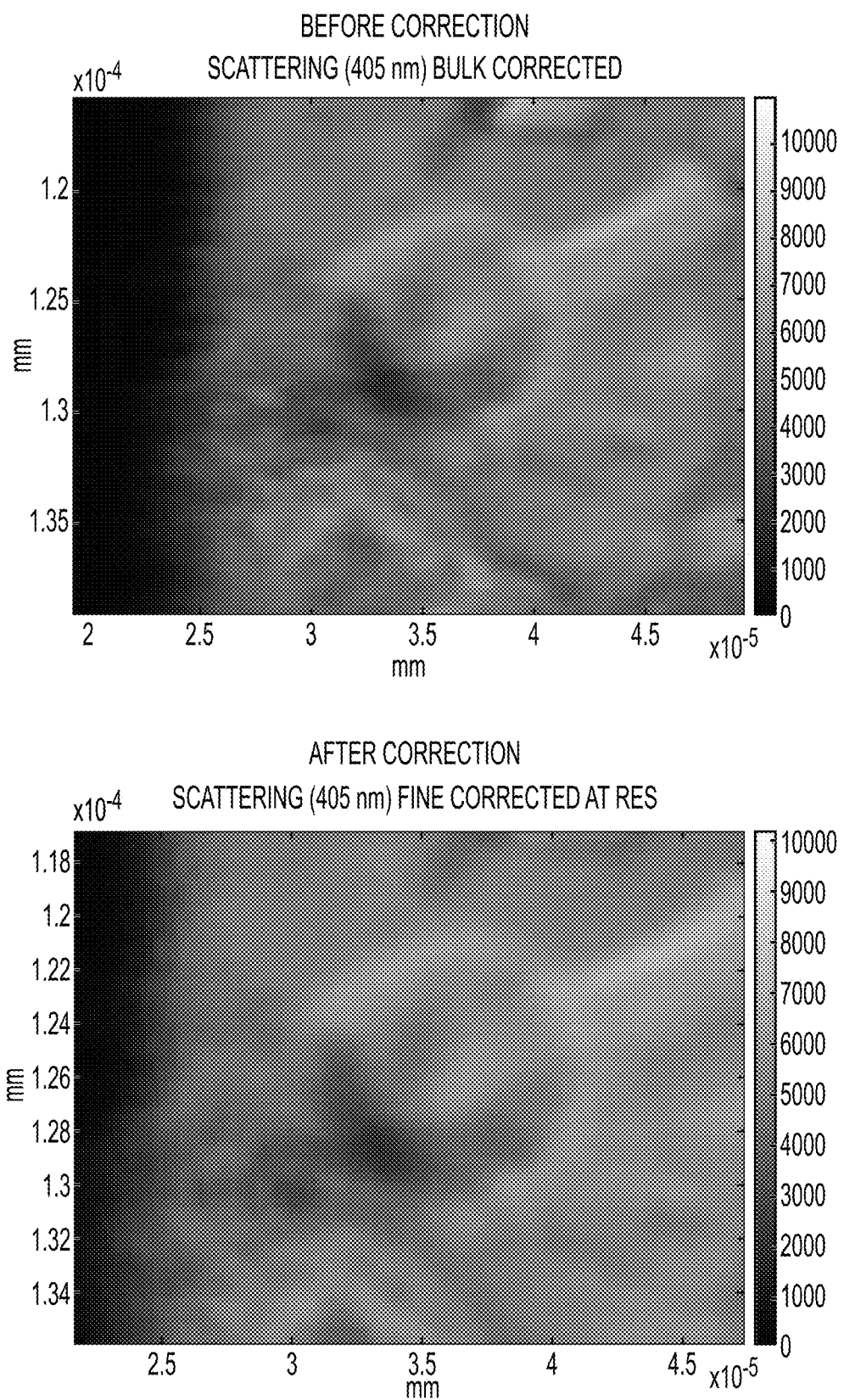
FIG. 1J shows an exemplary before and after comparison for an image undergoing image reconstruction.
Figure 1K:
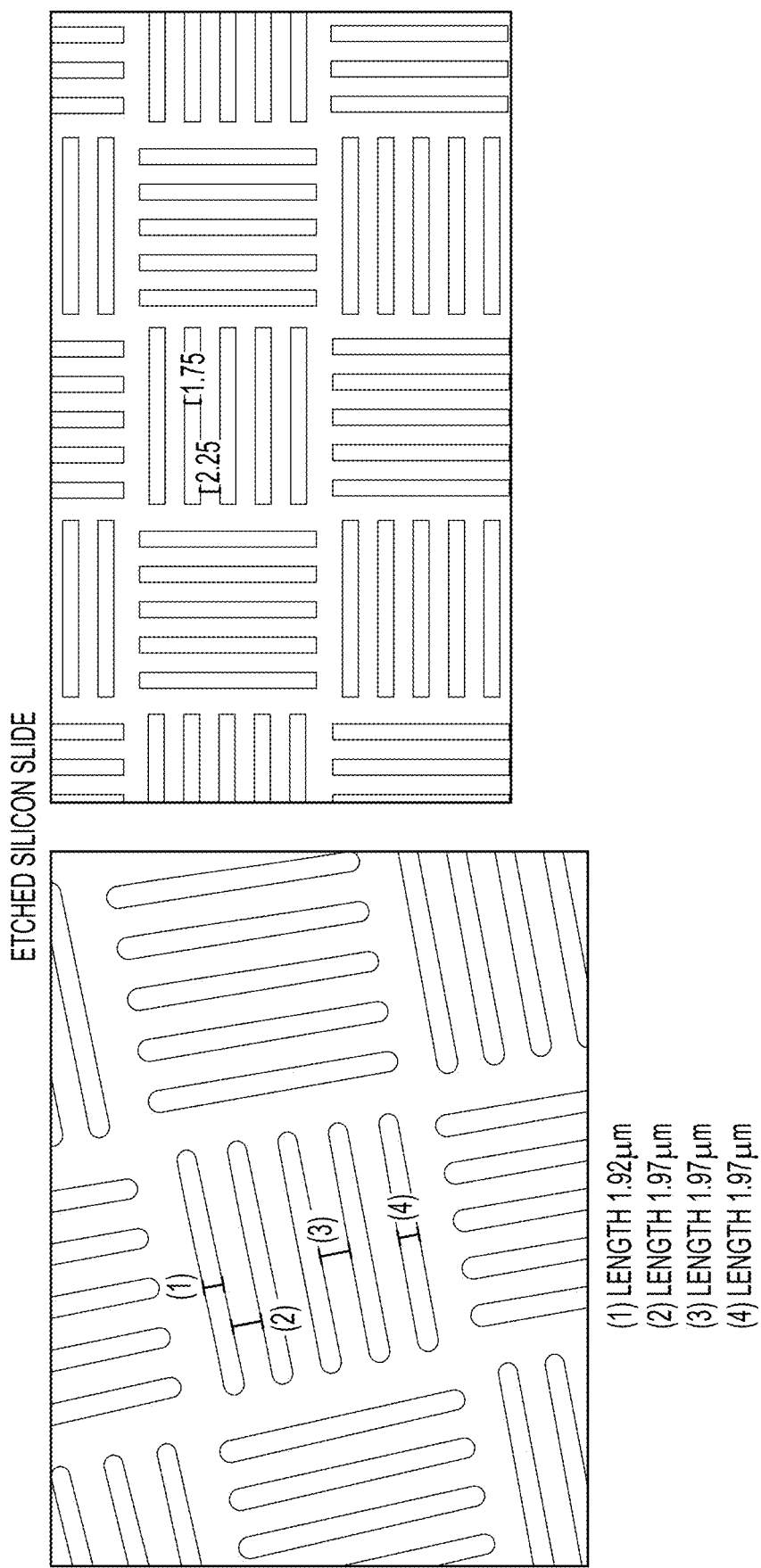
FIG. 1K shows an etched silicon slide.
Figure 1L:
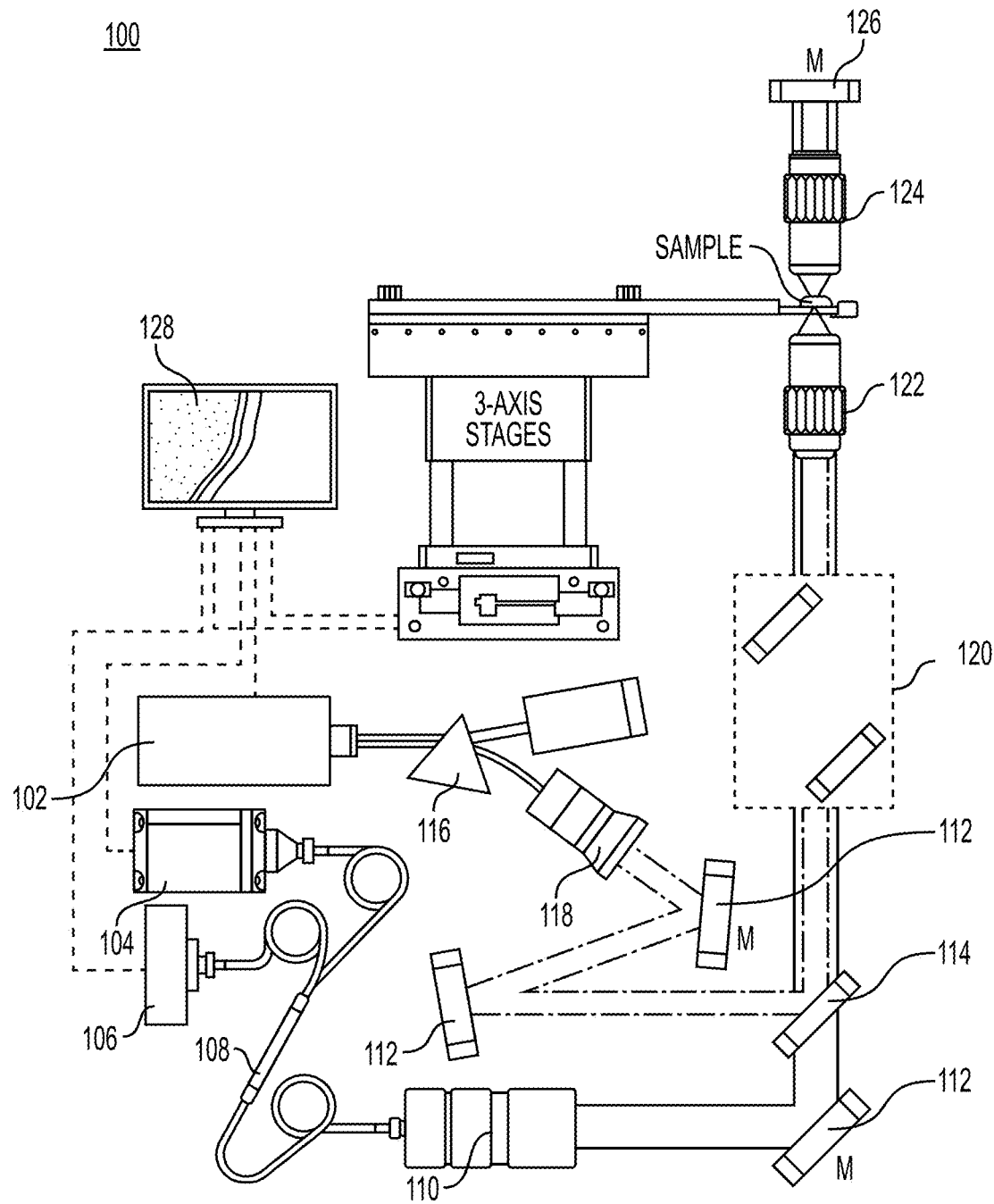
FIG. 1L shows exemplary architecture for a multi-pass PARS detection system.
Figure 1N:
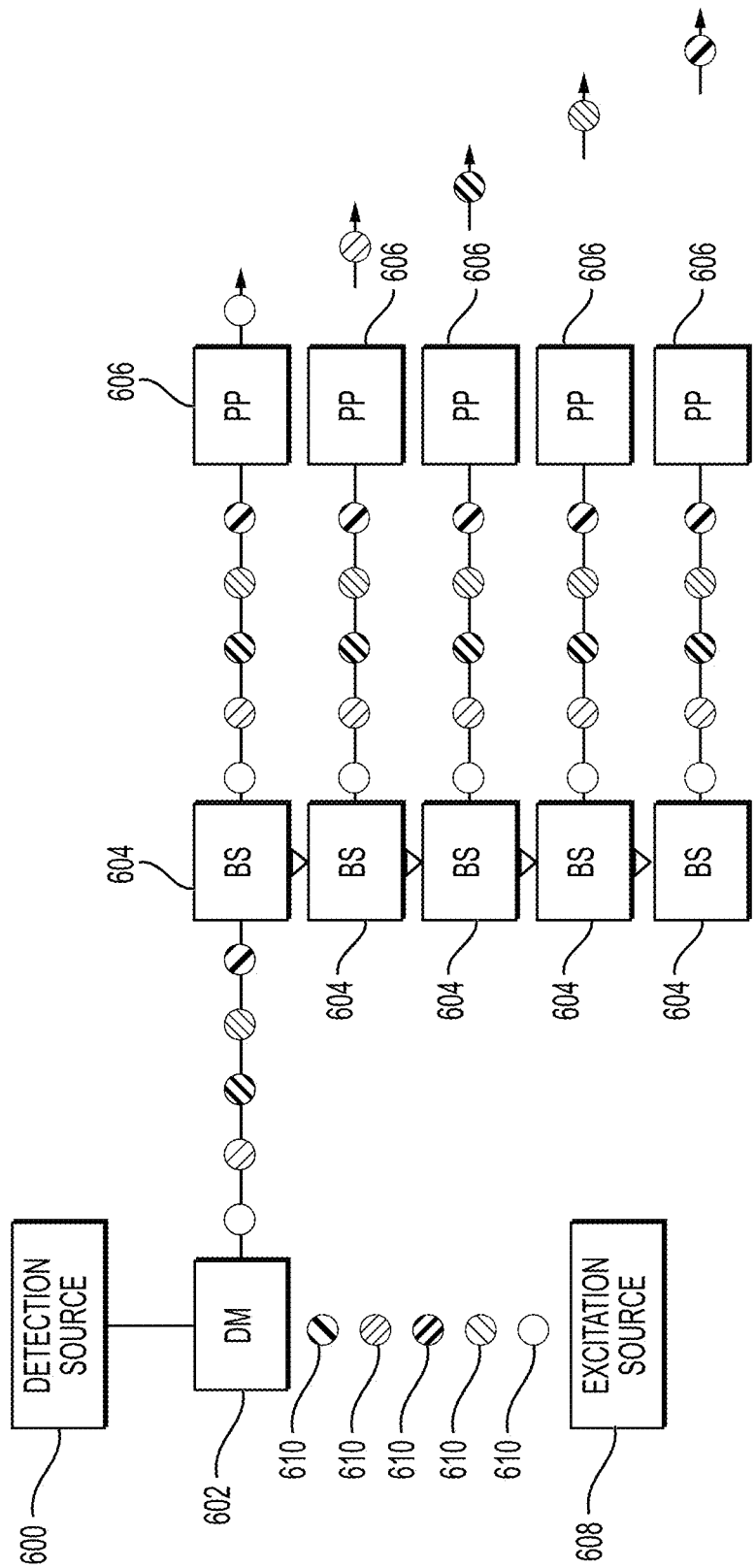
FIG. 1N shows an exemplary single detection source and a single ultra-fast excitation source to provide input beams for sequential multipoint scanning embodiments.
Figure 1P:
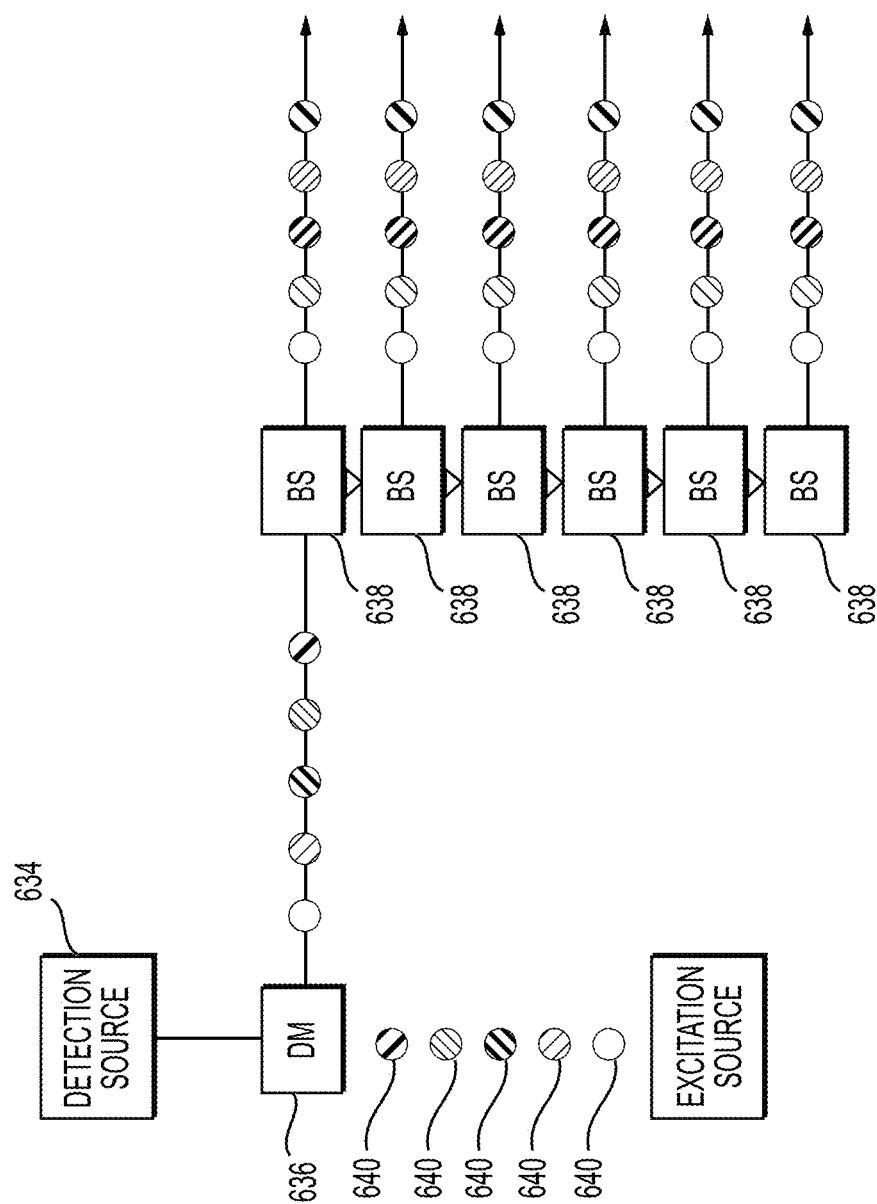
FIG. 1P shows an exemplary single detection source and exemplary single excitation source to provide input beams for simultaneous multi-point scanning embodiments.

An aspect of the present disclosure shown in FIG. 1P relates to the delivery of the excitation (and detection) spots 640 to the sample. In the case where the beams are delivered simultaneously and detected on an array detector such as a line array or camera, the excitation and detection beam can be generated from a single detection (and excitation) source 634. The beams are combined using a dichroic mirror (DM) 636 then split into several different paths using a cascade of beam splitters (BS) 638. The independent beams can be aligned to appropriate angles on the MEMS mirror using standard turning mirrors.

Figure 1Q:
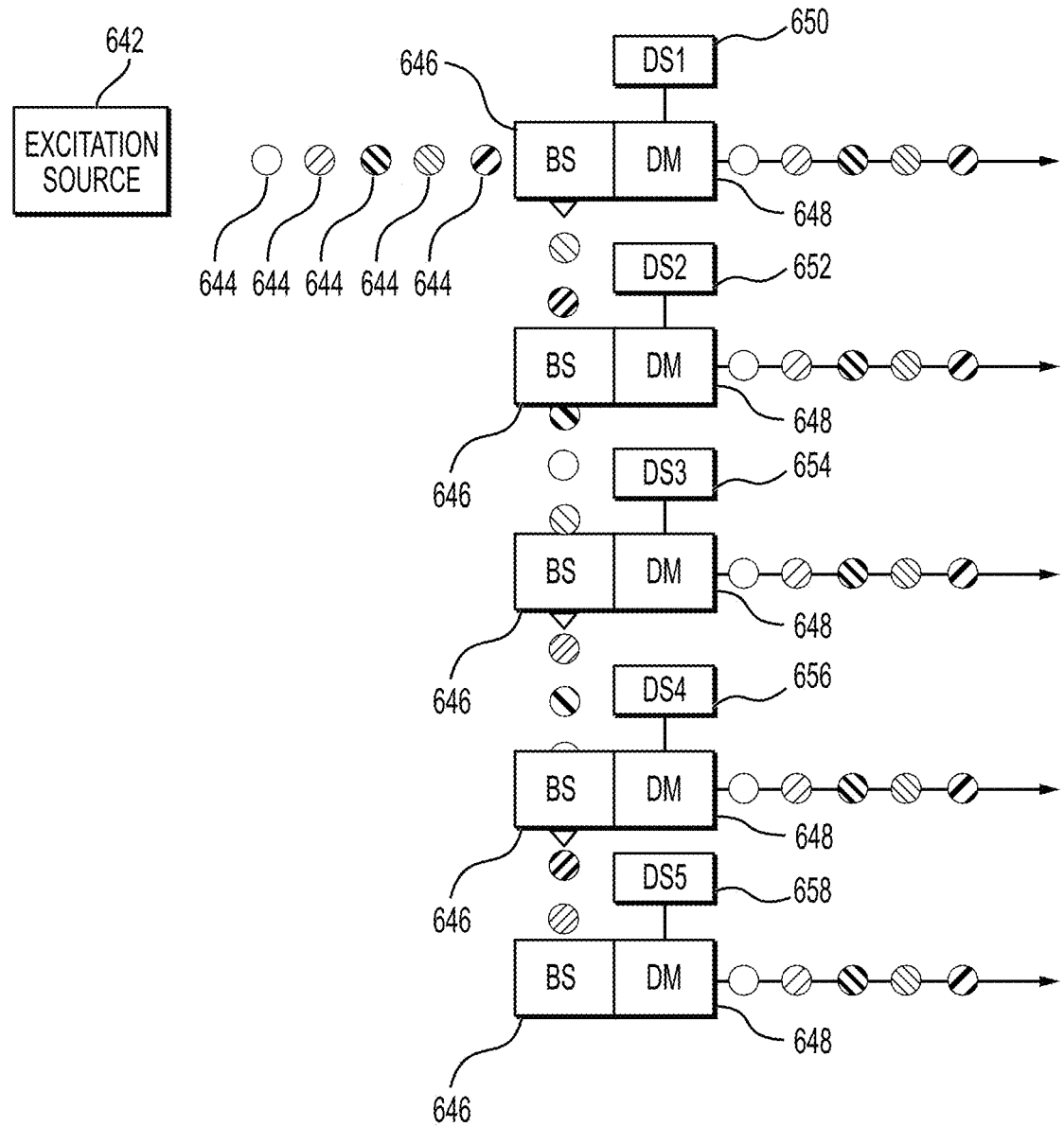
FIG. 1Q shows several exemplary detection sources and an exemplary single excitation source to provide input beams for simultaneous multi-point scanning embodiments.

FIG. 1Q shows another aspect of the present disclosure in the case where the detection beams are delivered simultaneously and are spectrally separated. A single excitation source 642 may be used to provide excitation spots 644 with a number of detection sources (DS) 650, 652, 654, 656, and 658. The excitation source 642 can be split using a series of cascaded beam splitters (BS) 646 and then combined using dichroic mirrors (DM) 648 with any number of different detection sources (DS) 650, 652, 654, 656, and 658 with different wavelengths along independent beam paths. The independent beams can be aligned to appropriate angles on the MEMS mirror using standard turning mirrors.

Another variation of the multipoint optical scanning architecture allows for effective construction of "ultra-fast" single point scanning using very high pulse repetition rate (PRR) lasers. Even with current hybrid scanning embodiments, there are finite limitations to the maximum usable PRR due to physical limitations associated with MEMS scanning mirrors. To circumvent these challenges, a multi-point optical scanning design can be used to provide a virtual scanning axis.

An example of this is shown in FIG. 1M. An exemplary front view 406, top view 408, and isometric detail view 410 of this scanning architecture are shown. Scanning architecture is similar in design as to scanning architecture 172 except, instead of sending a single collimated detection and excitation beams 180 to the scanning mirror (e.g., resonant MEMS mirror 182, resonant galvo, linear drive mirror, polygon, etc.), scanning architecture 184 sends a multipoint spot array to the scanning mirror. As illustrated in FIG. 1M multi-incoming collimated detection and excitation beams 186 may be scanned using resonant MEMS mirror 182. However, unlike scanning architecture 184, the excitation spots are not delivered simultaneously; instead, the events are temporally separated.

One excitation and detection beam spot are active at a given time. However, since these spots are inherently separated by the minimum point (i.e., fast pitch) spacing due to their alignment, there is no requirement to wait for the system to achieve safe spacing before introducing another excitation event. Instead, an alternate point of the multipoint array is activated providing an excitation and detection spot with the required spatial separation. This provides a "virtual" scanning axis in line with the mechanical scanning axis (i.e., the x-axis), due to the multipoint excitation. The virtual scanning axis, consisting of multiple points, can be scanned across sample tile 174 in the y-axis using the resonant scanning mirror.

As illustrated in FIG. 1G, the entire width of sample tile 174 in the y-axis may be reached by the multiple scanning beams with the MEMS mirror while the x-axis is reached by mechanically moving a slow stage in the x-axis. The beam paths may be split into a linear region that extends the width of sample tile 174 substantially parallel to the y-axis and a turnaround region at the sides of sample tile 174 that indicates the change in beam path direction as sample tile 174 is moved mechanically in the x-axis. The scanning beams may be configured in such a way that the individual beams are at the same y-value with respect to one another when moving from one side of sample tile 174 to the other side in the x-axis (e.g., the beams may be only offset with respect to the x-axis so that each beam scans the same y-value at a different x-value). The most time-efficient configuration of the scanning beams may be when the pitch between simultaneous scanning spots (e.g., the distance between scanning beams in the x-axis at an instant in time) is the height (i.e., x-dimension) of sample tile 174 divided by the number of scanning beams. The fast pitch may be determined by the excitation laser PRR and the scanning frequency of the MEMS mirror. In a rate limiting case, the number of scanning beams divided by sample tile 174 height is equal to the ideal fast pitch.

As shown in FIG. 1N, an aspect of this invention relates to the delivery of the excitation and detection spots 610 to the sample. In the case where multiple excitation and detection beams are not delivered simultaneously, and are instead introduced serially to provide "ultra-fast" single point scanning, a different approach is required. In this embodiment the multiple beams can be fed from single excitation sources 608 and detection sources 600; however, this requires a different design that is reflected in FIG. 1N. In this design, much like FIG. 1P, the beams are combined using a dichroic mirror (DM) 602 then split into several different paths using a cascade of beam splitters (BS) 604. However, in this case, each path features a pulse picker (PP) 606 which is used to modulate the combined excitation and detection beams on and off, producing a series of sequential excitation and detection "packages" travelling along independent beam paths. The independent beams can be aligned to appropriate angles on the MEMS mirror using standard turning mirrors. This design allows for a single high repetition rate laser to be operated as if it were an array of lower repetition rate lasers.

Alternatively, as shown in FIG. 1O, the multiple beams can be fed from multiple independent excitation sources 616, 620, 624, 628, and 632 and from multiple detection sources 612, 618, 622, 626, and 630 which are temporally synchronized. In this design, several lower repetition rate excitation lasers are used with several detection lasers. In each path the excitation and detection beam are combined using a dichroic mirror (DM) 614. Then, the sources are electrically modulated producing a series of sequential excitation and detection "packages" travelling along independent beam paths. The independent beams can be aligned to appropriate angles on the MEMS mirror using standard turning mirrors.

An aspect of this invention relates to the ability to reconstruct a high resolution image, free of mechanical or optical jitter that results in loss of resolution in the reconstructed image. Each fast scanning architecture listed above has different causes of image artifacts which makes image reconstruction challenging. The design solutions to aid in reconstruction (both software and hardware) below are specifically related to one-dimensional hybrid MEMS scanning, but aspects can also be applied to the other architectures listed above.

1. Image Reconstruction Aid Method 1

In the current embodiment of the hybrid scanning architecture, the PARS system lacks positional feedback from the MEMS positioning mirror used for optical scanning. Subsequently, a series of processing steps are applied to reconstruct images without requiring positional feedback. These methods rely heavily on structural correlations and data redundancy to iterate the scattered data until a solution is produced that optimizes image quality.

One step in this process is to correlate each mirror sweep. Each sweep of the mirror is assumed to follow a sinusoidal path across the sample. The scattering data is then fitted to the assumed sinusoidal positions. This is observed in FIG. 1H. In many cases, directly fitting the sinusoidal positions does not perform well as there is some jitter in the triggering. To correct this jitter, the phase of the sinusoidal positions is adjusted until the correlation between scattering signal observed on the forward and back sweep of the mirror is maximized, resulting in optimized mirror phase offsets. This is observed in FIG. 1H. Graph 188 shows the raw mirror sweep scattering data fitted to the assumed sinusoidal positions, graph 190 shows a chosen sinusoidal phase offset to maximize the correlation, and graph 192 shows an example of phase error calculated in a real image.

Another step in this process is an iterative process, illustrated in FIG. 1I. First, all the stage passes are aligned by structural correlation (e.g., STEP 1 in "Iteration 1" 412). Second, the aligned images are averaged together to form a merged image (e.g., STEP 2 in "Iteration 1" 412). Third, each line (i.e., mirror sweep) from each stage pass is independently repositioned to maximize the correlation with the merged image (e.g., STEP 3 in "Iteration 1" 412). Fourth, the process is repeated until there are no more positional shifts to apply (e.g., "Iteration 2" 414 generally). A figure showing an image before correction 416 and an image after correction 418 using the image reconstruction process is presented in FIG. 1J.

2. Image Reconstruction Aid Method 2

When driving a MEMS mirror in resonance, the voltage waveform is typically a sine wave. Due to electrical instabilities of the waveform, as well as mechanical instabilities of the mirror itself, the pixels do not land on the exact position expected, which results in edge blurriness of the resulting reconstructed images. One solution is to add a position sensitive detector ("PSD") to the system that captures the entire optical stroke on the surface of the sensor. The PSD then outputs an analog voltage waveform that is linearly scaled to the position when the signal is amplified and conditioned. Since the output of the PSD module is analog, the signals can be converted to digital via an A/D sampling card and can be synchronized to detector channels using the same system clock or trigger. The detection beam itself can be picked off (e.g., sample some of energy of the beam using a beam sampler to capture at or about 1% of beam intensity without severely altering or impacting the initial beam) between the MEMS mirror and telescope, and collected on a PSD or a secondary (non-PARS related) collimated laser. Alternatively, an LED can reflect off MEMS and be collected on the PSD independent of the PARS excitation and detection light path.

3. Image Reconstruction Aid Method 3

In one-dimensional hybrid scanning (as well as two-dimensional stage scanning), positional feedback of the stages via an optical encoder, a hall sensor, or laser proximity sensors can be used and synced to the system trigger and clock to help aid in reconstruction. The position of the stages are directly recorded as a number.

4. Image Reconstruction Aid Method 4

Another method that helps in image reconstruction is to image a known spatial calibration target using the scanning elements in the instrument. In this way, the known target can act as the master reference image to reconstruct unknown geometry, as is the case with histological samples. An example of a known spatial calibration target is an etched silicon slide, as shown in FIG. 1K. The etch depth (into the page) of the silicon features are designed to be the outside depth of focus of the primary objective lens so as to measure contrast from the non-etched surface, which is in focus. In the exemplary aspect shown in FIG. 1K, etch depth is 5 µm. The calibration target can be mounted to the underside of the histological sample carrier which is fixed to the mechanical stages. By imaging the calibration target mounted to the same mechanical stage stack as the sample itself, instabilities from both the MEMS mirror and the mechanical translation stages can be corrected. This method results in a design that can aid in image reconstruction without other sensor-based modalities (e.g., PSDs). In a typical design, the detection beam can be picked off between the last element of the telescope and before the primary objective. This picked off beam can be sent to its own narrow bandwidth, non-glass corrected objective lens and be focused to the calibration target mounted on the underside of the sample carrier plate. This way, both mirror and stage instabilities can be calibrated out.

Additionally, a resolution target in silicon can act as a calibration target to normalize power levels and a health check for the PARS system. A calibration target such as etched silicon is ideal, since it can produce PARS contrast that is repeatable and homogenous across the surface of the reference target as the sample is comprised of pure crystalline silicon.

5. Image Reconstruction Aid Method 5

In one-dimensional hybrid scanning, radiative and non-radiative signals are acquired at the selected excitation laser repetition rate at every fast pixel pitch. The detection wavelength is a continuous wave (CW) and can be collected continuously at a much higher sampling rate in between the radiative and non-radiative excitation events. This higher resolution data from the detection channel can be used to aid in the reconstruction of the images and complement the reconstruction aid described above.

A detailed discussion of the multi-pass detection architecture is now provided. In PARS, the non-radiative absorption induced perturbations in the optical properties are visualized using a secondary co-focused detection laser. The detection laser is co-focused with the excitation spot such that the absorption induced modulations may be captured as changes in the backscatter intensity of the detection laser. For a given detection intensity $I_{det}$, before the excitation pulse interacts with the sample the signals can be approximated based on the following relationship: $PARS_{pre-ext} \propto I_{det}$ (R), where R is the unperturbed reflectivity of the sample.

Once the excitation pulse interacts with the sample, the signal may be approximated as: $PARS_{post-ext} \propto I_{det}$ (R+$\Delta$R), where the pressure and temperature induced change in reflectivity are denoted by $\Delta$R. The total PARS absorption contrast is then approximated as: $PARS_{sig} \propto PARS_{post-ext} - PARS_{pre-ext}$. Substituting the previous relations for $PARS_{pre-ext}$ and $PARS_{post-ext}$ leads to the following: $PARS_{sig} \propto I_{det}$ (R+$\Delta$R)–$I_{det}$ (R).

Before the excitation pulse, the backscattering of the multi-pass PARS (i.e., MPPARS) is then approximated based on the following relationship: $MPPARS_{pre-ext} \propto (I_{det}$ (R))$^n$ where R is the unperturbed reflectivity of the sample, and n is the number of times the excitation interacts with the sample. Once the excitation pulse interacts with the sample, the signal may be approximated as: $MPPARS_{post-ext} \propto (I_{det}$ (R+$\Delta$R)$^n$ where the pressure and temperature induced change in reflectivity are denoted by $\Delta$R.

The total multi-pass PARS absorption contrast is then approximated as: $MPPARS_{sig} \propto MPPARS_{post-ext} - MPPAR$-

$S_{pre-ext}$. Substituting the previous relations for $MPPARS_{pre-ext}$ and $MPPARS_{post-ext}$ leads to the following: $MPPARS_{sig} \propto (I_{det}(R+\Delta R))^n - (I_{det}(R))^n$ where n is the number of times the detection interacts with the sample. PARS signals may be expanded non-linearly by these repeated interactions of the backscattered detection with the sample. The detection may then be redirected to interact with the sample any number of times, resulting in a corresponding degree of non-linear expansion in the non-radiative absorption contrast.

As noted above, multi-pass detection architectures may be oriented such that passes consist of reflection or transmission events, which may occur at normal incidence to the sample or at some relevant transmission or reflection angle. For example, if the target features a particularly strong Mie-scattering angle, it may be advantageous to orient the multiple passes along this direction. Multiple passes may occur along a single (only one or exactly one) path (such as a normal-incidence reflection), or along multiple paths such as a normal-incidents transmission architecture, or even architectures with additional (more than two) pathways to take advantage of additional spatial non-linearities.

Turning now to FIG. 1L, in some cases, the multi-pass detection architecture 100 may include an excitation source 102 (e.g., 266 nm excitation source or laser), one or more detection sources 104 (e.g., a 405 nm detection source or laser), one or more photodiodes or photodetectors 106, a circulator 108, a collimator 110, one or more mirrors 112 to guide the excitation and/or detection light, a prism 116, and a variable beam expander 118. In addition, the multi-pass detection architecture 100 may include a pair of alignment mirrors 120 to align the excitation and/or detection light, and one or more scanners or scanning heads 122, 124 arranged at different sides of the sample. The one or more scanners may include a first scanner 122 to transmit excitation and detection light to the sample, and a second scanner 124, arranged with mirror 126, to allow for multiple passes. A computer 128 may be used to analyze the received signals and/or control the excitation and detection sources 102 and 104.

Figure 2A:
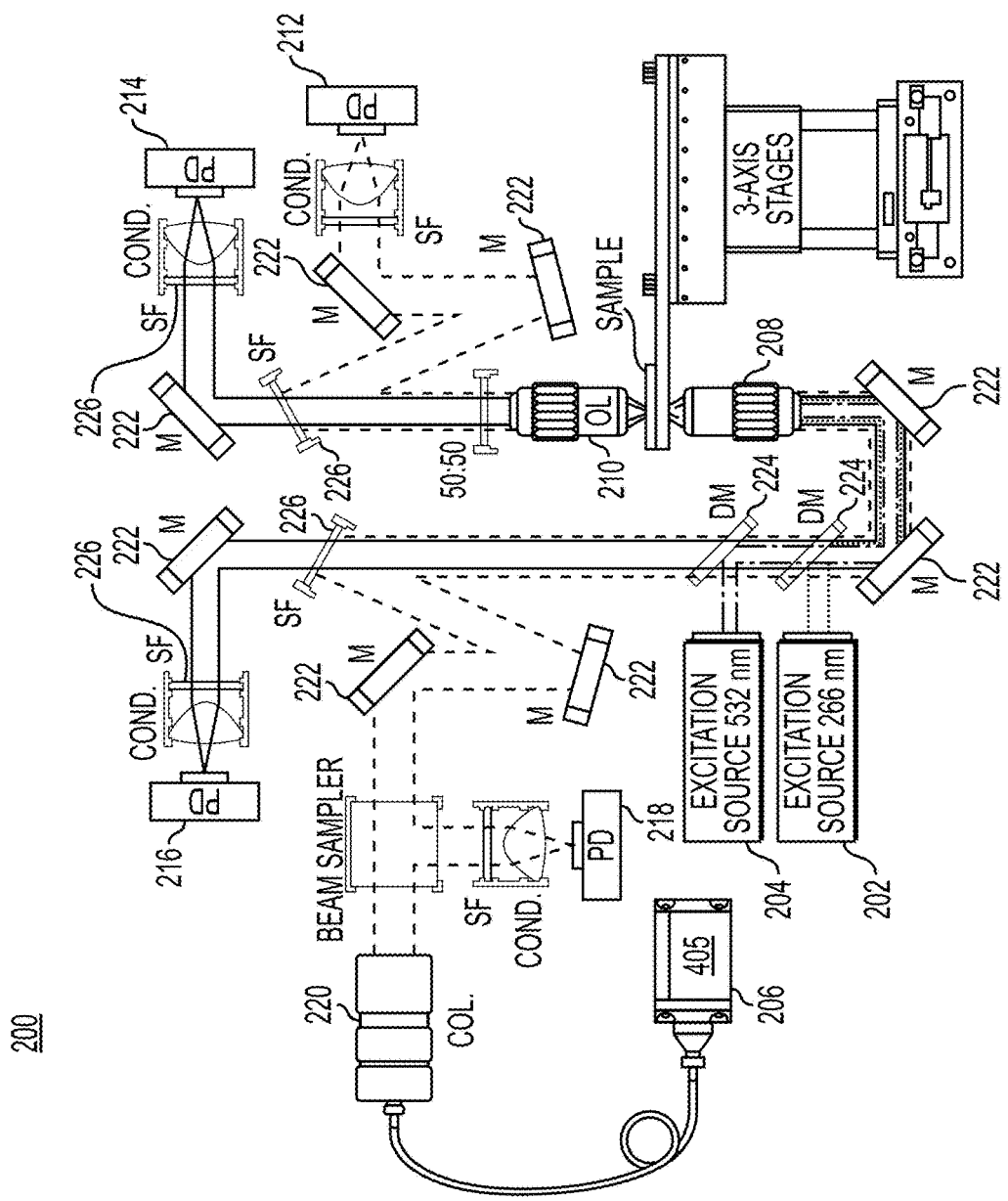
FIG. 2A shows another exemplary architecture for a multi-pass PARS detection system.

Turning to FIG. 2A, in some cases, the multi-pass detection architecture 200 may feature multi-pass non-radiative detection, which may capture transmitted and reflected signals simultaneously (e.g., transmission multi-pass detection architecture). It may also feature a condenser lens used to focus divergent light. Concurrently, it features two independent radiative collection pathways, one on each side of the sample, as shown in FIG. 2A. That is, a first beam is focused on the sample from a first side of the sample, and a second beam is focused on the sample from a second side of the sample, with the first side being opposite from the second side. It will be appreciated that, due to this design, the multi-pass detection architecture may facilitate imaging of certain samples, such as thin samples that are required for histological imaging, since the beams are capable of passing through the specimen to enable imaging. For example, the sample thickness may range from less than 1 µm to greater than 5 mm. More generally, the specimen can be any thickness which light is able to penetrate through.

In these examples, the multi-pass detection architecture 200 may include two excitation sources 202, 204 having different excitation wavelengths (e.g., 266 nm excitation source or laser and 532 nm excitation source or laser), one or more detection sources 206 (e.g., a 405 nm detection source or laser), two objective lenses 208, 210, one or more photodiodes or photodetectors 212, 214, 216, 218, a collimator 220, one or more mirrors 222 to guide the excitation and/or detection light, one or more dichroic mirrors 224 to guide the excitation light, and one or more spectral filters 226.

In transmissible sections, the multi-pass detection architecture 200 may use the two objective lenses 208, 210, each lens mounted on an opposing side of the sample, as shown. The excitation and detection beams from the excitation and detection sources 202-206 may be co-focused onto the specimen 228 using the lower objective lens 210. A portion of the modulated detection beam and/or a portion of the radiative absorption and inelastic scattering signals may be captured by the upper objective lens 208. In some cases, a portion of the modulated detection beam may be returned to the specimen 228 and the returned detection beam may be captured by the lower objective lens 210. The portion of the modulated detection beam returned may be in the range of less than 1% to 100% of the light collected by the upper objective lens. In some cases, a portion of the radiative absorption signal may also be captured using the lower objective lens 210. The detection beam may be separated from the radiative relaxation signals via chromatic isolation. The isolated detection and radiative signals on the top and bottom of the sample are then directed to independent photodiodes, such as photodiodes 212, 214, 216, 218.

As previously discussed, with this architecture, both the radiative and non-radiative signals may be collected on both sides of the specimens. By collecting both a linear and a non-linear representation of the non-radiative signals, there is an enhanced opportunity to capture additional unique contrasts within the materials. As discussed below, this may facilitate enhanced signal to noise ratios or may be used for techniques such as super resolution or super-localization.

It will be appreciated that, though the multi-pass detection architecture may be described as a transmission mode device in some cases, (e.g., where beams must pass through the specimens to generate and capture signals), the multi-pass detection architecture may feature a reflection mode design. In such a design, all signals may be collected from one side of the sample (e.g., single path, multi-pass detection architecture). This design may facilitate imaging of certain samples, such as thick specimens, where the beams are not required to pass through the sample to enable imaging.

It will also be appreciated that, the multi-pass detection architecture is described above is not a requirement for PARS imaging. In some cases, a multi-pass architecture may not be required and may not be used at all; in these cases the PARS may instead be described as solely a transmission mode, or reflection mode device. In such a design the detection beam is only required to interact with the sample a single time.

Figure 2B:
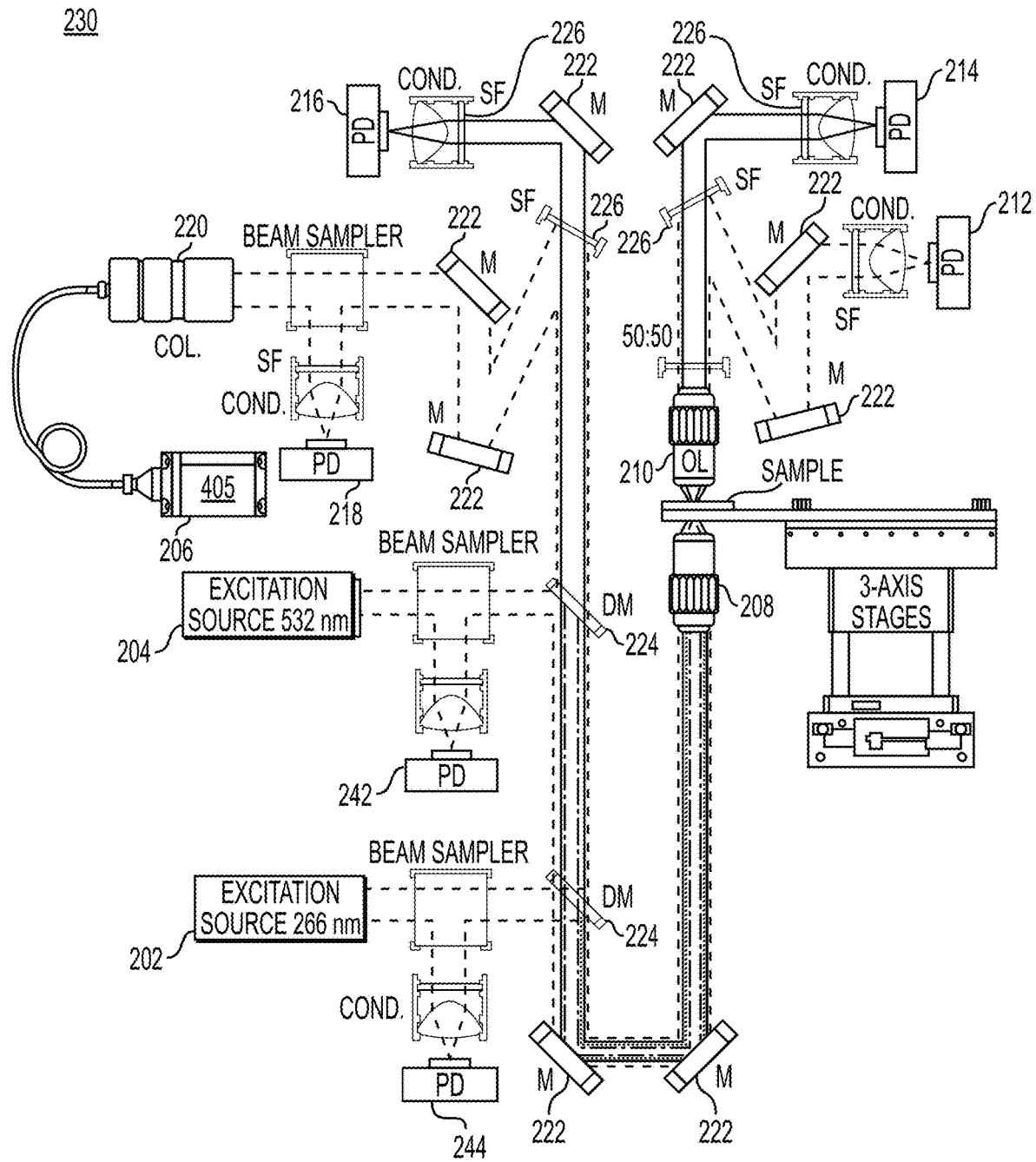
FIG. 2B shows another exemplary architecture for a multi-pass PARS detection system, with additional measurement of scattered excitation light.
Figure 2C:
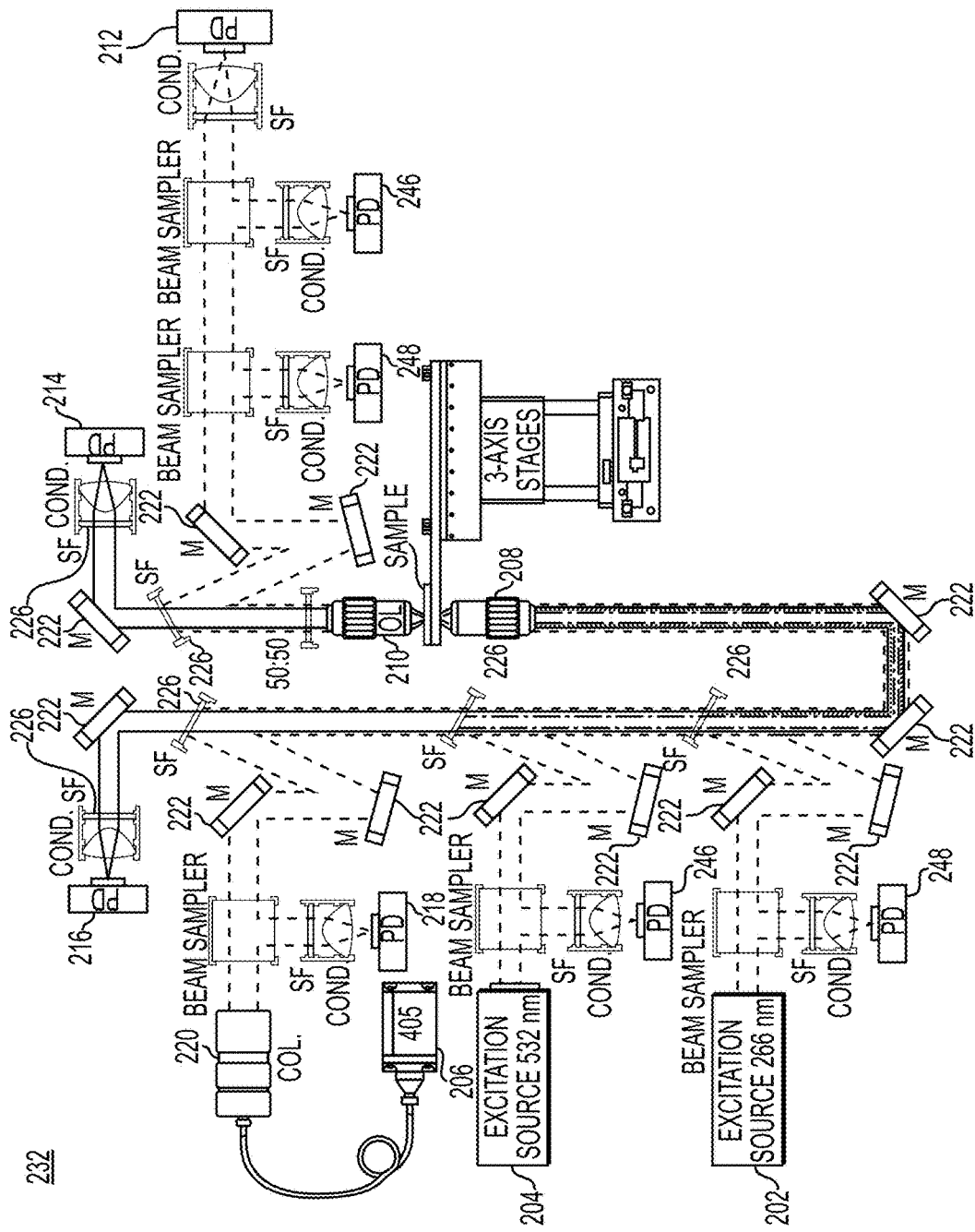
FIG. 2C shows another exemplary architecture for a multi-pass PARS detection system, with additional measurement of transmitted and reflected excitation light.
Figure 2D:
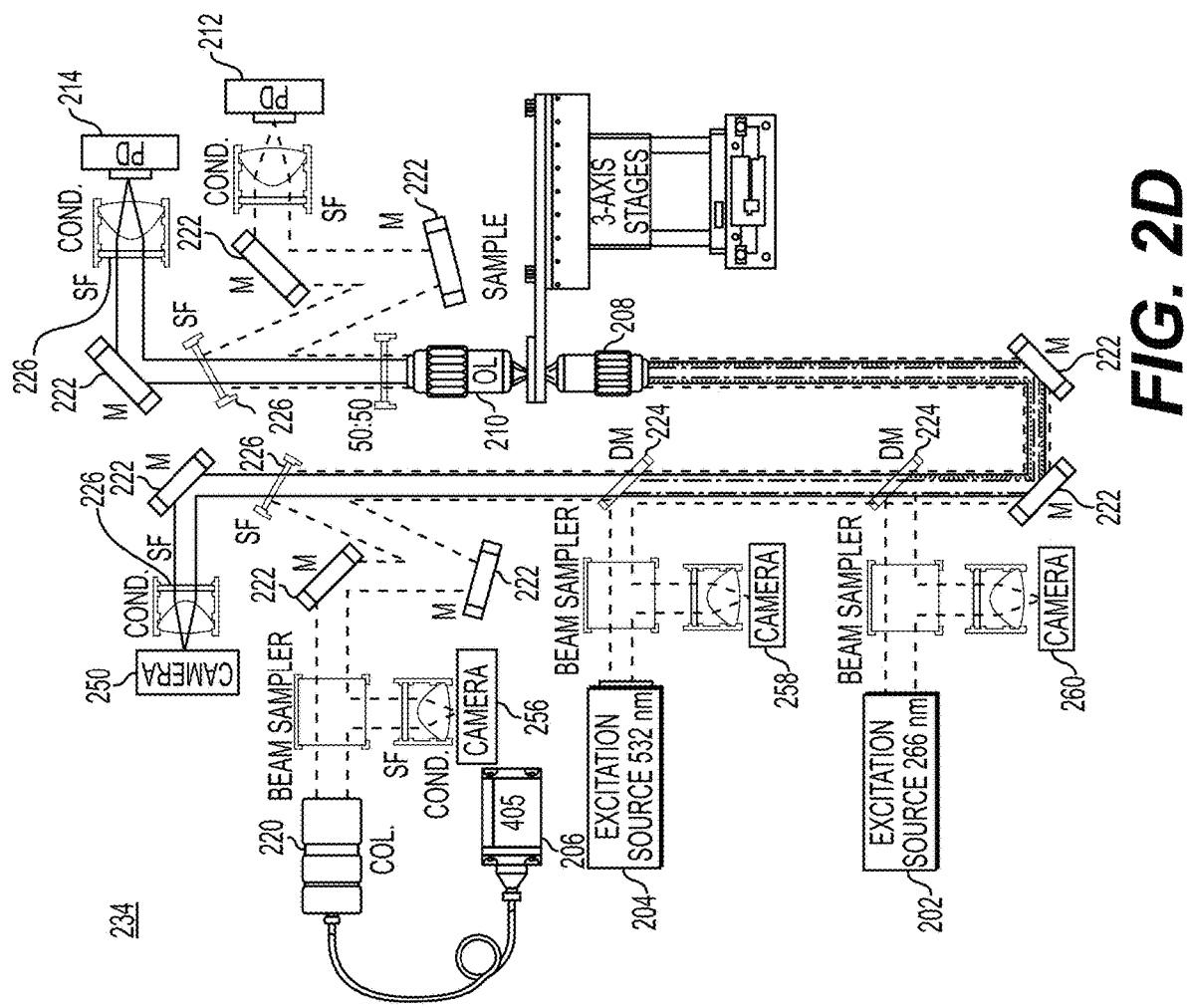
FIG. 2D shows another exemplary architecture for a multi-pass PARS detection system using camera based detectors
Figure 2E:
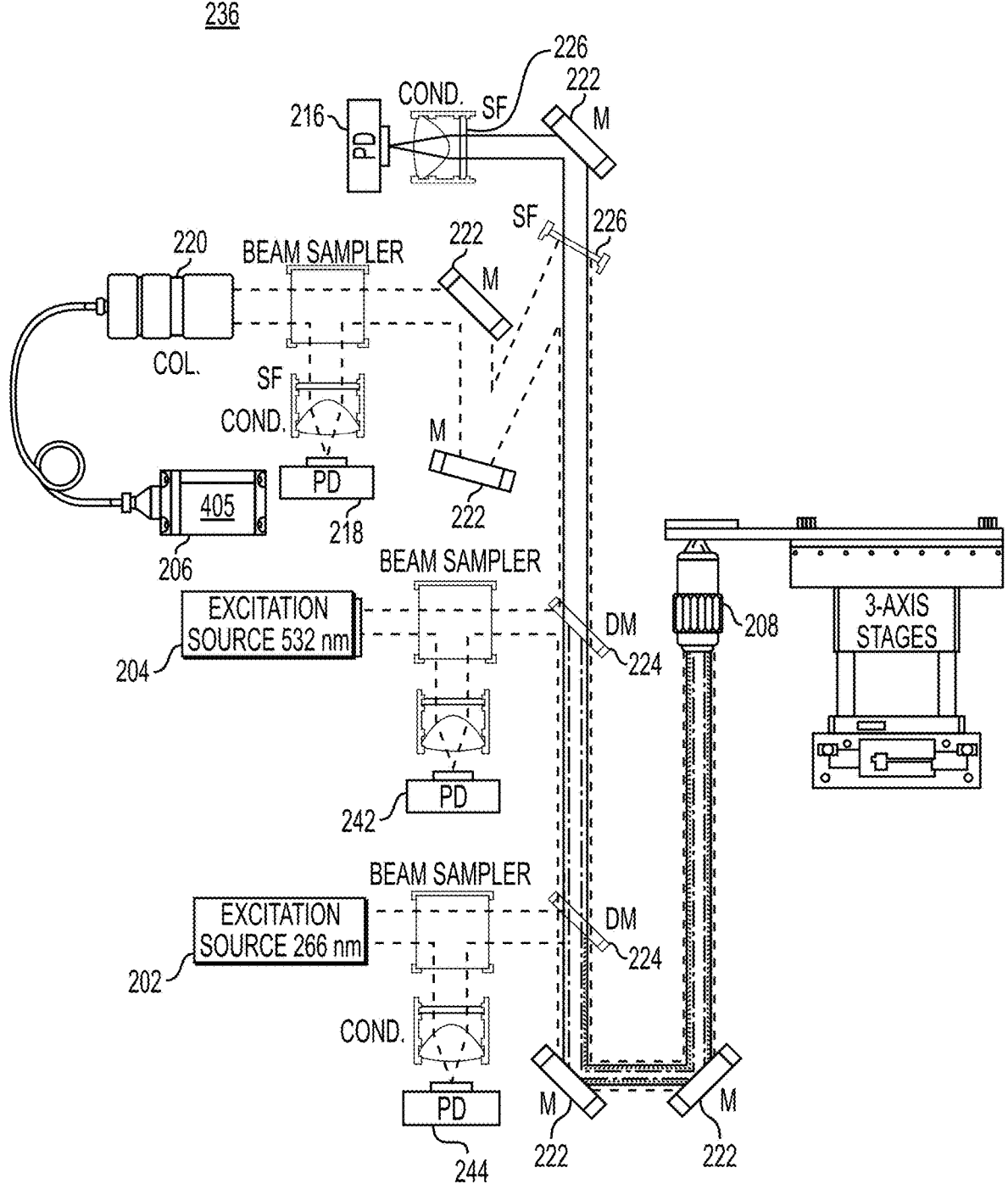
FIG. 2E shows another exemplary architecture for a PARS detection system in reflection mode.
Figure 2F:
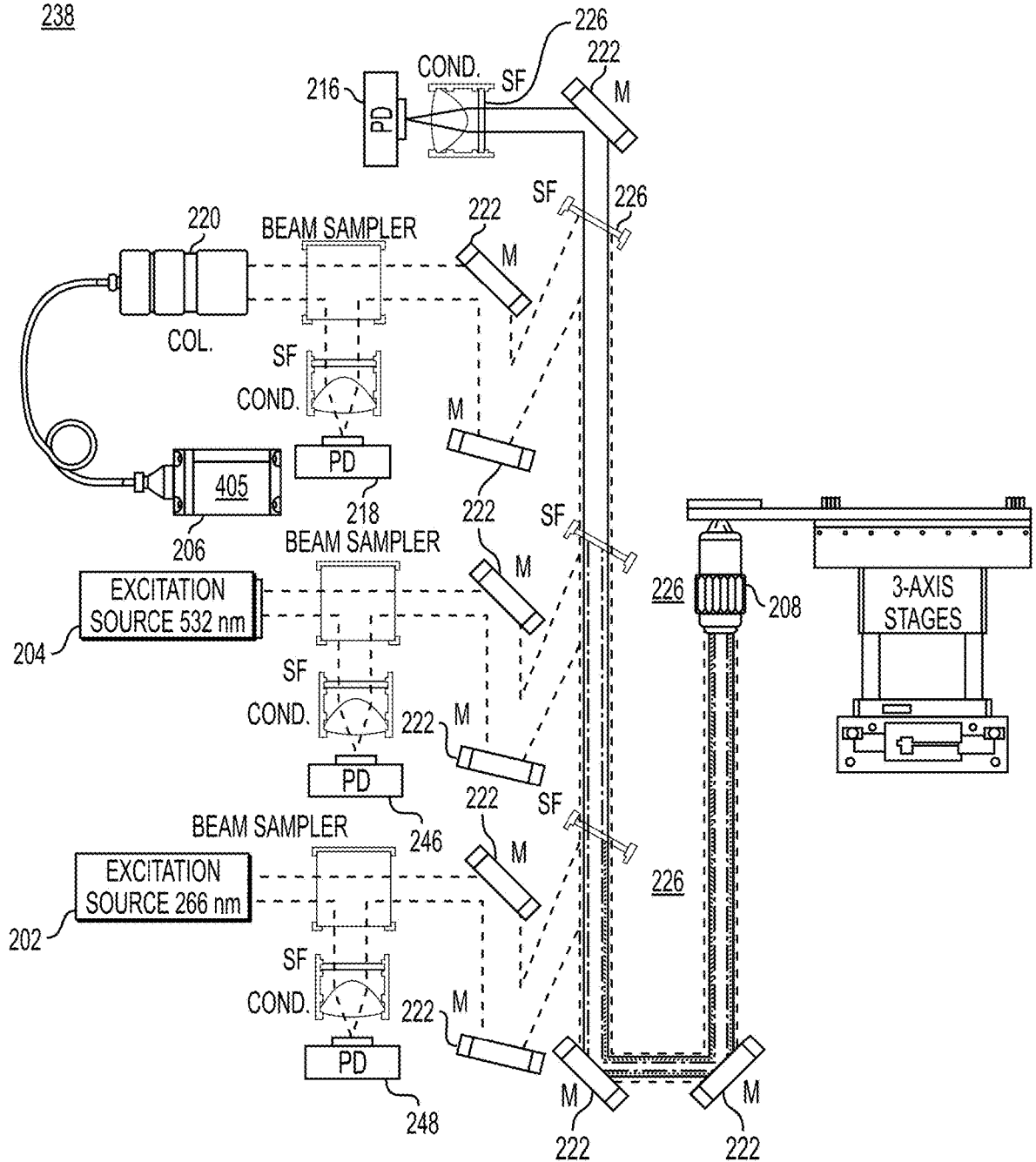
FIG. 2F shows another exemplary architecture for a PARS detection system in reflection mode.
Figure 2G:
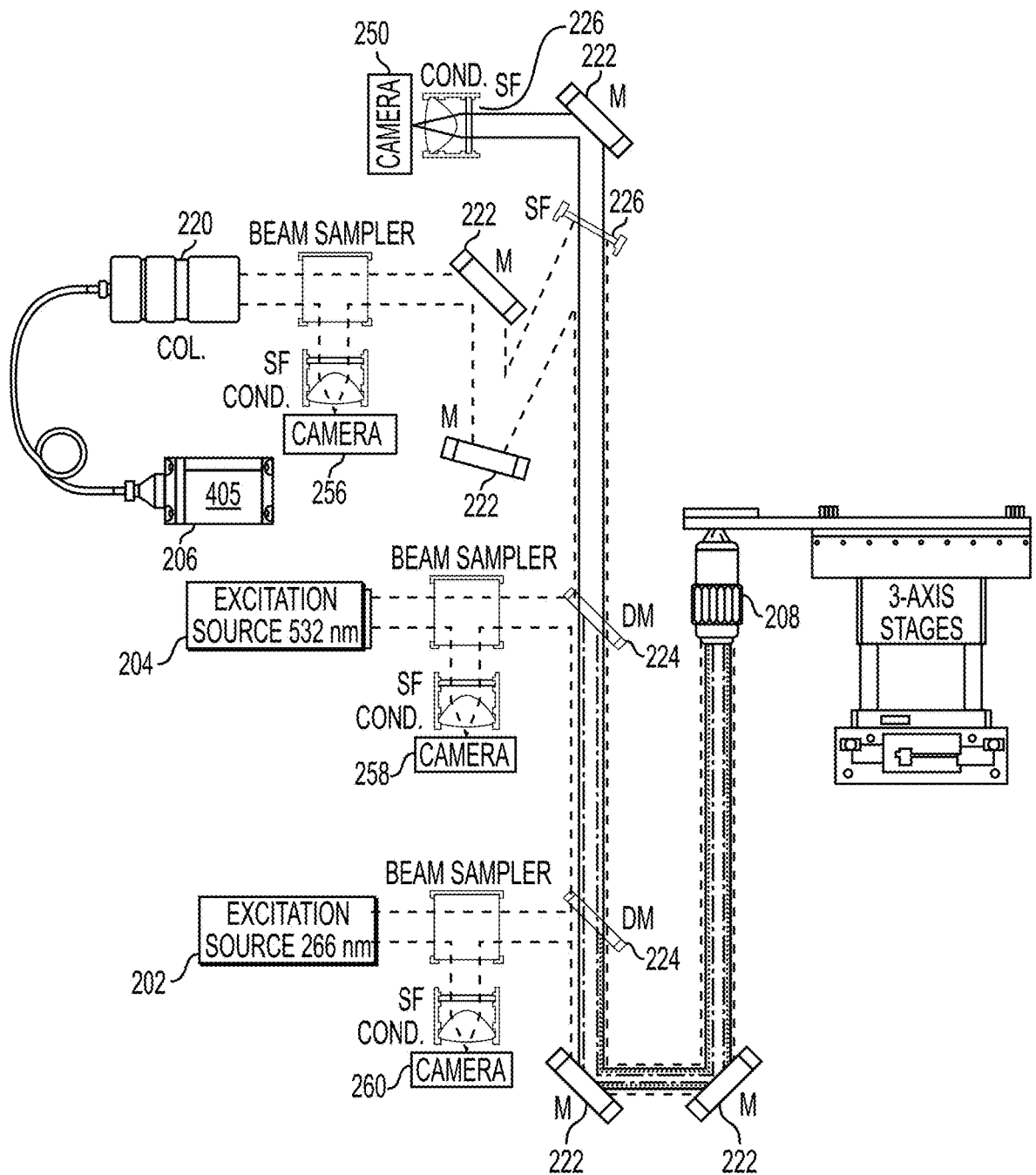
FIG. 2G shows another exemplary architecture for a PARS detection system in reflection mode.
Figure 2H:
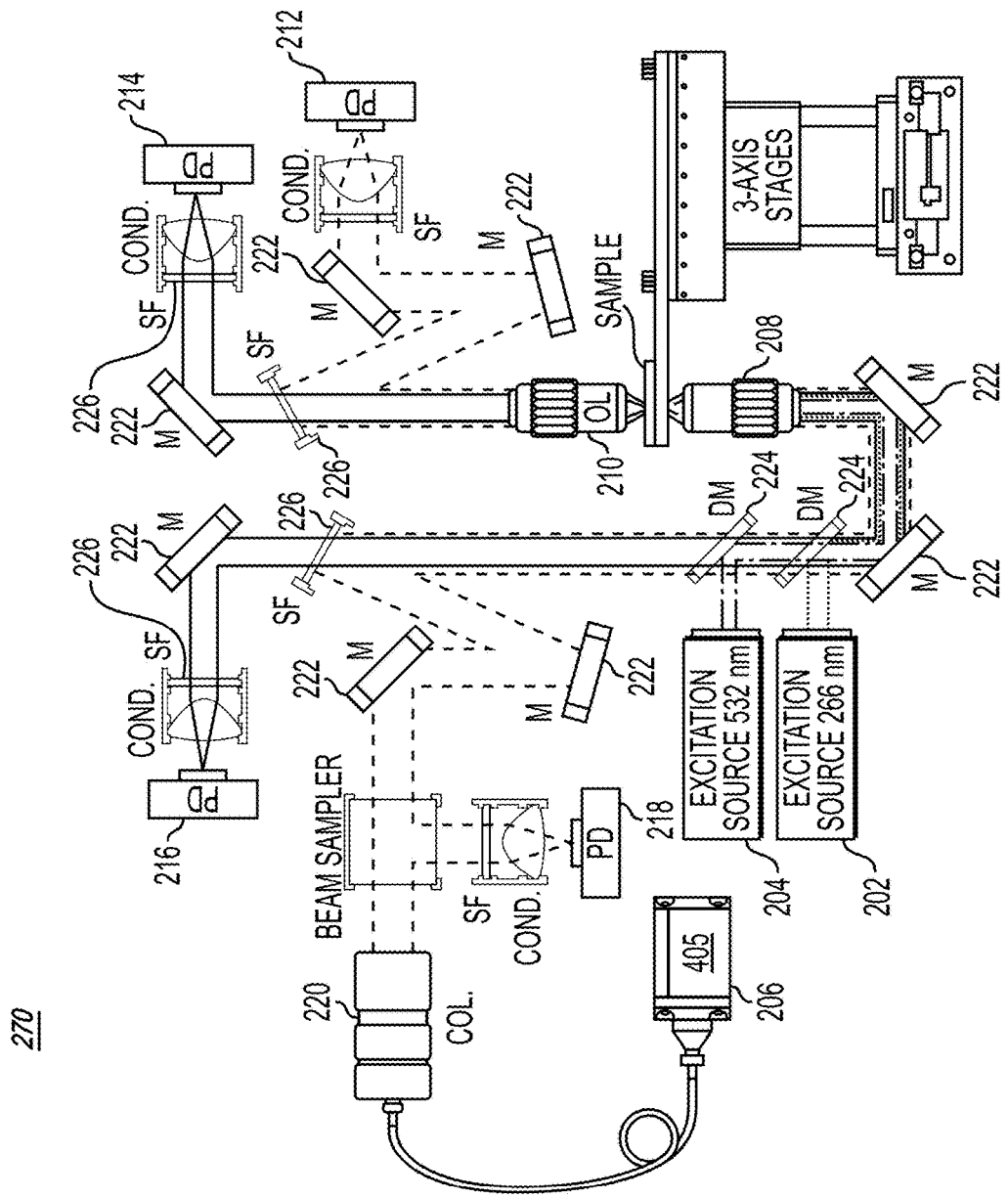
FIG. 2H shows another exemplary architecture for a PARS detection system.

FIG. 2H may be substantially similar to the architecture of FIG. 2A with certain components excluded. In particular, FIG. 2H may exclude the 50:50 splitter, located between spectral filter 226 and objective lens 210. This exclusion removes the multi-pass capability.

FIG. 2B may be substantially similar to the architecture of FIG. 2A with additional components included. In particular, FIG. 2B may include spectral filter 226 (with condenser lens) and photodetector 242 between excitation source 204 and one or more dichroic mirrors 224, and may include spectral filter 226 (with condenser lens) and photodetector 244 between excitation source 202 and one or more dichroic mirrors 224. These additions to FIG. 2B may enable excitation scattering. This is achieved due to the beam sampler redirecting a portion of light returning from the sample towards the spectral filter 226, the condenser lens, and the photodetector. The spectral filter isolates the excitation wavelength, and the photodetector measures the intensity thereby measuring the scattered light intensity.

Figure 2I:
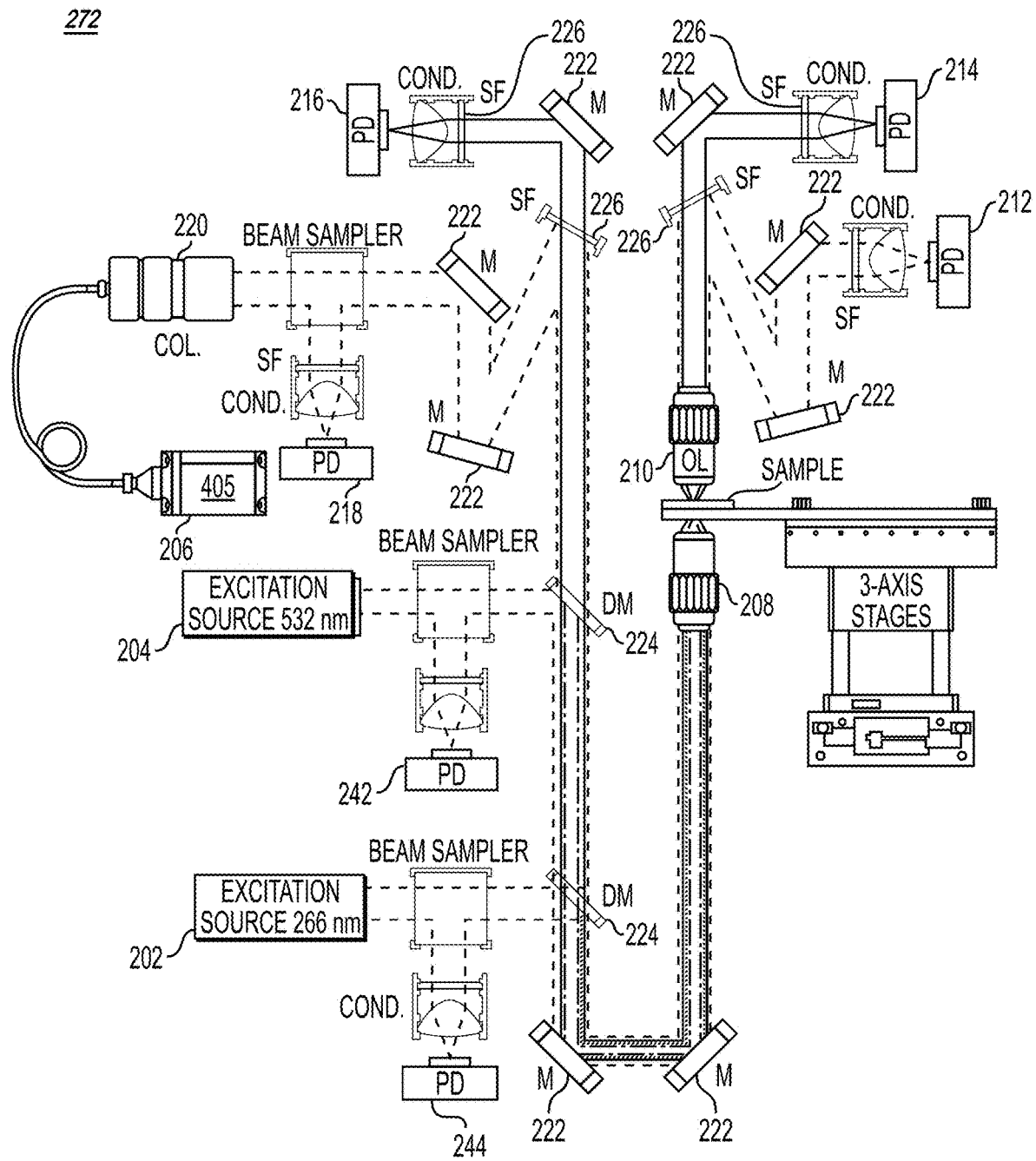
FIG. 2I shows another exemplary architecture for a PARS detection system.

FIG. 2I may be substantially similar to the architecture of FIG. 2B with certain components excluded. In particular, FIG. 2I may exclude the 50:50 splitter, located between spectral filter 226 and objective lens 210. This exclusion removes the multi-pass capability.

FIG. 2C may be substantially similar to the architecture of FIG. 2B with additional components included. In particular, FIG. 2C may include a beam sampler with spectral filter 226 (with condenser lens) and photodetector 248 and may include a beam sampler with spectral filter 226 (with condenser lens) and photodetector 246, located between mirror 222, and photodetector 212. These additions shown in FIG. 2C may enable transmission measurement.

Figure 2J:
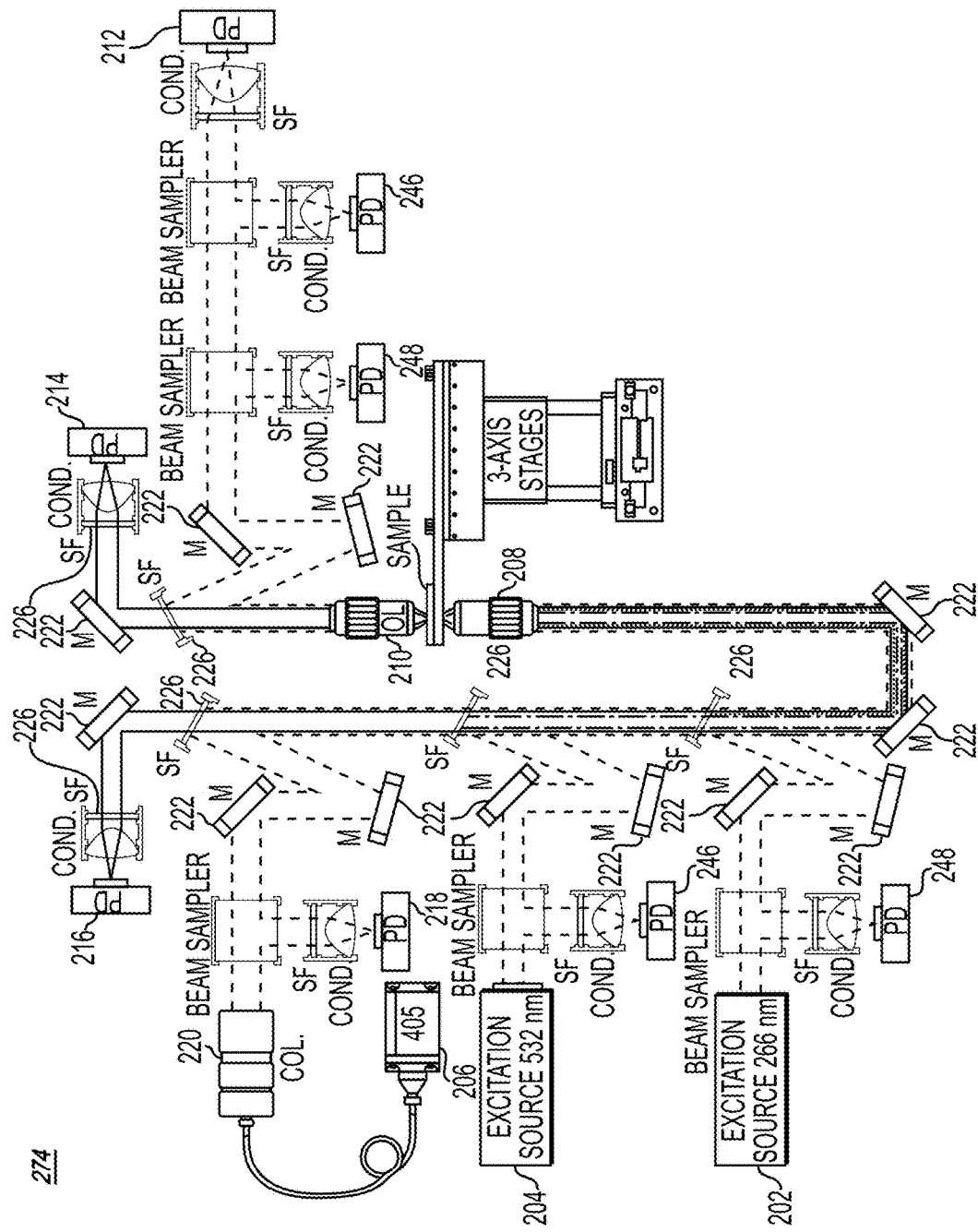
FIG. 2J shows another exemplary architecture for a PARS detection system.

FIG. 2J may be substantially similar to the architecture of FIG. 2C with certain components excluded. In particular, FIG. 2J may exclude the 50:50 splitter, located between spectral filter 226 and objective lens 210. This exclusion removes the multi-pass capability.

FIG. 2D may be substantially similar to the architecture of FIG. 2B with additional components included and some components removed. In particular, FIG. 2D may replace photodetectors 216, 218, 242, and 244 with cameras 250, 256, 258, and 260 respectively. Thus, with these changes, FIG. 2D may be a camera based system.

Figure 2K:
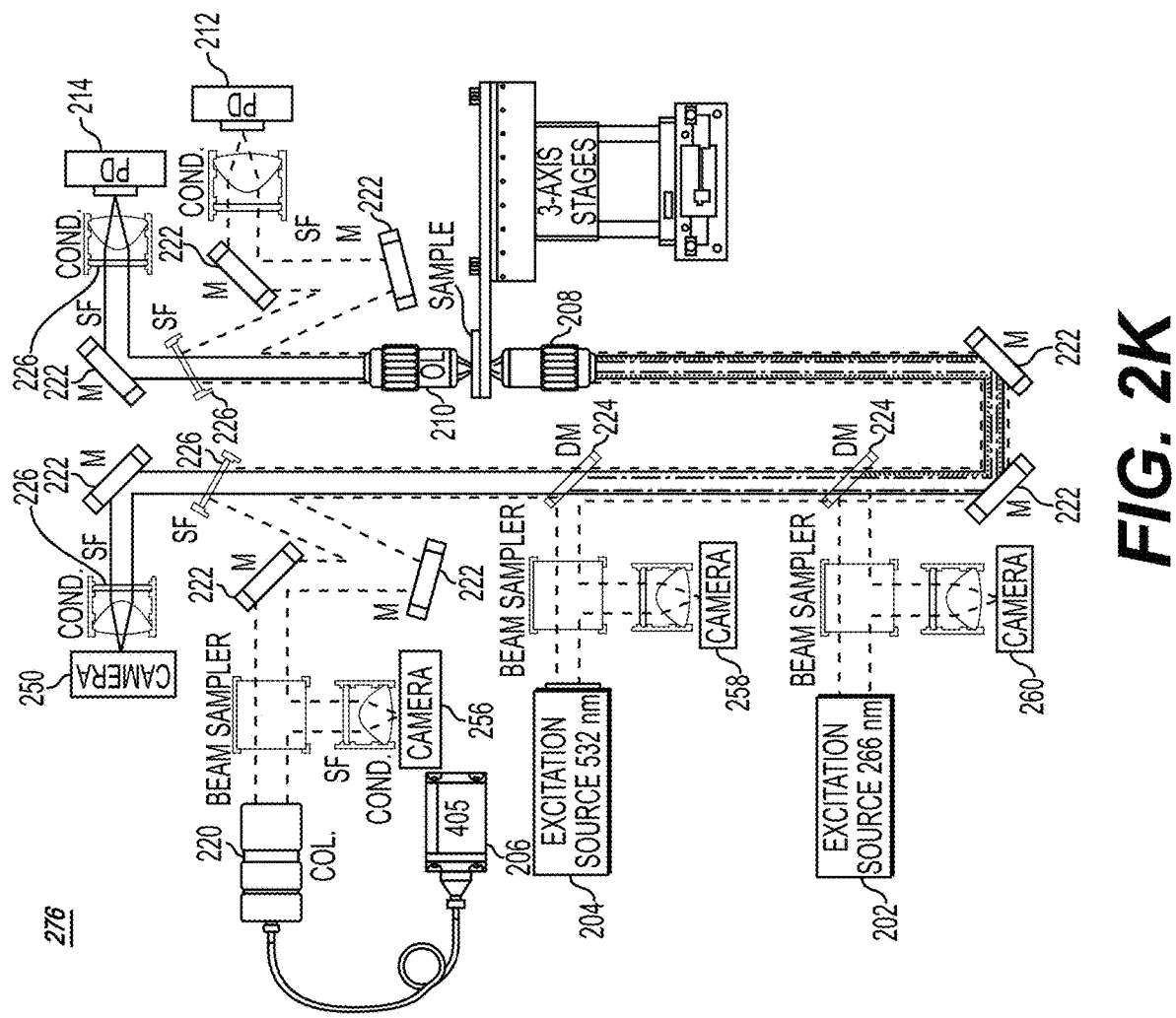
FIG. 2K shows another exemplary architecture for a PARS detection system.

FIG. 2K may be substantially similar to the architecture of FIG. 2D with certain components excluded. In particular, FIG. 2K may exclude the 50:50 splitter, located between spectral filter 226 and objective lens 210. This exclusion removes the multi-pass capability.

Figure 2L:
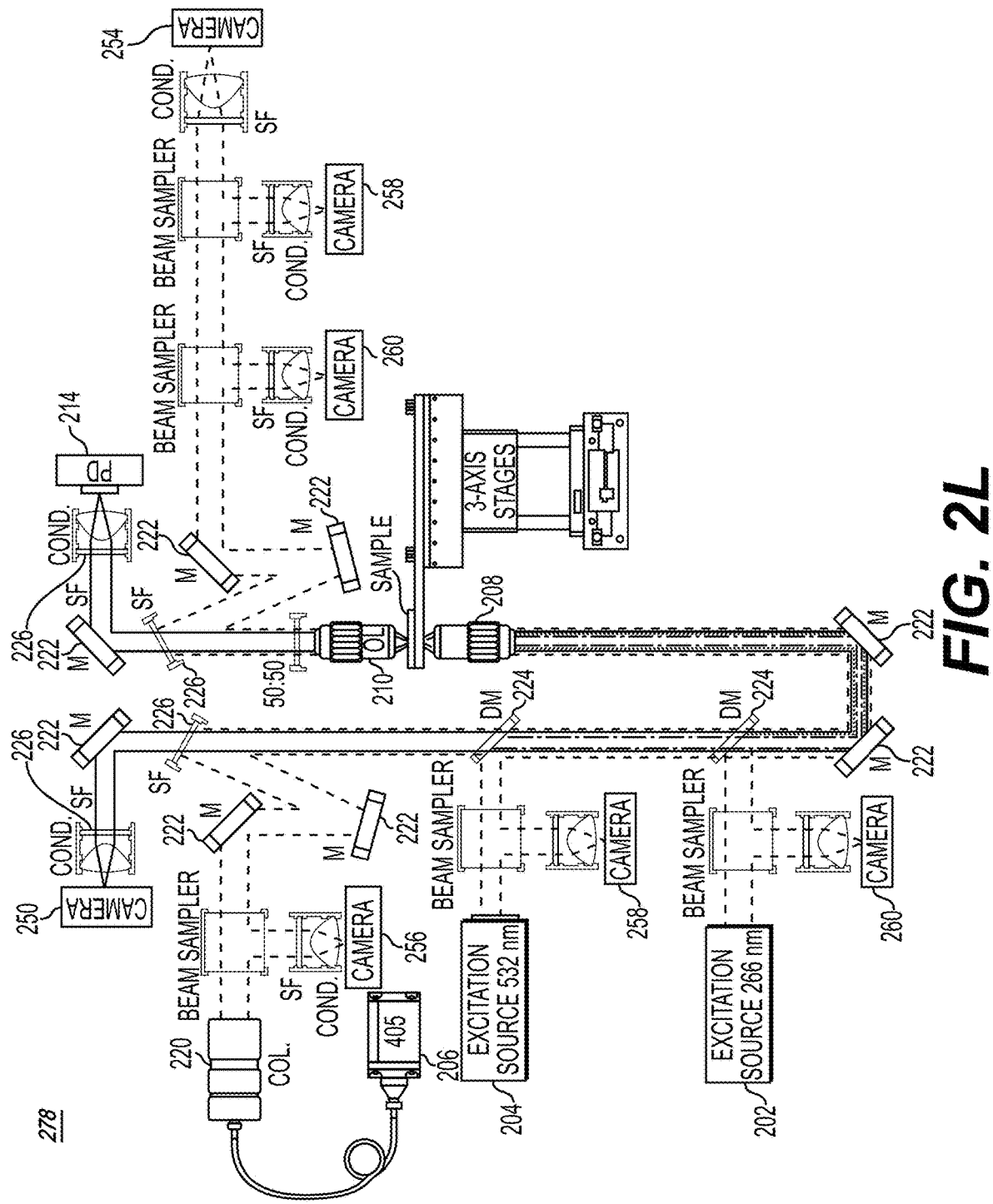
FIG. 2L shows another exemplary architecture for a multi-pass PARS detection system using camera based detectors, with additional measurement of transmitted and reflected excitation light.

FIG. 2L may be substantially similar to the architecture of FIG. 2C with additional components included and some components removed. In particular, FIG. 2L may replace photodetectors 212, 216, 218, 246, and 248 with cameras 254, 250, 256, 258, and 260 respectively. Thus, with these changes, FIG. 2L may be a camera based system.

Figure 2M:
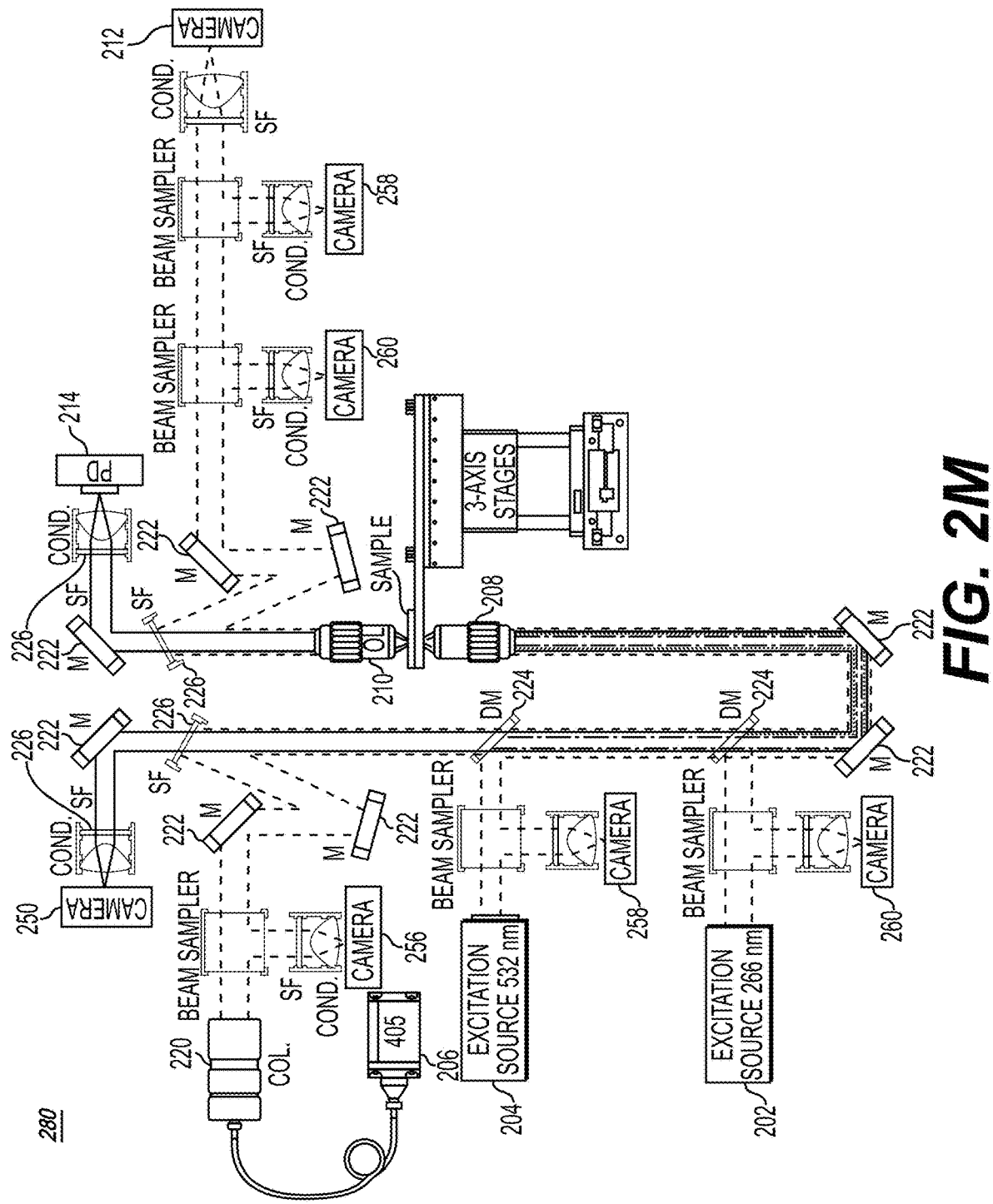
FIG. 2M shows another exemplary architecture for a PARS detection system using camera based detectors, with additional measurement of transmitted and reflected excitation light.

FIG. 2M may be substantially similar to the architecture of FIG. 2L with certain components excluded. In particular, FIG. 2M may exclude the 50:50 splitter, located between spectral filter 226 and objective lens 210. This exclusion removes the multi-pass capability.

FIG. 2E may be substantially similar to the architecture of FIG. 2B with the removal of components. In particular, all of the transmission components of FIG. 2B are removed in FIG. 2E. As such, FIG. 2E may be FIG. 2B when in reflection mode. Reflection mode may be considered the mode for the architecture when all light is inputted and collected from the same side of the sample. Therefore, no light is required to transmit through the specimen for measurement or imaging purposes.

FIG. 2F may be substantially similar to the architecture of FIG. 2C with the removal of components. In particular, all of the transmission components of FIG. 2C are removed in FIG. 2F. As such, FIG. 2F may be FIG. 2C when in reflection mode.

FIG. 2G may be substantially similar to the architecture of FIG. 2D with the removal of components. In particular, all of the transmission components of FIG. 2D are removed in FIG. 2G. As such, FIG. 2G may be FIG. 2D when in reflection mode.

Figure 3:
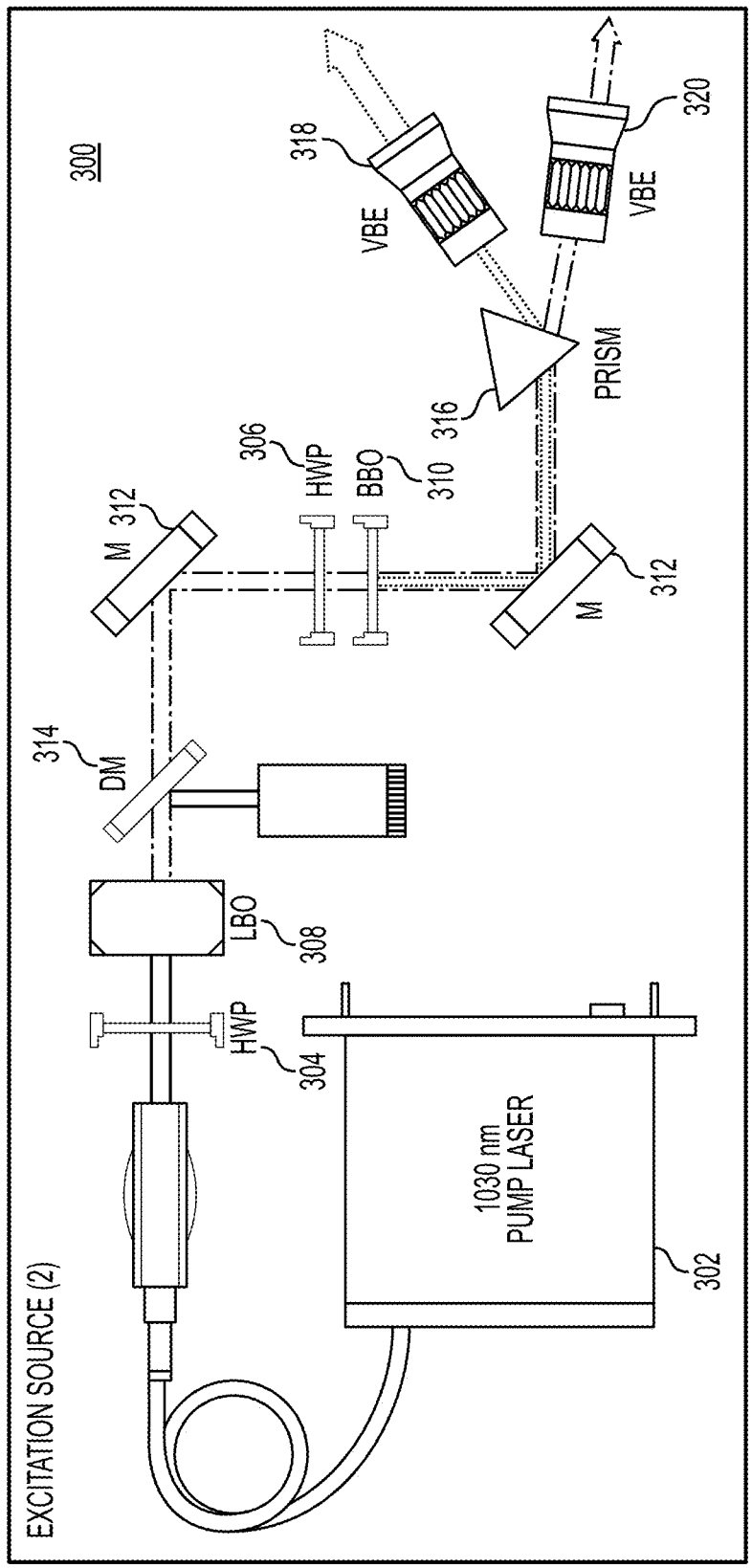
FIG. 3 shows an exemplary excitation source architecture for use in any of the PARS detection systems in FIGS. 2A-2M.

FIG. 3 shows an excitation source architecture 300 that may be used to generate the excitation sources 202, 204 in any of the excitation sources in FIGS. 2A-2M. The excitation source architecture 300 may include a pump laser 302 providing light at a specific wavelength (e.g., 1030 nm), one or more half-wave plates 304, 306, one or more optical crystals 308, 310 (e.g., lithium triborate (LBO) or beta-barium borate (BBO)), one or more mirrors 312 to guide the light from the pump laser 302, one or more dichroic mirrors 314 to guide the light from the pump laser 302, a prism 316, and two variable beam expanders 318, 320.

Pars Extraction Methods

Once an excitation event at an excitation location (e.g., location where excitation beam is focused) occurs, PARS systems of the present disclosure may collect all, substantially all, or a portion of the generated signals to extract information about the sample at the excitation location. For example, using one or more PARS signal extraction methods, PARS systems may extract information, such as one or more unique feature vector characteristics, at an excitation location of the sample. The extracted information (e.g., feature vector characteristic) may contain the absorption and/or scattering properties at the excitation location, more specifically at one or more-pixel locations within the excitation location. As a result, the extracted information (e.g., feature vector characteristic(s)) may contain details on sample composition, constituent biomolecules, etc. It will be appreciated that the PARS systems of the present disclosure may collect and/or extract a plurality of feature vector characteristics at multiple excitation locations across an entire tissue sample/specimen.

Each PARS Data Vector will contain 'n' PARS features, as decided by the user or control algorithm. The feature vector can contain any number of extracted signals such as the Signal Energy, Total Non-Radiative or Radiative Energy, Total Absorption, Quantum Efficiency Ratio, Absorption Differentials, Relative Relaxation Fractions, Time-Domain Signal Features, Blind Clustering/Dimension Reduction, Isolated Non-Radiative Initial Temperature and Pressure Signals, Filter Bank/Frequency Based Extractions. These measurements may be extracted at any wavelength or combination of wavelengths. The feature vector may also contain any number of secondary measurements extracted as different combinations, calculations, or ratios of the primary features. An example of a secondary measurement may include the difference between the quantum efficiency ratios (QER) at two different excitation wavelengths. In total, the PARS feature vector may contain any information which is collected and extracted from each PARS event.

Feature vectors may then be used at a pixel level, or in aggregate, to analyze aspects of samples. In one example, PARS feature vectors may be correlated at a pixel level against a ground truth (e.g., histochemical or immunohistochemical staining). This may provide a one-to-one mapping between PARS Data vectors and different histochemical stains, or their underlying biomolecule targets. This process allows for a PARS "signature/fingerprint" or ground truth PARS data vector to be calculated for a given biomolecule or mixture of biomolecules. Alternatively, PARS vectors may be analyzed in aggregate, where the distribution of vectors within a sample may be indicative of underlying diagnostic characteristics of the specimen, such as malignancy, tumor grade, molecular expression, etc.

PARS systems of the present disclosure may further process the extracted information to form a visualization, such as an image. In examples where the visualization is an image, the image may be a digital image, such as a raster image (e.g., JPEG, PNG, BMP, GIF, etc.) including a plurality of pixels or one or more sets of pixels. As used herein, the term "pixel" refers to the smallest addressable element in an image. In these cases, the PARS system may assign to a pixel a portion of the information, such as a feature vector characteristic, extracted from the signals generated at a single excitation location. In some cases, the location of the pixel (i.e., pixel location) corresponds to a unique portion of the excitation location. In cases where the visualization include one or more sets of pixels, a single set of pixels may correspond to all or substantially all of the information extracted from the signals generated at single excitation location of the sample. That is, a visualization may contain all or substantially of the information extracted from signals generated at a single excitation location or at multiple excitation locations. In some cases, a visualization may contain all or substantially of the information extracted from signals generated at multiple excitation locations, which may span across all or substantially all of the sample.

In some examples, a visualization may then be used directly for histological diagnostics or may be used in conjunction with other tools such as AI, to perform diagnostics, or to generate more advanced colorizations. For example, in cases where the extracted information includes absorption and/or scattering properties, the absorption and/or scattering properties at a pixel location may be further assigned one or more values, such as color and/or intensity values, corresponding to a color space. The color space may be RGB, YCbCr, CIELAB, SRGB, YPbPr, scRGB, HSV, CMYK, or any other color space known. These color and/or intensity values may be calculated using one or more PARS signal extraction methods. In some examples, PARS systems may include one or more processors configured to extract information from generated signals, to process extracted information, and/or to form visualizations as discussed above.

The PARS signal extraction methods of the present disclosure may be any of the signal extraction methods, signal processing methods, and/or signal collection methods described in U.S. application Ser. No. 17/010,500 filed Aug. 5, 2021 (titled Pars imaging methods) and Patent Cooperation Treaty Application No. PCT/IB2021/055380 filed May 12, 2022 (titled Photoabsorption remote sensing (pars) imaging methods), each of which are incorporated by reference herein. The PARS signal extraction methods may be used for both the radiative and non-radiative channels. It will be appreciated that each PARS signal may be extracted in several different ways to capture different salient details of the signal, or the time evolving signal may be used in its entirety. The following PARS signal extraction methods may be used in a PARS system.

1. Signal Energy

Figure 4:
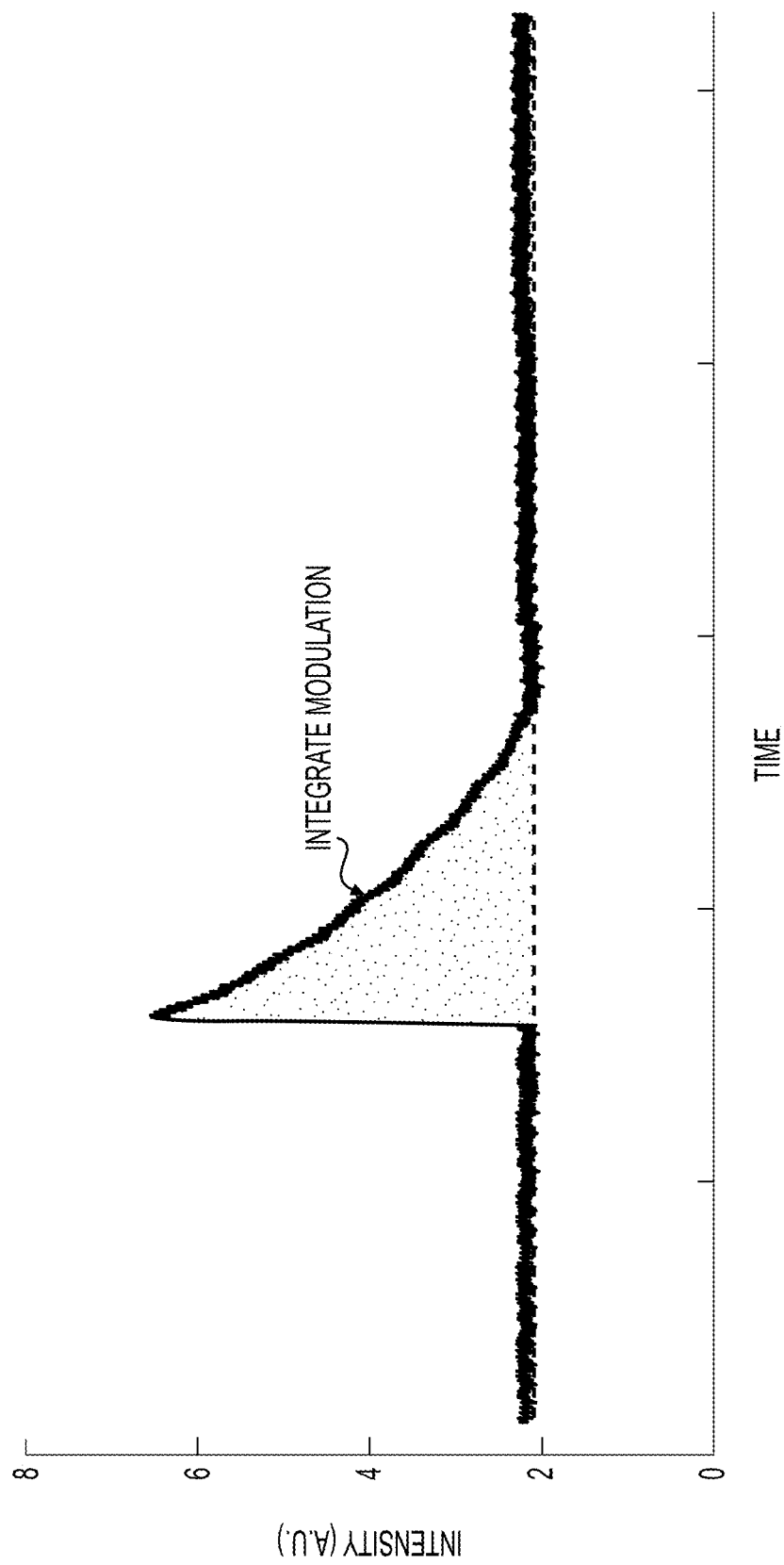
FIG. 4 shows a graph of the signal energy measurement process.

A PARS signal extraction method may be a signal energy measurement process. In this process, to determine the total level of absorbed energy at a given pixel location, the process determines the integral of the modulation in the time domain signals (FIG. 4). The DC value of the signal (the intensity prior to excitation) is calculated and subtracted from the signal. Then, the remaining modulation is integrated to calculate the highlighted area shown in FIG. 4. That is, the integral of the modulation in the signal is extracted independent of the DC offset of the signal. Higher absorption will result in larger and longer modulations corresponding to a larger integral. This is a simple and fast method which is robust to additive noise. This method may be directly applied to any of the generated radiative or non-radiative signals to capture an estimate of the total absorption level.

This method may be further enhanced by applying denoising/filtering prior to extracting the integral. For example, matched filtering (e.g., based on k-means extraction) may be used to extract the total signal energy. This technique is designed to optimally filter the signal based on the expected time-domain shape. This provides a robust noise-resistant method for determining absorption amplitude or pixel "brightness."

2. Total Non-Radiative or Radiative Energy

Figure 5:
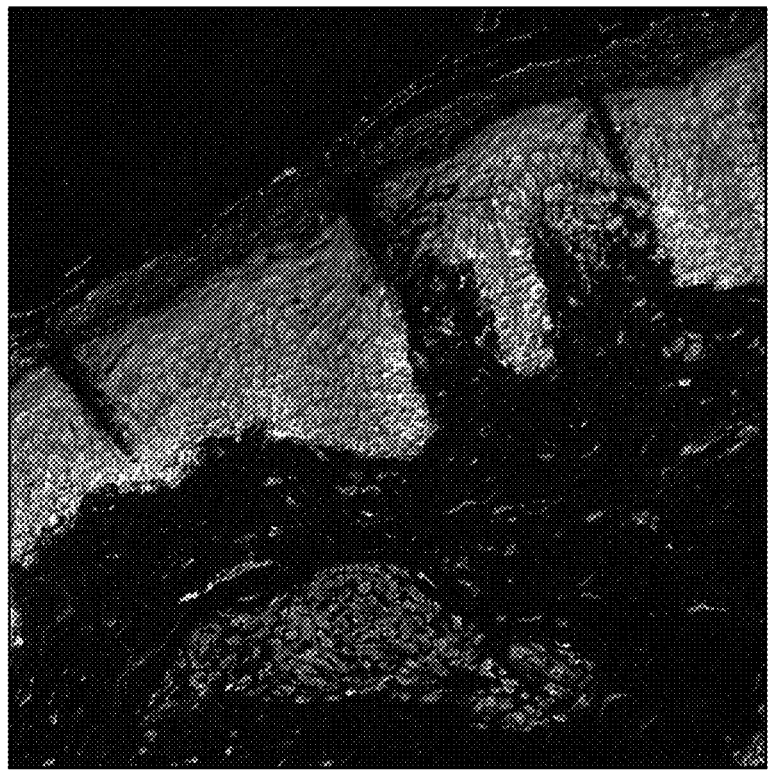
FIG. 5 shows a total non-radiative absorption PARS image captured using a 266 nm excitation source and a 532 nm excitation source.
Figure 6:
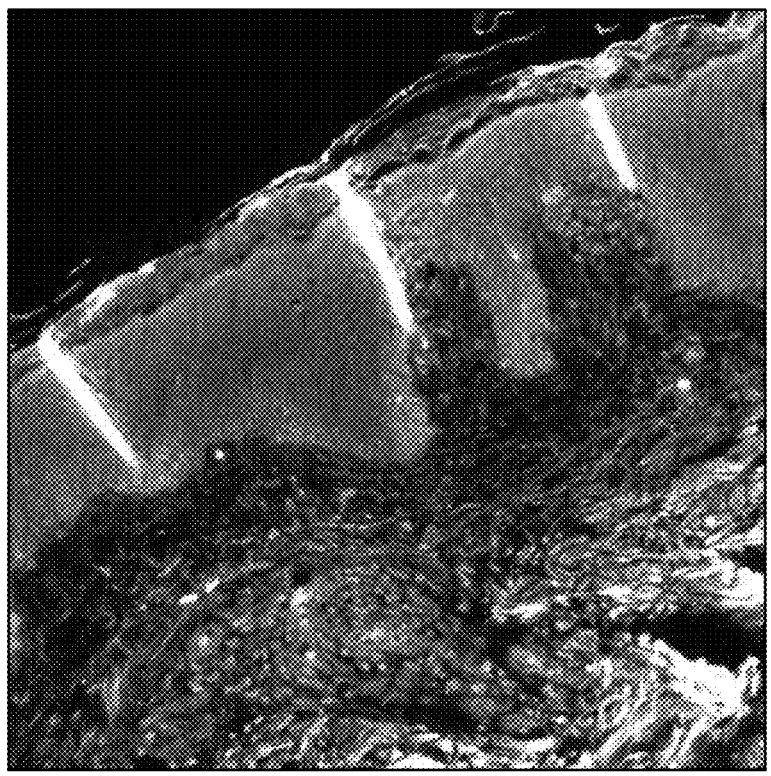
FIG. 6 shows a total radiative absorption PARS image captured using a 266 nm excitation source and a 532 nm excitation source.

In PARS architectures and systems that use multiple excitation sources at different wavelengths, there will be a radiative and non-radiative absorption measurement (e.g., extractable information) for each wavelength. That is, by isolating the generated signals by wavelength, the PARS system may extract and/or collect a radiative and non-radiative absorption measurement for each wavelength at an excitation location. Accordingly, it may be advantageous to view the combined radiative or non-radiative relaxation energy across all wavelengths. For example, example images illustrating the total radiative and non-radiative energy are presented in FIG. 5 and FIG. 6, respectively.

3. Total Absorption

By capturing both the radiative and non-radiative absorption fractions (e.g., extractable information) at an excitation location, the PARS architectures and systems may facilitate enhanced visualizations. Unlike traditional modalities which independently capture some of the radiative or non-radiative absorption, in PARS, the contrast may not be bound by efficiency factors such as the photothermal conversion efficiency or fluorescence quantum yield. Hence, PARS may provide enhanced sensitivity to any range of chromophores. The total absorption $TA(\lambda)$ for any excitation wavelength can be calculated as the sum of the absorption magnitude of all radiative absorption signals ($P_r(\lambda)$) and non-radiative absorption signals ($P_{nr}(\lambda)$).

$$TA(\lambda) = P_r(\lambda) + P_{nr}(\lambda)$$

Figure 7:
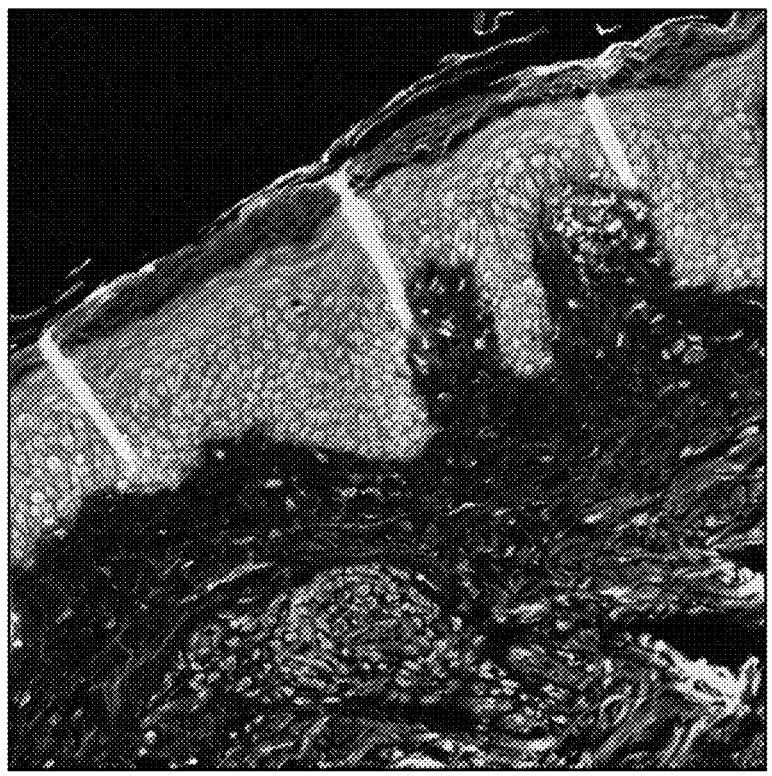
FIG. 7 shows a total absorption PARS image captured using a 266 nm excitation source.
Figure 8:
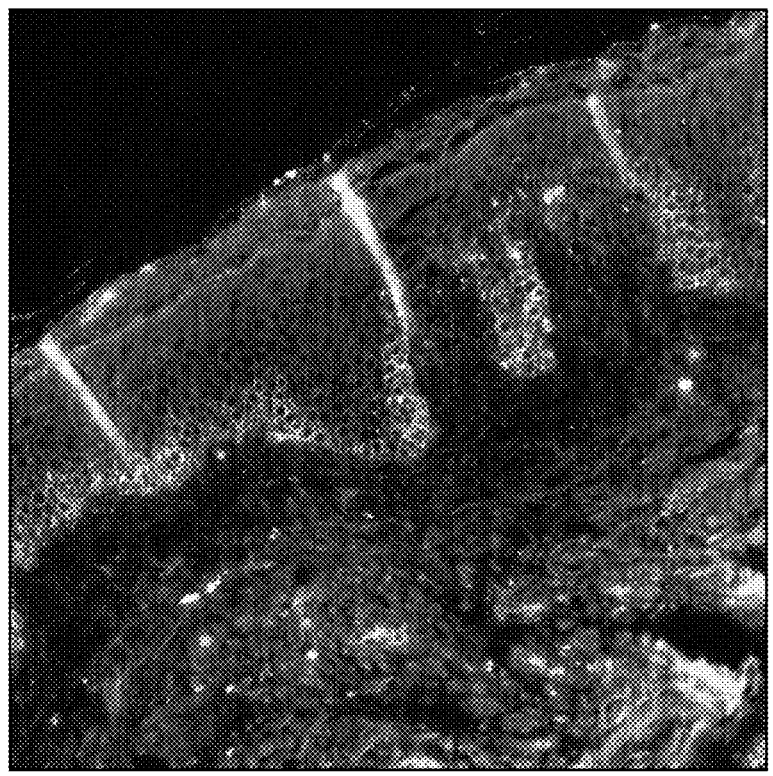
FIG. 8 shows a total absorption PARS image captured using a 532 nm excitation source.

An example total absorption image captured using a 266 nm excitation source is shown in FIG. 7, and another example total absorption image captured using a 532 nm excitation source is shown in FIG. 8.

Figure 9:
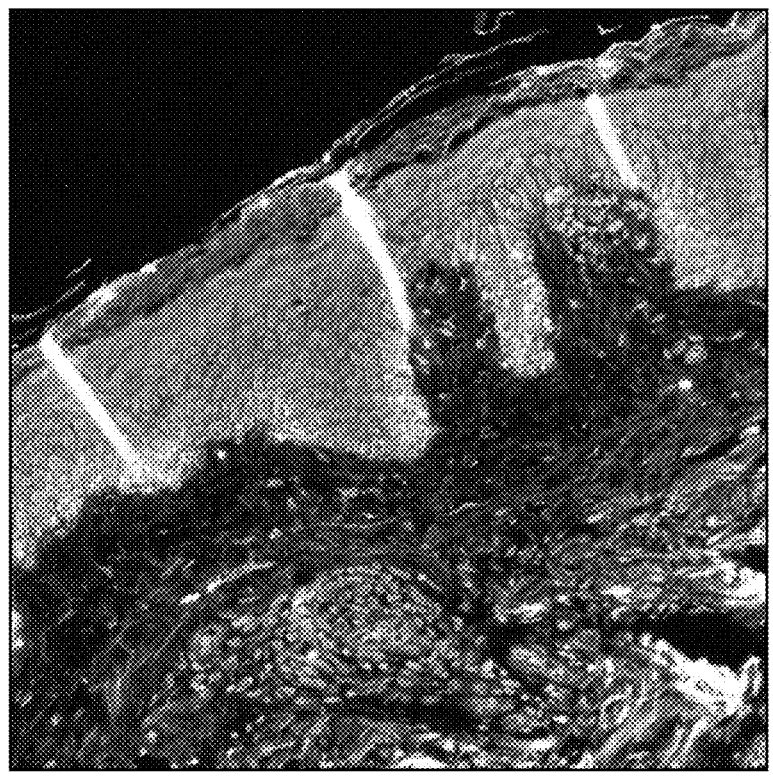
FIG. 9 shows a total absorption PARS image captured using a 266 nm excitation source and a 532 nm excitation source.
Figure 10:
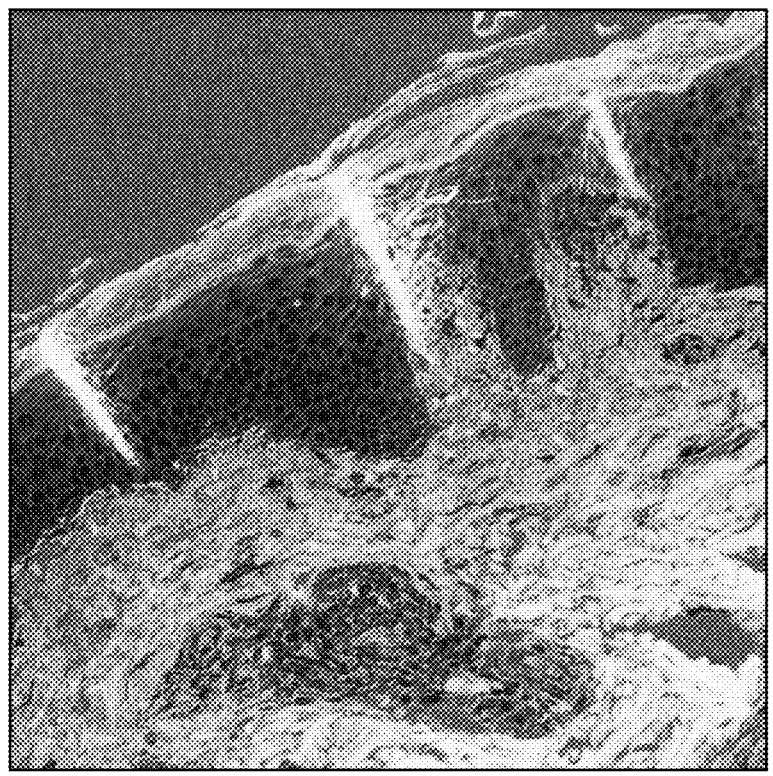

The Total-Absorption may also be calculated across several wavelengths. For example, an analogous total absorption can be calculated for both the 266 nm and the 532 nm excitation. This is equivalent to the sum of the independent Total-Absorption characteristics of each wavelength. An example image including both the 266 nm and the 532 nm radiative and non-radiative relaxation effects is shown in FIG. 9. As shown, FIGS. 7-9 capture the total interaction. In other words, this modality can capture effects simultaneously.

4. Quantum Efficiency Ratio

Once information is extracted from signals generated at an excitation location, the PARS system may extract/collect additional biomolecule specific details from the extracted information. For example, additional biomolecule specific details may be extracted based on the proportional radiative and non-radiative relaxation characteristics. Different biomolecules may exhibit stronger radiative or non-radiative relaxation tendencies. This is dictated by known unique material properties, such as the fluorescence quantum efficiency. Hence, additional biomolecule specific details may be further extracted from the relative proportion of the radiative and non-radiative absorption fractions. This is presented as the quantum efficiency ratio or QER, which is calculated as follows:

$$QER(\lambda) = \frac{P_r(\lambda) - P_{nr}(\lambda)}{TA(\lambda)}$$

Figure 10:
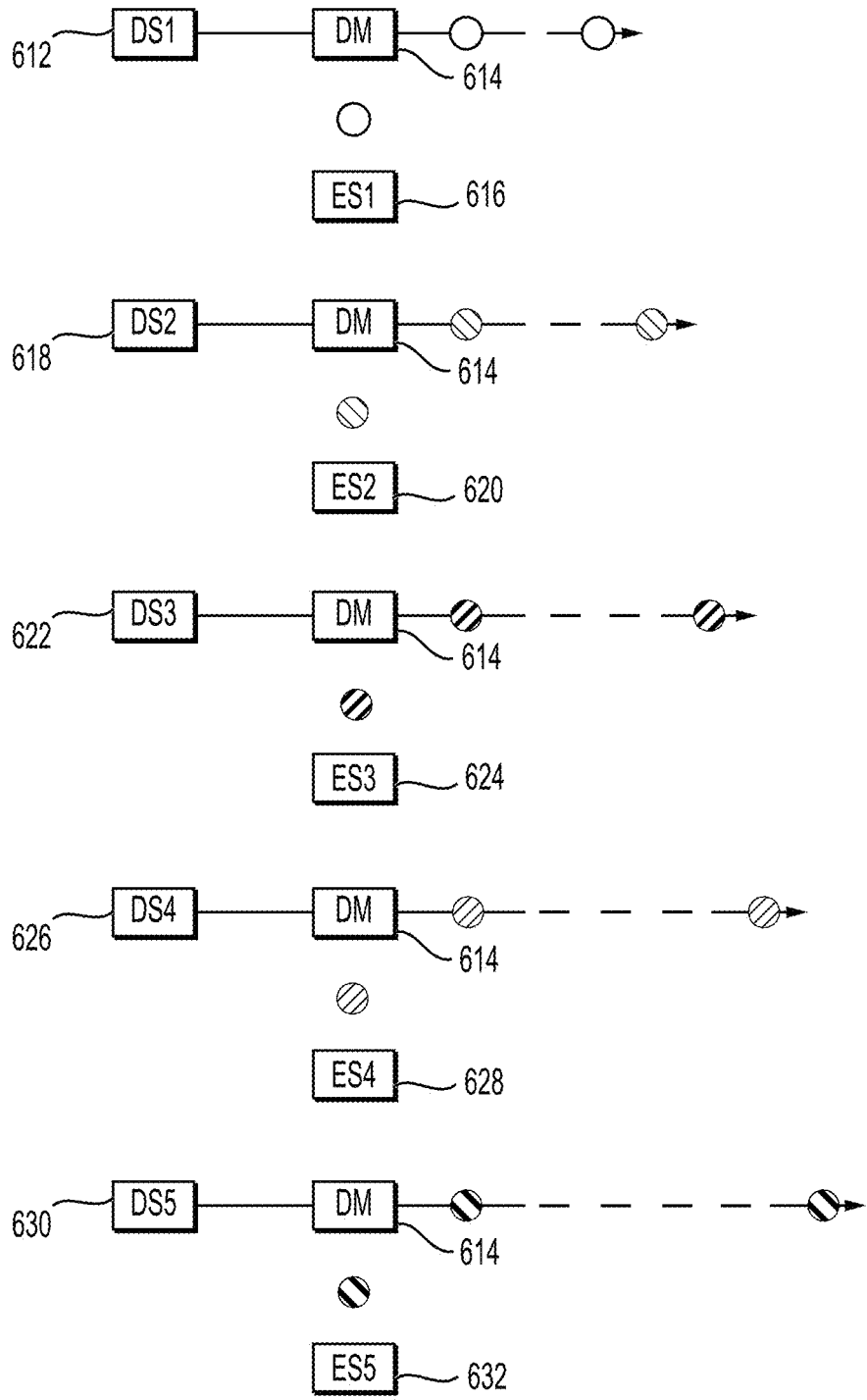
FIG. 10 shows a quantum efficiency ratio PARS image captured using a 266 nm excitation source.
Figure 11:
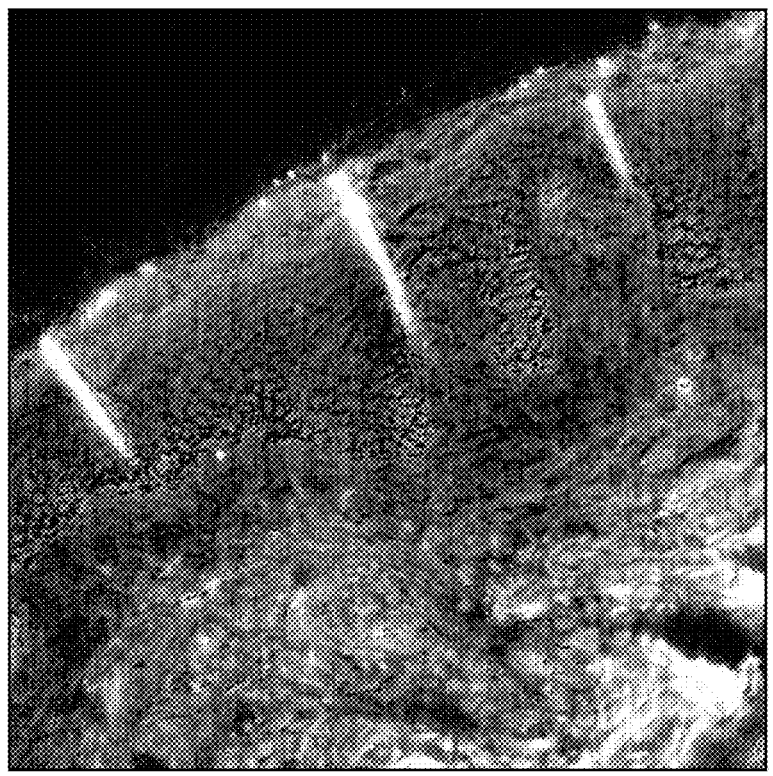
FIG. 11 shows a quantum efficiency ratio PARS image captured using a 532 nm excitation source.

In a PARS system, this may be performed at any given excitation wavelength. An example image is shown in FIG. 10 for a PARS system using 266 nm excitation, and an example image is shown in FIG. 11 for a PARS system using 532 nm excitation.

Figure 12:
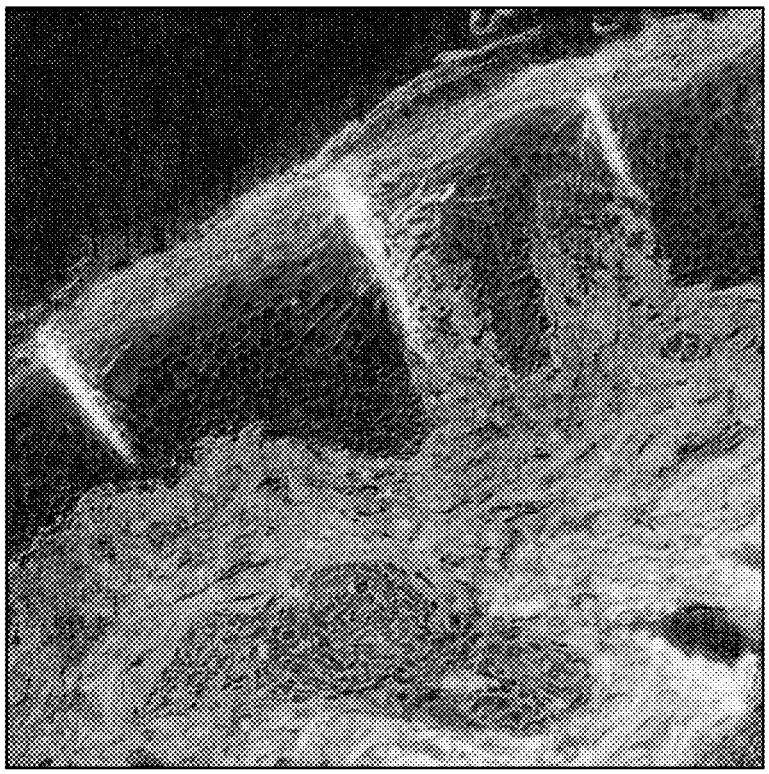
FIG. 12 shows a quantum efficiency ratio PARS image captured using a 266 nm excitation source and a 532 nm excitation source.

The QER can also be calculated across several wavelengths. For example, an analogous QER can be calculated for both the 266 nm and the 532 nm excitation. An example image generated by a PARS system using both 266 nm and 532 excitation is shown in FIG. 12.

Figure 13:
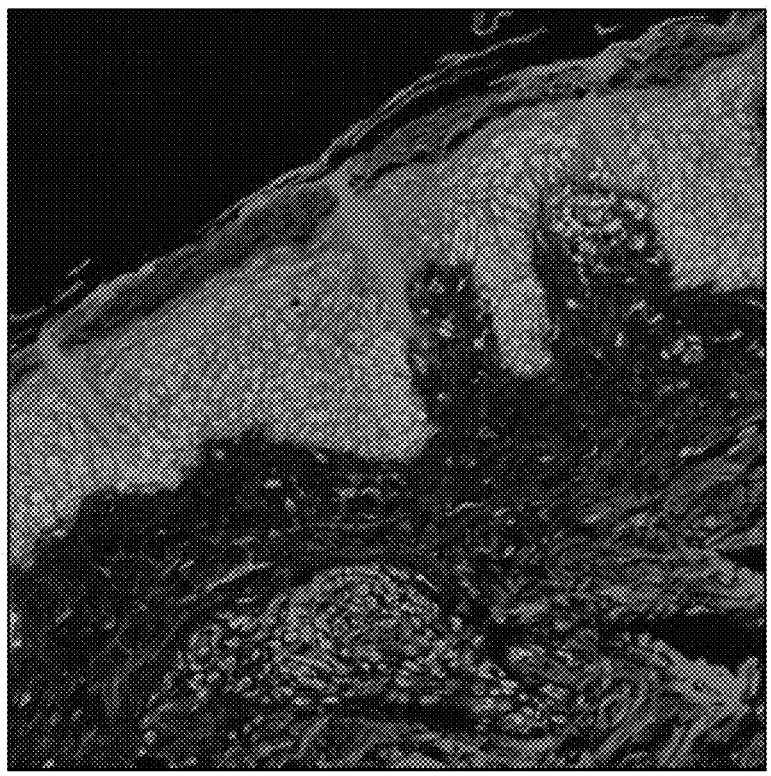
FIG. 13 shows a quantum efficiency ratio PARS image, with total-absorption based colorization, captured using a 266 nm excitation source and a 532 nm excitation source.

The QER can then be used in combination with other aspects to produce useful visualizations, such as a colorization. For example, in a PARS system using both 266 nm and 532 nm excitation. The QER may be combined with the Total-Absorption, as shown in FIG. 13. In this example, the QER is used to define the color of the image, while the total absorption is used to define the intensity. In this case, the QER is scaled between [0, 1] and used to define the Hue value of an HSV color space. Concurrently, the Total-Absorption is scaled between [0, 1] and used to define the Saturation and Value. Hence, in this example, the color of each pixel (from the QER) may provide detail on the type of biomolecule at a given pixel, while the brightness (from the total absorption) may provide some information on the concentration of the biomolecule. Similar approaches could be envisioned using any other color space, such as YCbCr, Lab, RGB, etc., where the intensity is defined by the Total Absorption, while the color is defined by the QER. The PARS system may be configured to generate a combined QER-Total Absorption image.

5. Absorption Differentials

Once information is extracted from signals generated at an excitation location, the PARS system may further process the extracted information, such as by assigning color values to the extracted information. For example, when excitation sources having different wavelengths are used in a PARS system, any two (or more) absorption characteristics may be observed comparatively using an absorption differential visualization. This visualization provides a method to assess the relative difference in absorption intensity of each pixel location of an excitation location for a given wavelength. The absorption differential of two wavelengths is calculated:

$$S_{Diff} = \frac{(s_1 - s_2)}{(s_1 + s_2)},$$

where, $S_1$ is the absorption signal (radiative or non-radiative) at a given wavelength, while $S_2$ is the corresponding radiative or non-radiative absorption signal at a second wavelength. Assessing the difference in absorption between two wavelengths may provide noticeable enhancement in the separability of different biomolecules when compared to observing the independent, or combined absorption.

Figure 14:
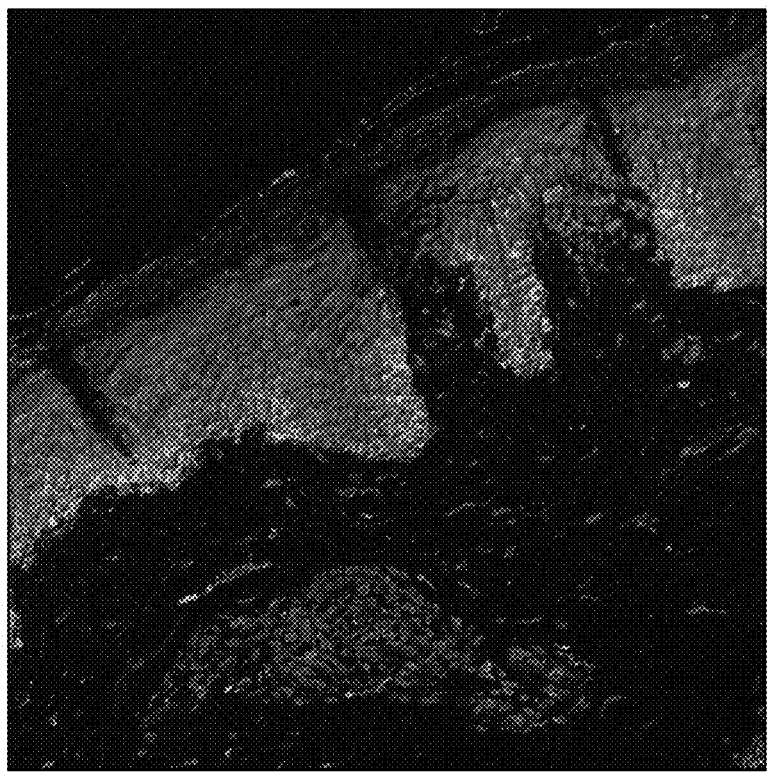
FIG. 14 is an image showing the differential absorption contrast extracted from non-radiative absorption PARS signals captured using a 266 nm excitation source and a 532 nm excitation source.
Figure 15:
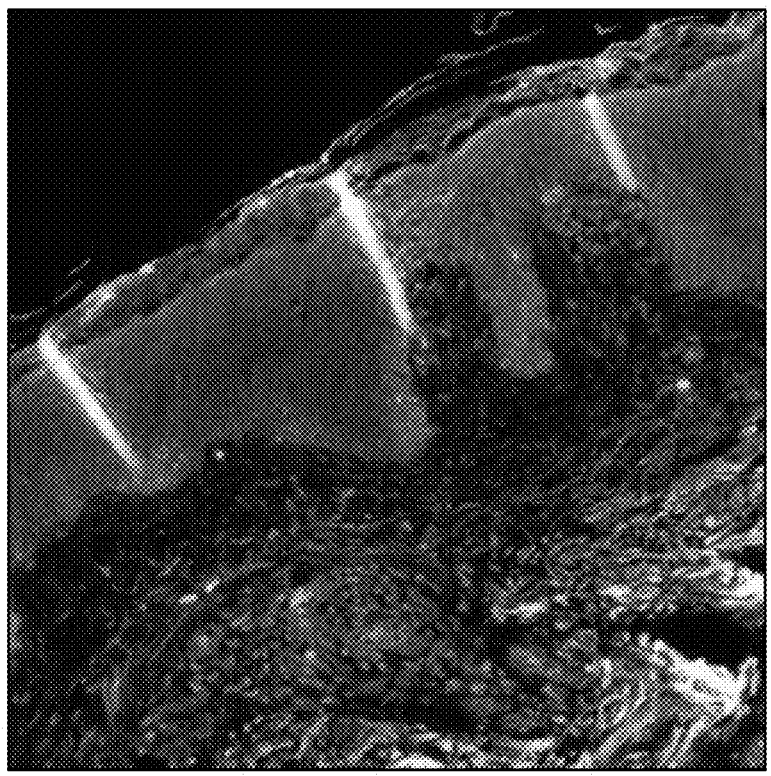
FIG. 15 is an image showing the differential absorption contrast extracted from radiative absorption PARS signals captured using a 266 nm excitation source and a 532 nm excitation source.

This method may be applied to images, as shown in FIGS. 14-15, where a color map was assigned according to the absorption differential value. Red indicates stronger 266 nm absorption, while blue indicates stronger 532 nm absorption. The non-radiative differential contrast image is shown in FIG. 14, while the radiative differential contrast image is shown in FIG. 15.

6. Relative Relaxation Fractions

In some examples, extracted radiative or non-radiative absorption properties, or different combinations therein may be represented as a fraction of the total absorption. This allows for the proportional absorption at each wavelength to be assessed independent of the concentration of the biomolecule in each area. Moreover, it may allow for easier comparison between the signals captured at different wavelengths. For example, the non-radiative signal at a single wavelength may be represented as a fraction or percentage of the total non-radiative relaxation. In another example, the non-radiative relaxation at a single wavelength may be represented as a fraction or percentage of the total absorption (including the radiative and non-radiative relaxation).

A radiative relaxation signal is a spectra of emissions. This emission spectra may uniquely relate to the excited biomolecule. In other words, for a given excitation wavelength, two distinct biomolecules may be expected to exhibit different spectral emissions. If the spectral differences are significant, it may help better separate the two biomolecules.

7. Time-Domain Signal Features

Additional PARS contrast lies within the time evolution of the PARS signals. Significant information on the sample's biomolecule constituents may be encoded the various time-domain signals. Unique features may be accessed in the signal frequencies, rise times, fall time, amplitudes etc. That is, by measuring these features, the PARS system may then collect and/or extract further information (e.g., chromophore specific information) from a single excitation event. For example, this may enable chromophore unmixing (e.g. detect, separate, or otherwise discretize constituent species and/or subspecies) from a limited number of excitation events.

In some examples, the shape of the non-radiative PARS signal depends on the evolution of the pressure and temperature induced variations within the sample. In these examples, subsequently, the shape of the time-evolving modulation captures detail on local material properties. On shorter time scales, the signal decay rate may be correlated to the material's speed of sound. On longer time scales, the signal decay rate may be correlated to the thermal propagation speed. Additionally, the signal decay rate may be correlated to different speeds if shear waves are generated. The rise time of the signal can also provide additional information regarding mechanical properties (e.g., speed of sound). This means that PARS time domain signals may capture properties, such as the thermal diffusivity, conductivity, speed of sound, density, heat capacity, and acoustic impedance, which may be extracted and collected by the PARS system in further processing.

Analogous material specific features may be encoded in the time evolution of the PARS radiative modulations. As with the non-radiative signals, the radiative signal time domain shape is dictated by material properties. For example, if the fluorescence signal is isolated from the radiative relaxation, the time resolved fluorescence lifetime may be captured. The fluorescence lifetime is a biomolecule specific property, which can be used to directly identify biomolecule constituents.

These time-evolving signals may be decomposed into measurably unique (e.g., in amplitude or magnitude and/or evolution time) characteristic features. This wealth of information may then be used for improving available contrast, providing additional multiplexing capabilities, and providing characteristic molecular signatures of constituent chromophores. Several methods can be used to capture features indicative of material properties from the time domain signals. Methods may include techniques such as principal component analysis, Fourier analysis, frequency decomposition, principal component of Fourier analysis, fitting methods, k-means methods, or wavelet extraction methods. These methods may be applicable to both the radiative and non-radiative time domain signals. Any information or characteristics extracted from the time domain signals may be included in the PARS data vector as additional information which may be used to enhance the data for further analysis.

8. Blind Clustering/Dimension Reduction

In some examples, to collect or extract further information, PARS system may use blind clustering and/or dimensionality reduction methods to compress time domain signals into fewer representative features, such as to identify time domain features that relate to underlying sample characteristics. Some examples of potential approaches include, k-means clustering, principal component analysis, principal linear components decomposition, or other signal decomposition methods. Alternatively, intelligent AI based clustering methods may be used. The advantage of these blind approaches is they require no prior information on the signals. This may ease processing when samples, such as specimens, are complex and may have numerous time domain features to leverage.

If implemented correctly, clustering may identify signal features which capture material-specific information of the underlying specimen, such as the thermal diffusivity, conductivity, speed of sound, density, heat capacity, and acoustic impedance. These feature intensities may then be extracted and used directly. Alternatively, extracted feature intensities may be used with further processing to produce unique visualizations.

Figure 16B:
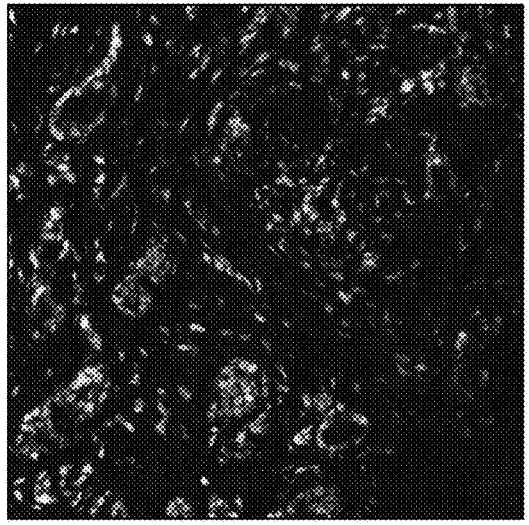
FIGS. 16A-D are a collection of images and accompanying graph, showing the k-means feature extraction method applied to a thin section of preserved human breast tissues.
Figure 16D:
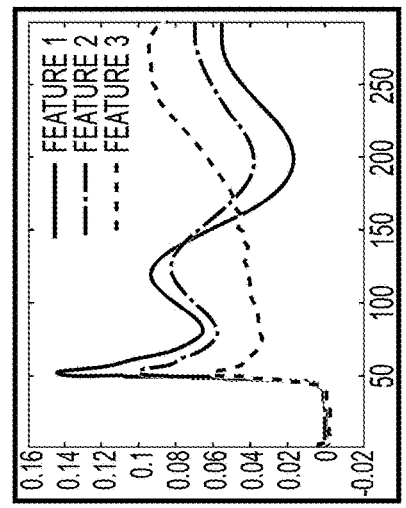
Figure 16A:
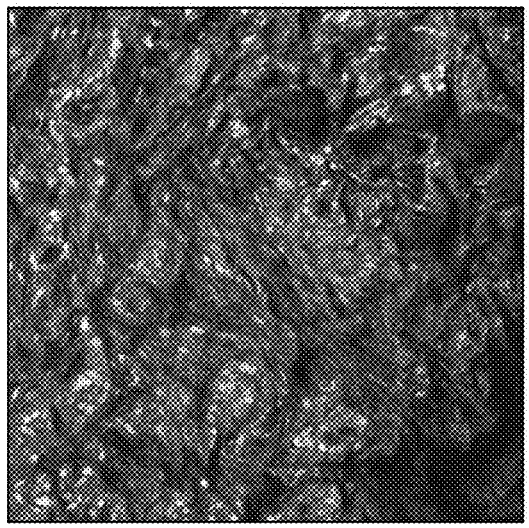
Figure 16C:
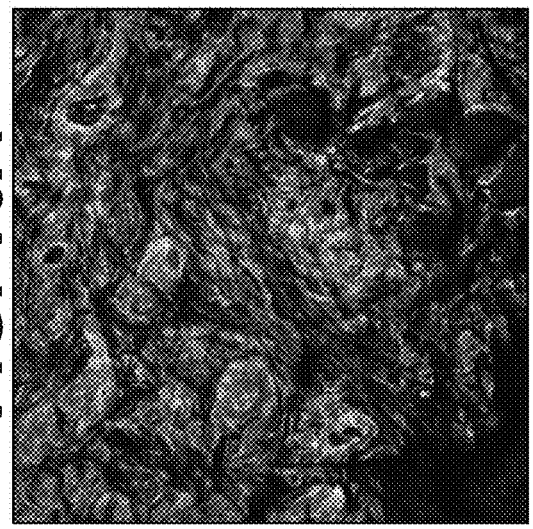

For example, a specialized K-Means clustering method may be used to extract/collect signal features from generated time domain signals at an excitation location, as shown in FIGS. 16A-D. FIGS. 16A-C show a k-means feature extraction applied to a thin section of preserved human breast tissues. In this example, a UV excitation (e.g., 266 nm) may target several biomolecules, such as collagen, elastin, myelin, DNA, and RNA while FIG. 16D is a graph showing the feature extractions of FIGS. 16A-C. As shown, the feature intensity from present in each time domain is shown along with the corresponding features within the time domain signal. Subsequently, clustering may be used to identify three unique time domain features. The intensity or prevalence of each feature may be extracted from the time domains and presented in the corresponding feature representations, e.g., feature 1 (FIG. 16A), feature 2 (FIG. 16B), feature 3 (FIG. 16C).

Figure 17:
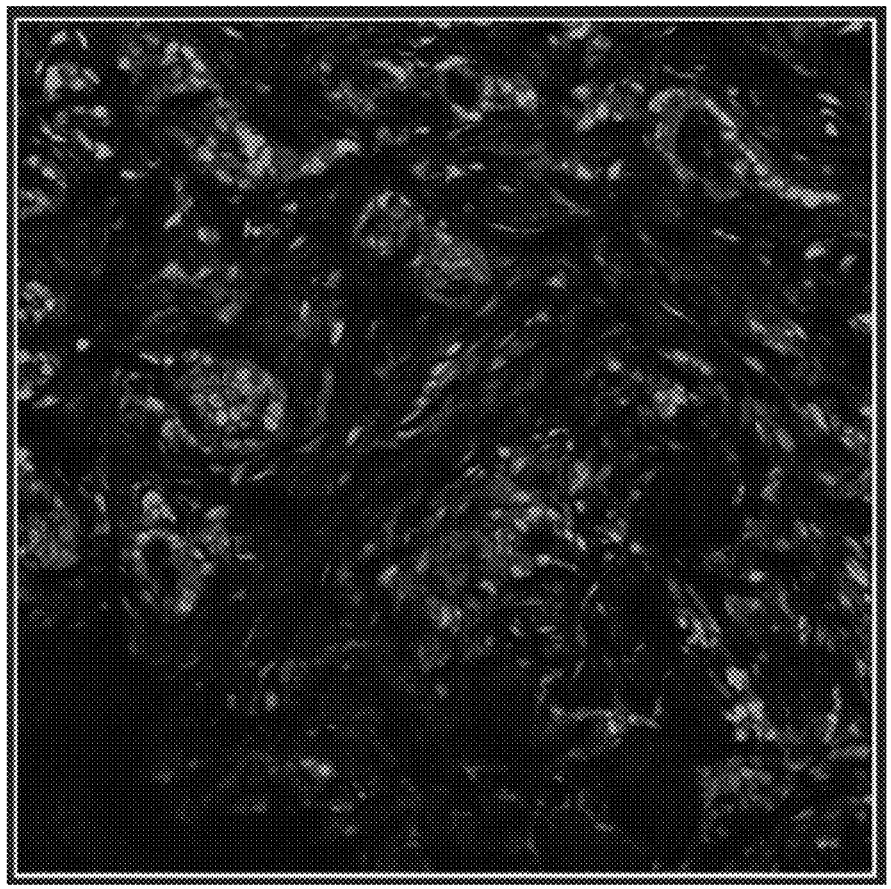
FIG. 17 shows a colorized image generated from combining the different feature intensities extracted and presented in FIGS. 16A-C.

The extracted feature specific images may then be used for further processing or may be viewed directly. In one example, such as when further processed, each pixel may be assigned a color value based on the extracted feature intensities, as shown in FIGS. 16A-C. In another example, each of the feature images from FIGS. 16A-C may be assigned to one of the red, green, or blue (RGB) channels to generate a colorized image, as shown in FIG. 17. Subsequently each pixel's color and intensity may be described by the proportional presence of the 3 features in the time domain signal. In this example, the nuclei (which may appear as a first color; green in this example) are unmixed from the surrounding connective tissues (which may appear as a second color; blue/purple in this example).

Figure 18:
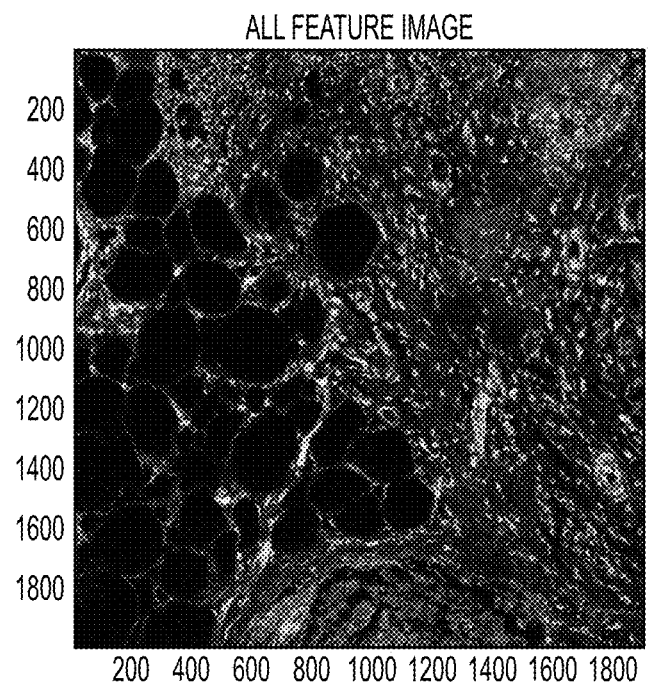
FIG. 18 is an image showing an alternative feature colorization using two k-means features and a signal energy feature (extracted using the signal energy feature extraction method).

In another example, extracted time domain characteristics may be used in conjunction with other PARS features to form visualizations, such as colorizations, as shown in FIG. 18. In these examples, two features may be further extracted (e.g., additional processing) by the PARS system using the K-means method. Any color space (e.g., RGB, YCbCr, CIELAB, sRGB, YPbPr, scRGB, HSV, CMYK, etc.) may be used to form the colorizations from these features. For example, in the YCbCr color space, the color value of each pixel (i.e., chrominance-blue (Cb) and chrominance-red (Cr) channels) is defined by the presence of the features extracted using the K-means method. Concurrently, the intensity value of the color (i.e., the luma (Y)) channel is assigned based on the energy of the PARS non-radiative signals. That is, a color value assigned to a pixel may be determined from extracted features (e.g., k-means features), while the intensity of the color may be determined by the amount of the absorbed energy. In this example, the measurements are scaled on the range of [0, 1] to leverage the full range of the YCbCr color mapping. As shown in FIG. 18, nuclei, for example, may appear in one color (white), while the connective tissues appear in different colors (shades of blue and orange) depending on the signal composition. That is, white color represent a color value of 235, 128, 128 and an intensity range of 16-235 depending on the intensity at a specific pixel, black to white, while the exemplary shades of blue and orange represent a color value of X, 16, 240 and X, 220, 36 respectively and an intensity range of 16-235. In some cases, it may be desired to convert the color value and/or intensity value of each pixel in the YCbCr color space to other color spaces, such as RGB color space. It will be appreciated that the blind clustering and/or dimensionality reduction methods may aid in highlighting the proportional time-domain feature presence independent of biomolecule concentration.

9. Isolation of Non-Radiative Initial Temperature and Pressure Signals

As discussed previously, in PARS, the initial non-radiative signal is attributed to the pressure (photoacoustic signals) and temperature (photothermal signals) induced modulations in the specimen's local material properties. While heat is always deposited, photoacoustic pressure might only be generated under specific conditions. In the case that the pressure is generated, the initial pressure and temperature signals may be isolated and assessed independently.

In cases where the non-radiative signals are captured as amplitude modulations of the co-focused detection source, in most samples/specimens, the pressure induced modulation, as dictated by the speed of sound, is expected to be orders of magnitude faster and higher than the thermal modulation, as dictated by thermal conductivity. For example, photothermal signals used to generate an image of the specimen may be measured within 500 ms of the excitation event while photoacoustic signals used to generate an image of the specimen may be measured within 500 ns of the excitation event. More generally, temperature (e.g., photothermal signals) can be measured as soon as the pressure (e.g., photoacoustic signals) exits the area. This may correlate to measuring temperature in the range of us to ms (e.g., 1 us to 500 ms) and pressure in the range of ps to ns or more (e.g., 1 ps to 500 ms). The decay may occur over us to ms, but it is contemplated in the present disclosure to be able to measure faster. Temperature effects may happen faster than the given range in certain instances (e.g., metal samples). This is further explained below.

Figure 19:
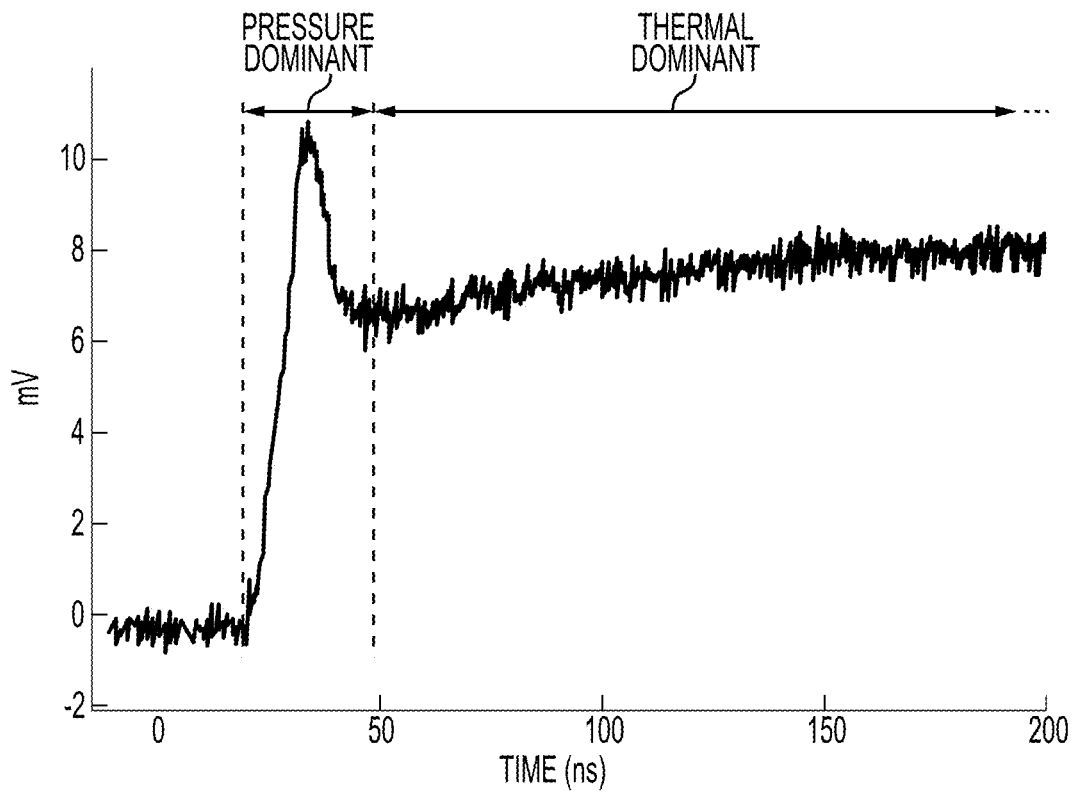
FIG. 19 shows a graph of the PARS non-radiative pressure (photoacoustic signals) and temperature (photothermal signals) induced modulations generated in the local optical properties of a sample.
Figure 20A:
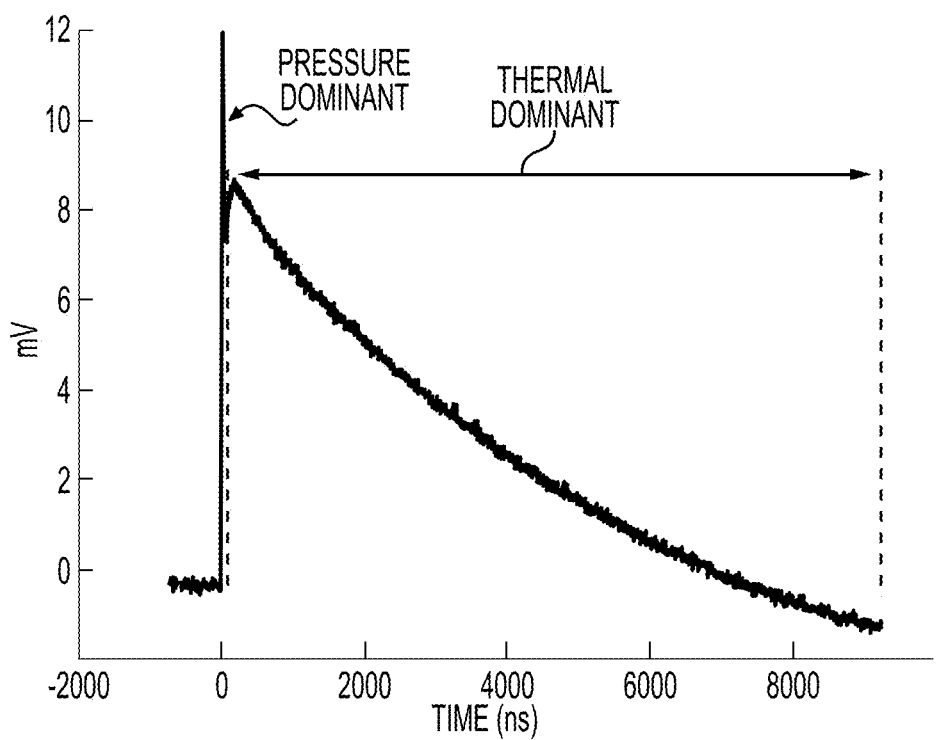
FIG. 20A shows another graph of the PARS non-radiative pressure (photoacoustic signals) and temperature (photothermal signals) induced modulations generated in the local optical properties of a sample.
Figure 20B:
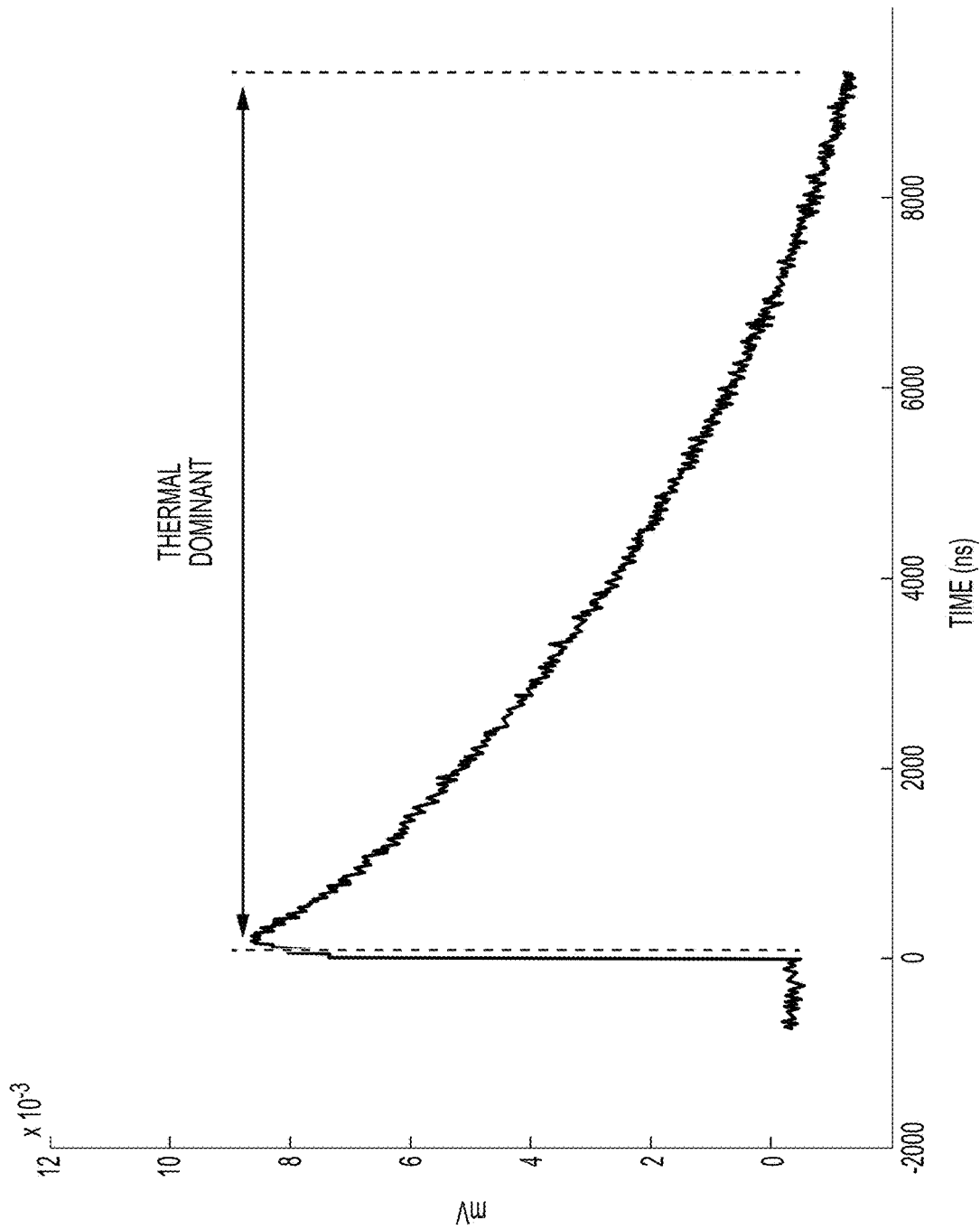
FIG. 20B shows another graph of the PARS non-radiative pressure (photoacoustic signals) and temperature (photothermal signals) induced modulations generated in the local optical properties of a sample.
Figure 20C:
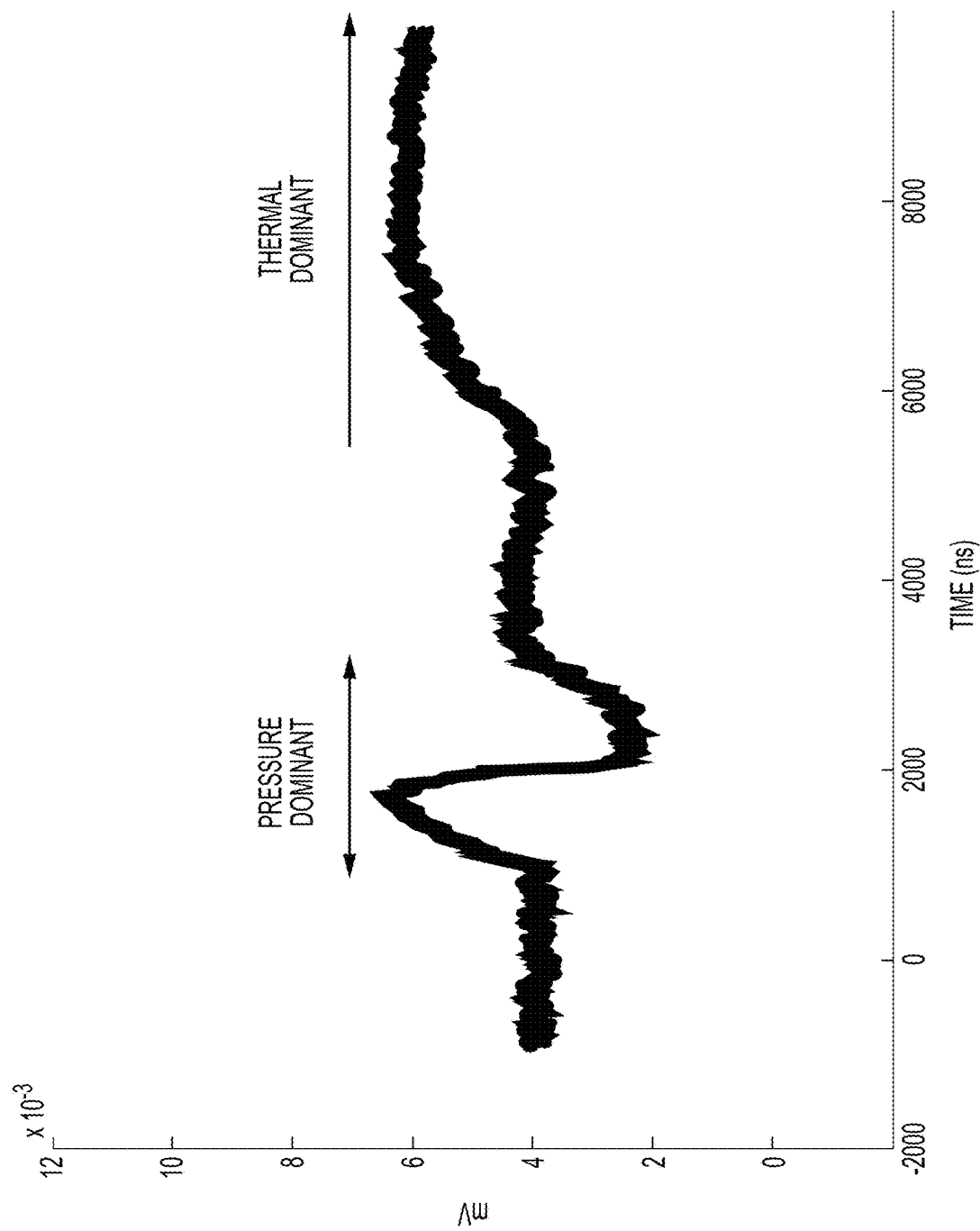
FIG. 20C shows another graph of the PARS non-radiative pressure (photoacoustic signals) and temperature (photothermal signals) induced modulations generated in the local optical properties of a sample.

For example, FIG. 19 is a PARS non-radiative pressure (photoacoustic) and temperature (photothermal) induced modulations in the local optical properties of a sample, as observed by the detection source of a PARS system. FIGS. 20A-C show PARS non-radiative pressure (photoacoustic signals) and temperature (photothermal signals) induced modulations in the local optical properties of the sample, as observed by the detection source of a PARS system. In FIGS. 19 & 20A-C, the pressure signal is captured by the initial rapid signal, while temperature is the slower transient.

This means that the pressure induced signals may be isolated from the thermal signals enabling specific assessment of the independent features.

Specifically, FIG. 20B shows an exemplary time domain which is temperature dominated, and the pressure signals cannot be discerned. FIG. 20C shows an exemplary time domain where the PARS detection spot location has been shifted relative to the excitation spot. This means the rapidly propagating acoustic signals reach the detection spot before the slower propagating thermal signals, resulting in the directly discernable signal regions.

By separating the pressure signals, pressure specific properties such as the speed of sound, acoustic impedance, and absorber size may be extracted directly from the PARS pressure modulation. For example, this may allow for the speed of sound at the detection focal spot to be measured directly. Alternatively, as the pressure response is correlated to the absorber size, this may facilitate super-resolution imaging.

Conversely, if the thermal signal is isolated, properties such as thermal propagation speed, or specific heat capacity, may be determined in isolation. Moreover, by isolating the two signals, the relationship between the two may be assessed. Properties such as the photothermal conversion efficiency, isothermal compressibility, and the elasto-optic properties, may be measured (and thereby extracted and/or collected by PARS system) based on the relative presence and proportion of pressure and temperature modulations.

In some samples, specific portions of the non-radiative signal may be targeted as a means of achieving enhanced signal-to-noise ratio (SNR). The initial pressure modulation may provide orders of magnitude more intensity of modulation in some samples, allowing for a significant enhancement of image fidelity.

In another example, the pressure modulation may be targeted in isolation of the thermal modulation to allow faster imaging. Pressure signals will propagate through samples proportional to the speed of sound in the medium, usually on the order of 1000 m/s in biological samples. Thermal signals will propagate through the sample proportional to the thermal conductivity, usually on the order of 0.001 m/s. Therefore, the pressure dissipates orders of magnitude faster than the temperature. By targeting just the pressure signals, it may be possible for imaging to be orders of magnitude faster since pressure signals propagate much faster than their thermal counterparts.

10. Filter Bank/Frequency Based Extractions

Another method to capture signal features may rely on the presence of frequency information encoded in the time domain signals. To isolate the signal intensity associated with a specific frequency or frequency band, a series of analog or digital filters may be used to isolate specific frequency bands in the time domain signals. This may be performed by splitting the original analog signal from the photo detector and recording it on two separate channels, or by digital means. The specific frequency bands then may be processed according to any of the described methods such as the signal integral/energy extraction, blind clustering, or any other processing method.

11. Fast Signal Acquisition

In some PARS architectures, the non-radiative absorption signals are detected as modulations in the backscattered detection intensity. Extracting the modulations, and their energy from the scattering signal, is an essential step in forming images. One such method to extract the PARS signals is to use an optimized analog or digital filtering approach, which uses targeted high- and low-pass filters to specifically isolate the non-radiative induced modulations. This method is specifically beneficial as the non-radiative modulations are guaranteed to occur at frequencies higher than the local scattering contrast.

Hence, in PARS, a high-pass filter can be selected to completely remove scattering signals while retaining the PARS non-radiative modulations. To remove the scattering signals, the maximum spatial frequency of the scattering can be calculated as follow:

$$F_{s\;max} \frac{\text{focal spot velocity } \left(\frac{\text{nm}}{\text{s}}\right)}{\text{detection resolution (nm)}}$$

Where, $F_{s\;max}$ is the maximum frequency of the scattering signals. In the case of the 1 MHz excitation source hybrid scanning embodiment, this level lies around 3.5 MHz.

In conjunction a low pass filter can be used to remove excess high frequency noise from the signals, while aiming to retain as much information as possible in the initial PARS signals. For example, in this system, since the photodiode bandwidth is 50 MHZ, a 50 MHz low pass is applied to remove extraneous electrical noise in the signals. By using a 3.5 MHz high pass filter and a 50 MHz low pass filter, the non-radiative signals can be directly isolated from the scattering signals. The modulation energy can then be calculated from the filtered signal using any number of approaches including maximum amplitude projection, matched filtering, etc.

PARS Optimization

As PARS (including related architectures, systems, and methods) provides a unique set of contrasts, there may be cases where it is beneficial to further optimize PARS. Some of these optimization techniques or methods for PARS architectures and systems (e.g., system operation) and/or PARS extraction methods (e.g., imaging processing methods) may include but are not limited to the following.

PARS Architecture and System Optimization

1. System Alignment

The PARS architecture and system features a number of excitation and detection spots which are aligned in an appropriate arrangement, such as a confocal arrangement in some aspects, to derive the intended pressure (photoacoustic) and temperature (photothermal) signals, similar to what is discussed with respect to FIG. 20B-C.

2. Autofocusing

Figure 21:
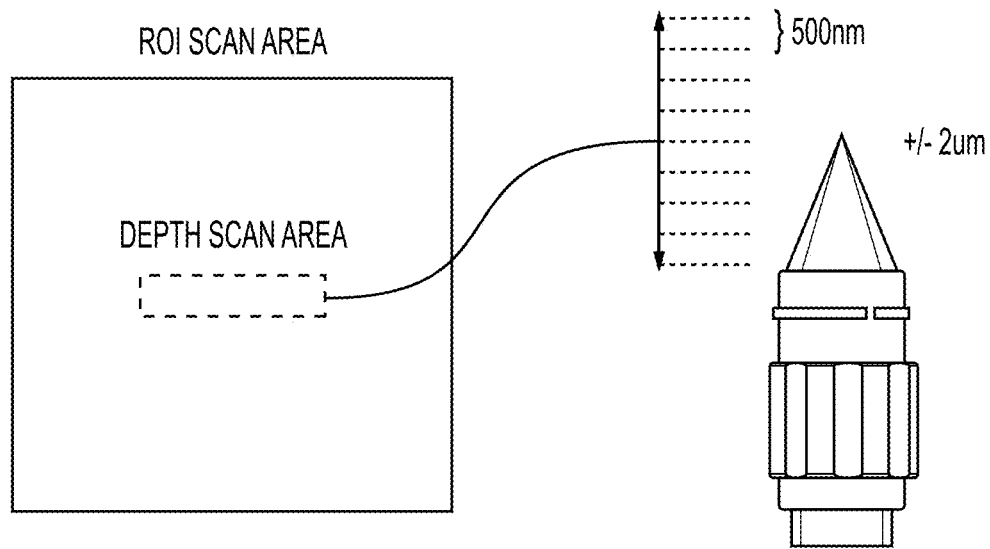
FIG. 21 is a schematic depiction of an axial depth scan over range of +/−2 μm with 500 nm steps size.

In some cases, it may be important to acquire sample images and data from an optimal plane of focus. As used herein, the term "optimal plane of focus" refers to the specific position of any detection source or excitation source of a PARS system where the system may acquire the sharpest or clearest image and/or may acquire the most precise data from a sample. An autofocus algorithm may be used to determine the optimal plane of focus for the scattering, non-radiative and/or radiative channels for any detection or excitation beam. For a given region of interest (ROI), multiple acquisitions are made across a given depth range (e.g., beam Rayleigh range) at certain spacing intervals. An example depiction of this is shown in FIG. 21. FIG. 21 illustrates an example of an axial depth scan over range of +/−2 μm with 500 nm steps size. Focus is determined using a depth scan area much smaller than the total ROI scan area.

Figure 22:
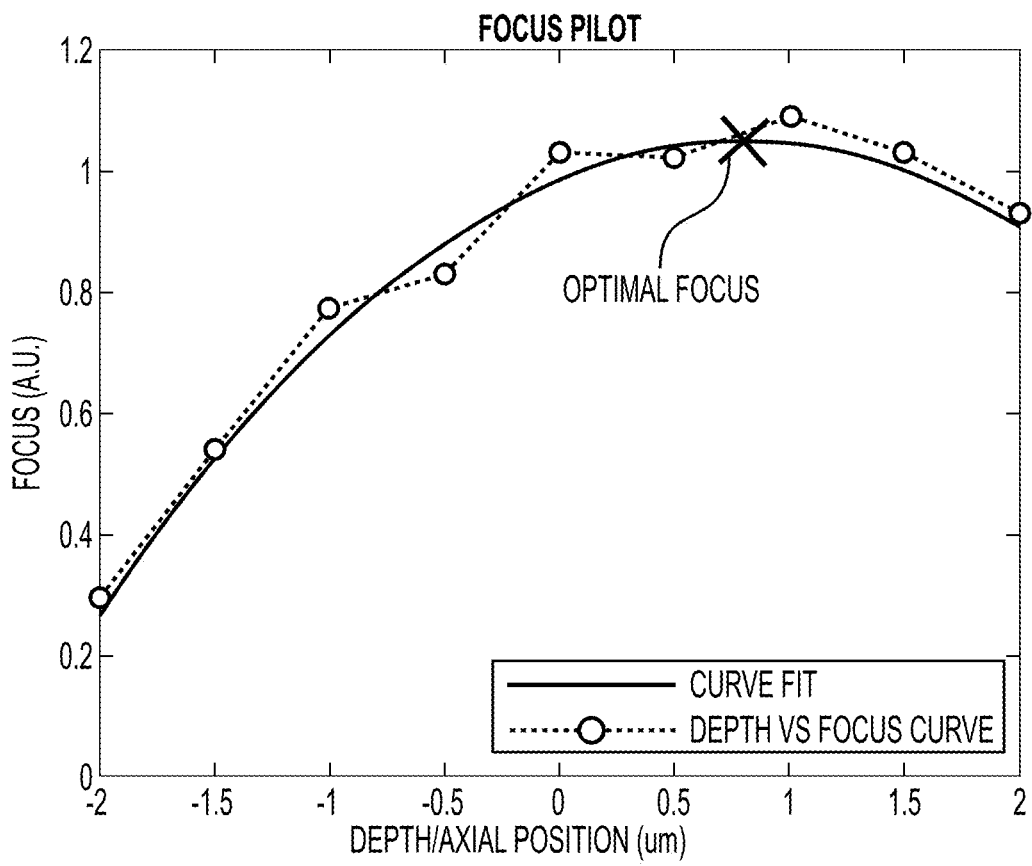
FIG. 22 shows a focus plot graph generated by an axial depth scan.

At each axial position, a scalar focus metric is then computed relating to the relative sharpness of a given layer. A suitable function (e.g., parabola or Gaussian) is then fit to the sharpness versus axial position curve. The peak of this fit function corresponds to the optimal focus plane. An example of this (based on FIG. 21) is shown in FIG. 22.

A subset of area from the entire scan ROI may be used as the depth scan region. In these cases, the optimal focus plane for the entire ROI is determined from this representative subset. This is depicted in FIG. 21.

In some PARS systems, all excitation and detection beam spots may be axially co-aligned, and thus share the same optimal focal plane. As such, the autofocus algorithm may be performed for a single wavelength or data channel. For example, the detection scattering channel alone may be used to determine the focal plane for all data channels collected using the PARS system.

The autofocus algorithm may also be used as a tool to guide axial co-alignment of all detection and excitation spots present in a PARS system. With the autofocus algorithm, the optimal focal plane for each excitation and detection beam may be determined. Using this information, each spot location may be adjusted until their optimal focus planes are matched/aligned, thus achieving optimal axial beam overlap.

3. Automated Whole-Slide Imaging

In some examples, PARS is able to image whole-slide samples (e.g., >1 cm$^2$) at high resolutions (e.g., 250 nm per pixel) by separately scanning individual sub regions (e.g., 0.5 mm$^2$), which may be later recombined and stitched together using automated whole-slide imaging. In these cases, these sub regions or tiles are arranged in a grid-like pattern to optimally cover the entire sample area. An example of these sub regions for a tissue slide is shown in FIG. 23.

In automated whole-slide imaging, a camera image or slide preview is used to determine the tissue(s) border prior to dividing the sample area into sub regions. The tissue border or region of interest may be manually traced or automatically determine with a border detection algorithm. Alternatively or in addition to a camera, a slide image or preview may also be generated from low and/or high resolution scattering from a detection laser. In other architectures, any camera based imaging (e.g., attenuation, autofluorescence, or brightfield) may be used to guide the PARS collection while also providing additional detail on the specimen.

In some cases, there may be a small amount of intentional overlap between neighboring tiles. This provides some image redundancy between tiles to aid in stitching and contrast/brightness leveling of the entire whole slide image.

Tiles may be imaged at their optimal focus plane, which may be determined using the autofocus algorithm as described above. Referring to FIG. 23, tiles may be flagged as edge pieces (blue) or as inner pieces (red). As used herein, the term "edge pieces" refers to tile that do not cover sufficient tissue area for the autofocus algorithm to accurately assess the focus. For example, if the tile is mostly containing background glass, the algorithms will likely focus to the slide instead of the tissue. Edge pieces may be scanned at the same focus as the nearest red tile to best approximate their optimal focus. Alternatively, the focus of edge pieces may be found by running the focusing algorithm after masking out pixels corresponding to the glass layer.

4. Whole-Slide Stitching and Contrast Leveling

Figure 24:
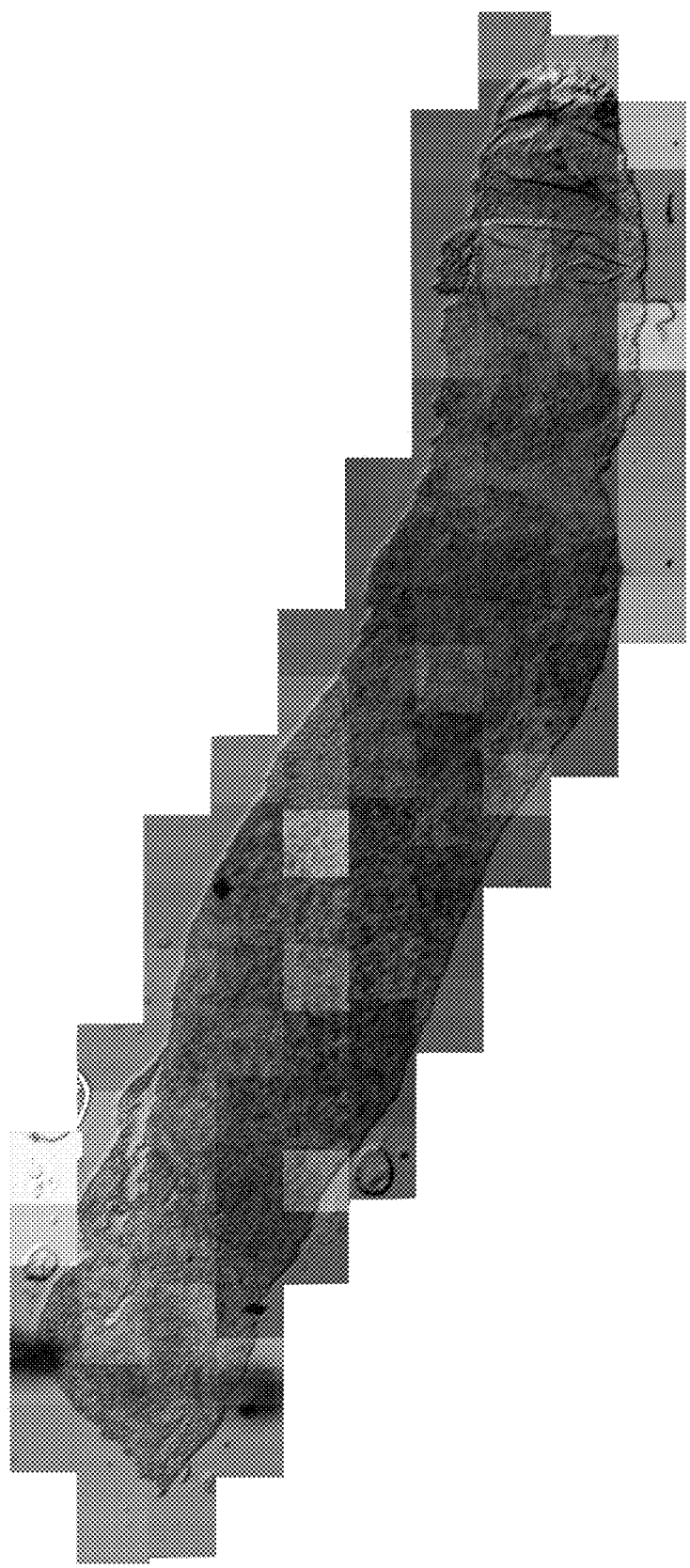
FIG. 24 is a whole-slide PARS image containing contrast and brightness variations between neighboring tiles in the scattering channel.

In a whole-slide image, subtle contrast and brightness variations may exist between neighboring tiles. In these images, these variations are present in each image channel. An example of these contrast variations is shown in FIG. 24 for the scattering channel.

Figure 25:
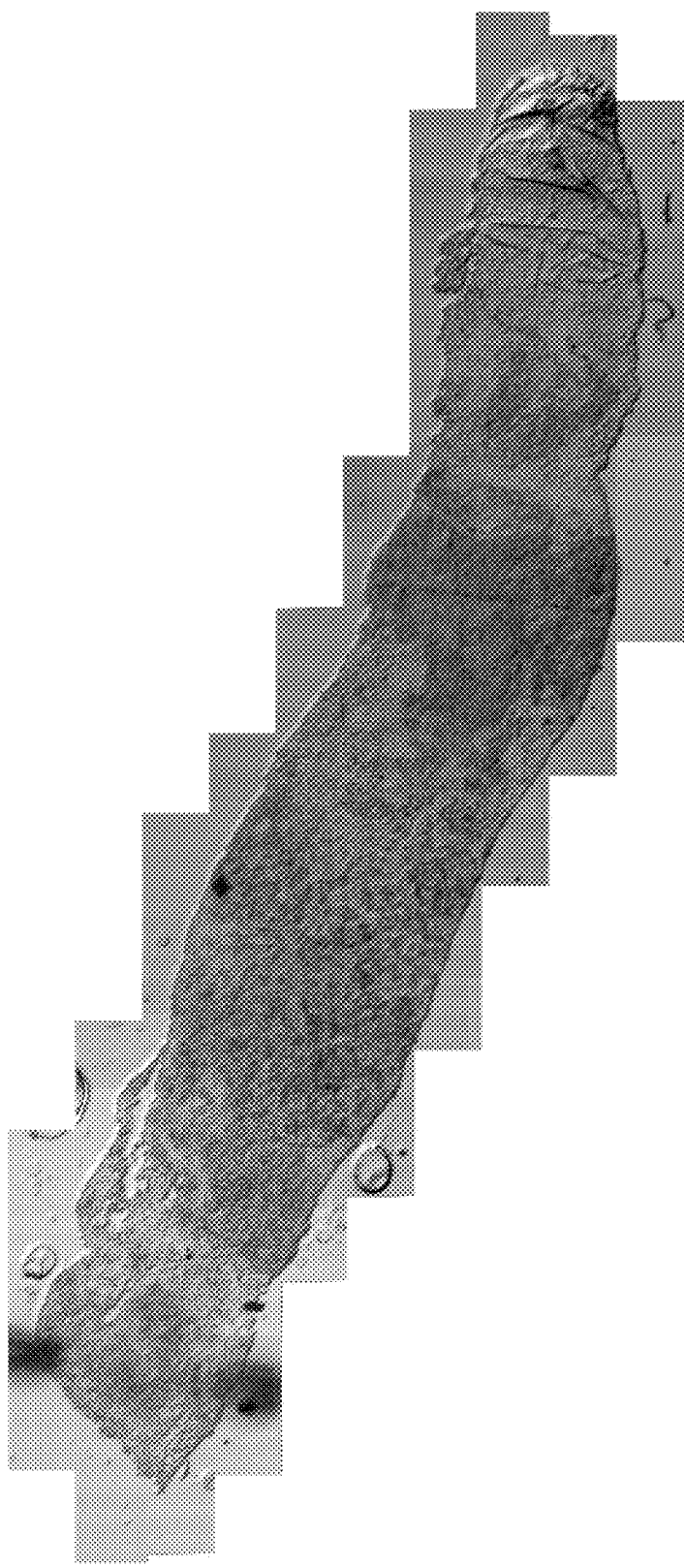
FIG. 25 is the whole-slide PARS image of FIG. 24 after whole-slide stitching and contrast leveling method is applied.

A contrast leveling algorithm may be used to address the contrast and brightness variations. The contrast leveling algorithm may be broken into two separate algorithms run in sequence. The first algorithm is a bulk leveling algorithm which shifts and scales the histogram of each tile by the difference in the mean and standard deviation between the of overlap pixels of surrounding tiles and the inner tile. The second algorithm corrects for 2-dimensional contrast gradient shifts between tiles. These shifts and scales the individual pixels of each tile based on local intensity statistics, interpolated from the difference between the overlap pixels of surrounding tiles and the inner tile. FIG. 25 shows results after running the algorithm on the image in FIG. 24.

It will be appreciated that aspects disclosed this section may be used with various types of systems and/or architectures, such as hybrid scanning, 2D optical scanning, camera, line scan, etc.

PARS Extraction Method Optimization

In addition to PARS architecture and system optimization, there may be PARS extraction method optimization methods, such as image processing methods, that are specifically beneficial to PARS as compared to images collected from conventional modalities. These methods are developed to work specifically with the unique time evolving PARS radiative and non-radiative (e.g., photoacoustic and photothermal) data. The methods described herein specifically leverage unique features of the PARS data channels to filter, enhance, or modify the data in a desirable fashion. Some of these methods may be but are not limited to the following paragraphs.

1. Local Spatial-Temporal Averaging

In some cases, the signal to noise ratio may be affected by the presence of additive or measurement noise in the system. It may be desirable to mitigate these effects by performing specific filtering or averaging. In the case of the PARS time domain signals, there is high spatial and temporal correlation in the samples. This high degree of correlation can be leveraged to de-noise time domain signals prior to intelligent clustering or signal extraction operations.

Figure 26:
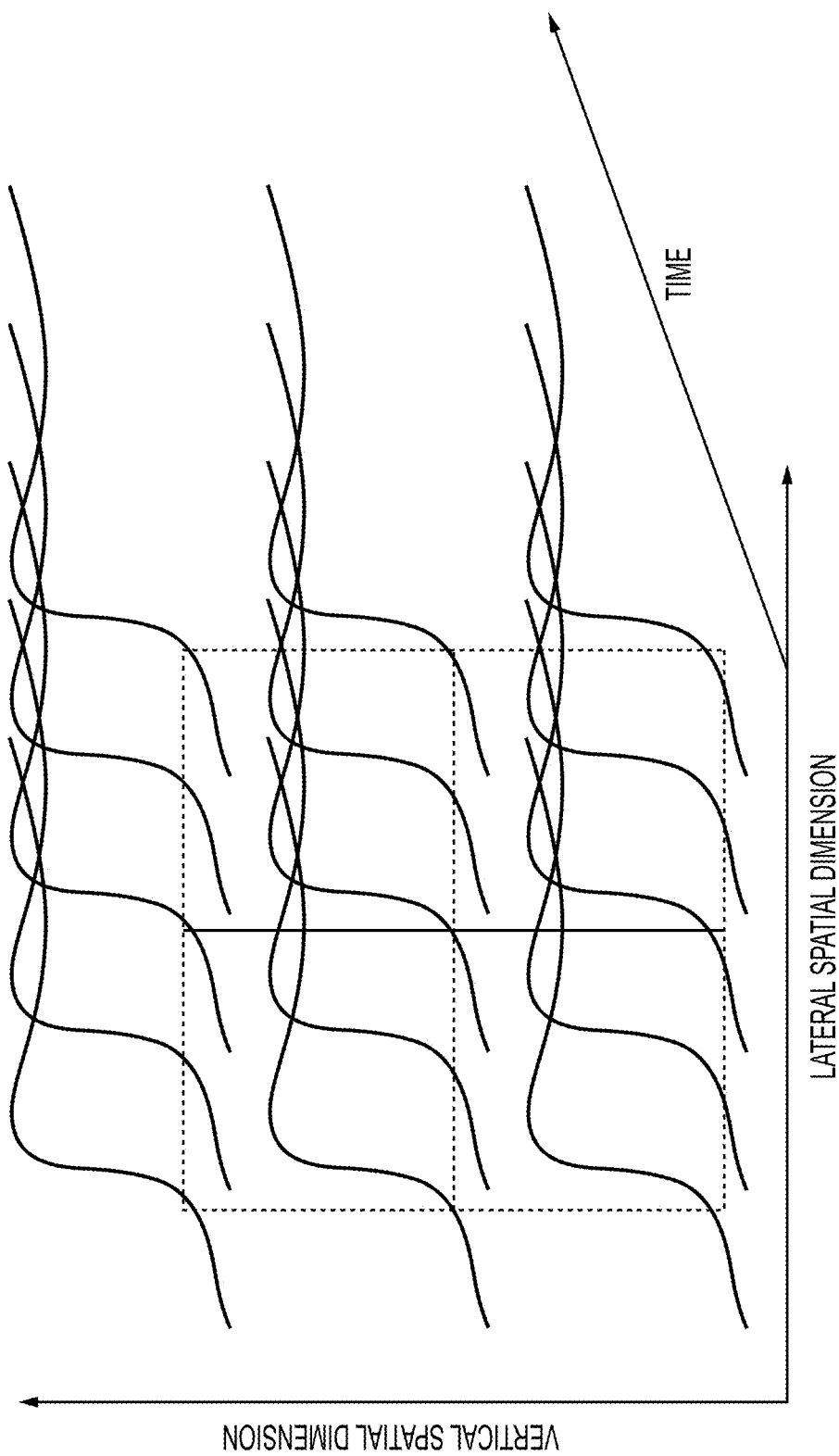
FIG. 26 shows a graph of local spatial temporal filtering implementation.

For example, a data volume is reconstructed according to two spatial axes, while a third axis contains the time domain signals. This may facilitate spatial domain processing operations prior to time domain signal extractions. Signals can be averaged locally in the spatial axes to provide smoothing while retaining information in the temporal axis. FIG. 26 is an example of local spatial temporal filtering implementation. Signals are reshaped spatial in the lateral and vertical dimension, while time comprises the third dimension. Signals can then be filtered spatially while preserving temporal signal quality.

Similar non-intelligent approaches may be performed on any or all the PARS radiative, non-radiative, and scattering channels. This method may be applied to tasks such as de-noising prior to performing a k-means clustering to explore signal shapes as previously explored. The same approach may be applied prior to extracting the absorbed energy of a signal as previously described.

2. Local Statistics Image Smoothing

Figure 27:
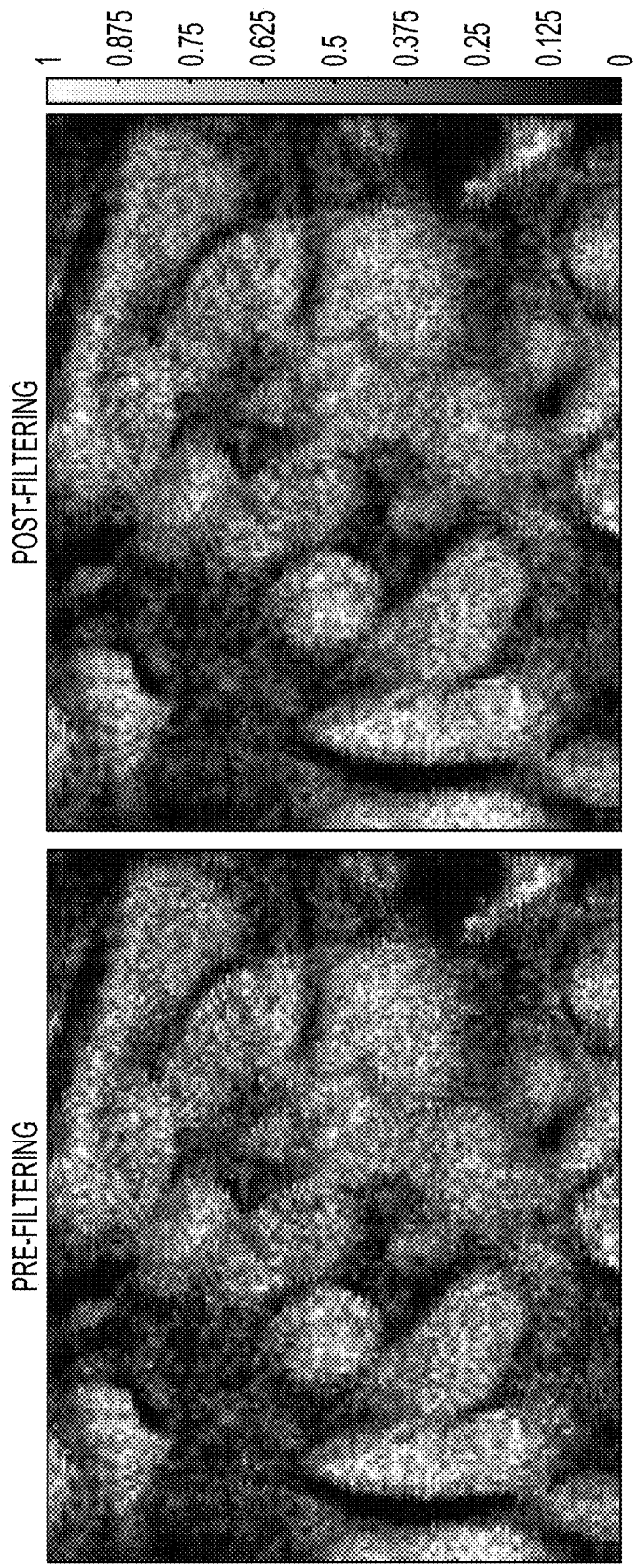
FIG. 27 shows two PARS images of a thin section of human skin tissues, before the local statistics image smoothing method was applied to the non-radiative contrast channel of the image (pre-filtering) and after the local statistics image smoothing method was applied to the non-radiative contrast channel of the image (post-filtering).

In some PARS systems, the imaging noise of the non-radiative channel may be closely tied to the measurement noise of the detection source. Additive noise becomes larger relative to the PARS non-radiative amplitude modulation, as the modulation intensity decreases. That is, the signal to noise ratio is expected to decrease as the PARS signal level decreases. Given this relationship, the PARS images may be filtered based on the assumption that lower signal levels will exhibit lower SNR. The filtering acts as an adaptive outlier removal method which aims to correct the local variance in the PARS data based on the expected variance and intensity. To perform this filtering, the mean and standard deviation of a local neighborhood is calculated. The central pixel of the neighborhood is corrected to be within a given variance of the local region. The allowed variance is scaled based on the local intensity, where lower intensities allow less variance as the noise is expected to be higher. It will be appreciated that this filtering method may remove bright or dark outliers from the image without impacting the image sharpness or inducing any blurring. An example of this PARS local statistics image filtering method applied to the non-radiative contrast channel of an image captured in a thin section of human skin tissues is shown in FIG. 27.

3. Total-Absorption Variance Correction

In some PARS systems, there may be a high degree of correlation between the radiative and non-radiative collections at each pixel location. Since, in these cases, both contrasts are generated from the same excitation event, common mode noise associated with the excitation pulse may be present in both the radiative and non-radiative datasets. Moreover, structures may have significant spatial similarity in both visualizations. However, since each contrast uses a slightly different collection pathway and mechanism this is equivalent to taking two independent measurements of the contrast and excitation noise at each pixel. This high degree of correlation, along with the measurement independence may be leveraged to de-noise the resulting radiative and non-radiative images.

Figure 28:
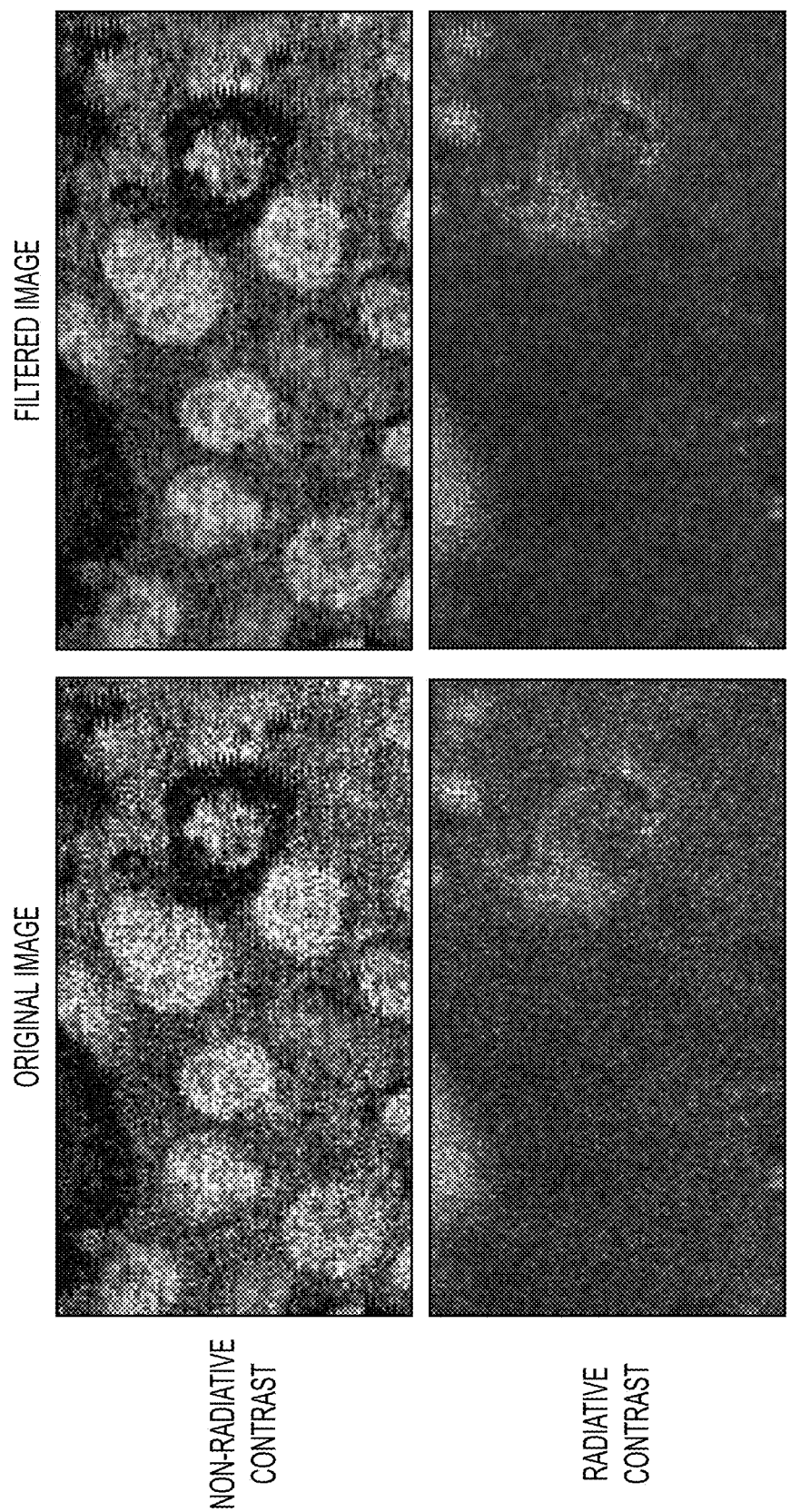
FIG. 28 shows two non-radiative contrast PARS images and two radiative contrast PARS images of a thin section of human skin tissues, before the total-absorption variance correction method was applied (non-radiative contrast—original image; radiative contrast—original image) and after the total-absorption variance correction method was applied (non-radiative contrast—filtered image; radiative contrast—filtered image).

A total absorption variance correction method may be used to isolate common mode excitation pulse energy noise from the images. Excitation noise may occur in both datasets at spatial frequencies above the system resolution. To extract the sub-resolution excitation induced variation, the images may be high pass filtered. This provides two independent measurements of the local excitation noise (radiative and non-radiative based). The measurement extracted from each dataset (radiative and non-radiative) may then be used to correct excitation induced variance in the opposing dataset. This is equivalent to performing reference correction of the pulse energies. It will be appreciated that this filtering and correction method does not result in any image blurring, as the corrections are derived from an independent source. An example of the total absorption variance correction applied to a thin section of human skin tissues is shown in FIG. 28.

EXAMPLES

The following examples set forth mechanisms, architectures, systems, and method in accordance with the present disclosure. It is to be understood, however, that these examples are provided by way of illustration, and nothing therein should be taken as a limitation upon the overall scope of the present disclosure.

Example 1

Figure 29:
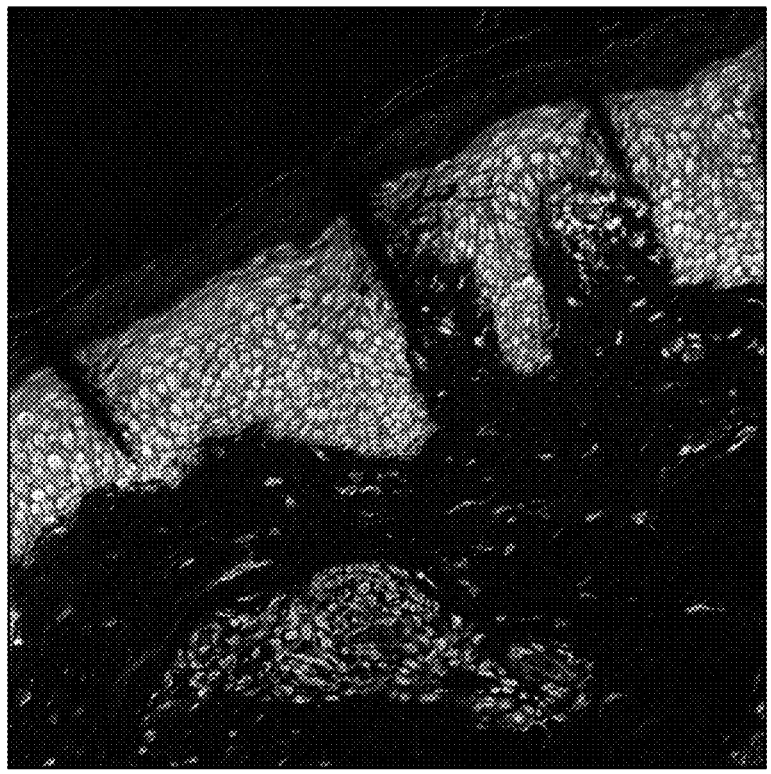
FIG. 29 shows a non-radiative contrast PARS image captured using a 266 nm excitation source.
Figure 30:
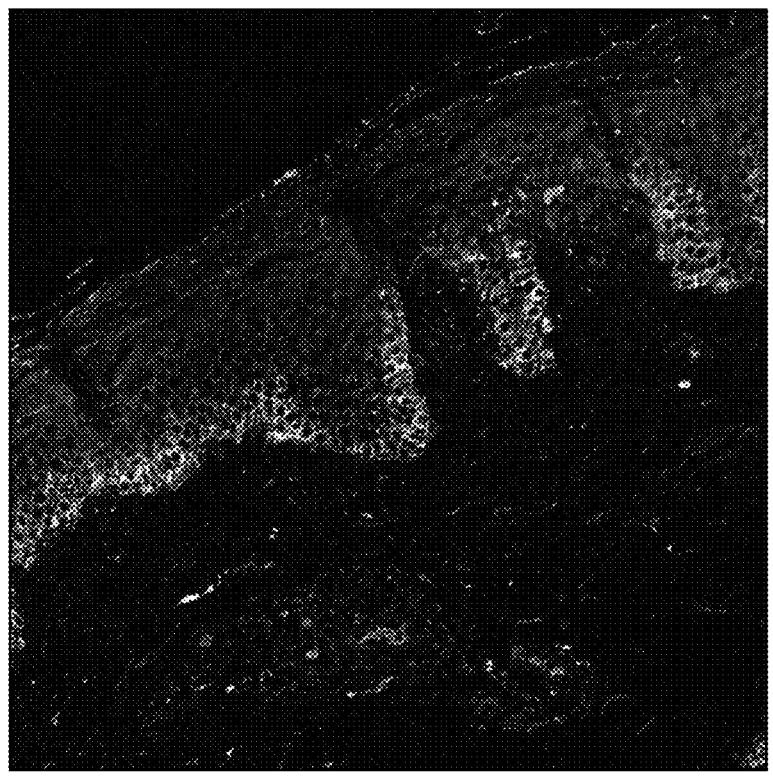
FIG. 30 shows a non-radiative contrast PARS image captured using a 532 nm excitation source.

The proposed embodiment uses two excitation sources with a shared detection source. Each excitation wavelength is selected to target unique radiative and non-radiative absorption properties of local biomolecules. In this example, the first wavelength is 266 nm, which is highly absorbed by DNA. This is shown in FIG. 29, which reveals predominately nuclear structures and connective tissues. As illustrated, this facilitates strong non-radiative contrast within nuclei. The second wavelength is 532 nm, which elicits strong non-radiative contrast from hemeproteins, revealing red blood cells structures and connective tissues, as shown in FIG. 30. In this example, the detection source is 405 nm continuous wave source. This is selected to provide high resolution and sensitivity.

Figure 31:
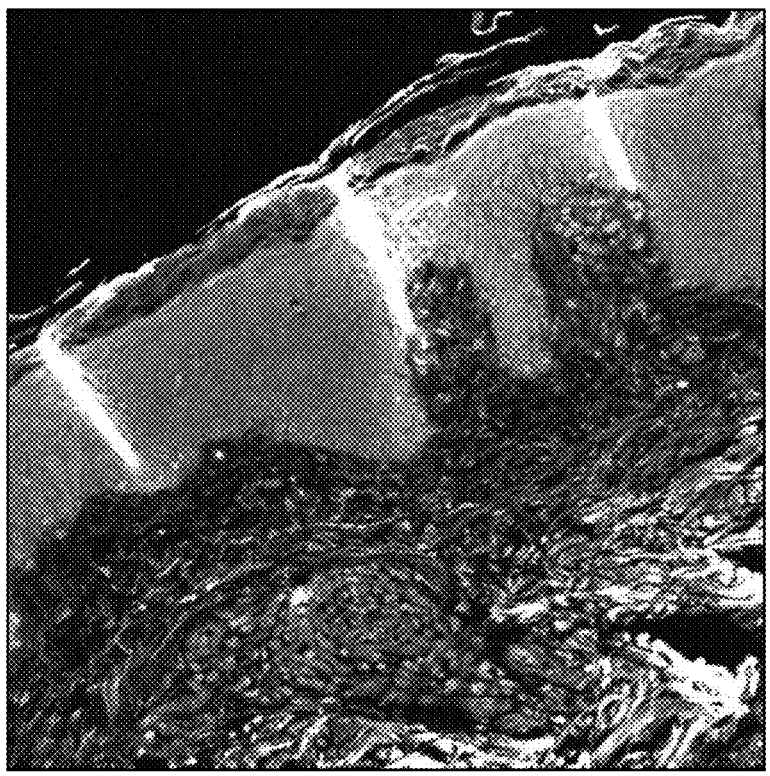
FIG. 31 shows a radiative contrast PARS image captured using a 266 nm excitation source.
Figure 32:
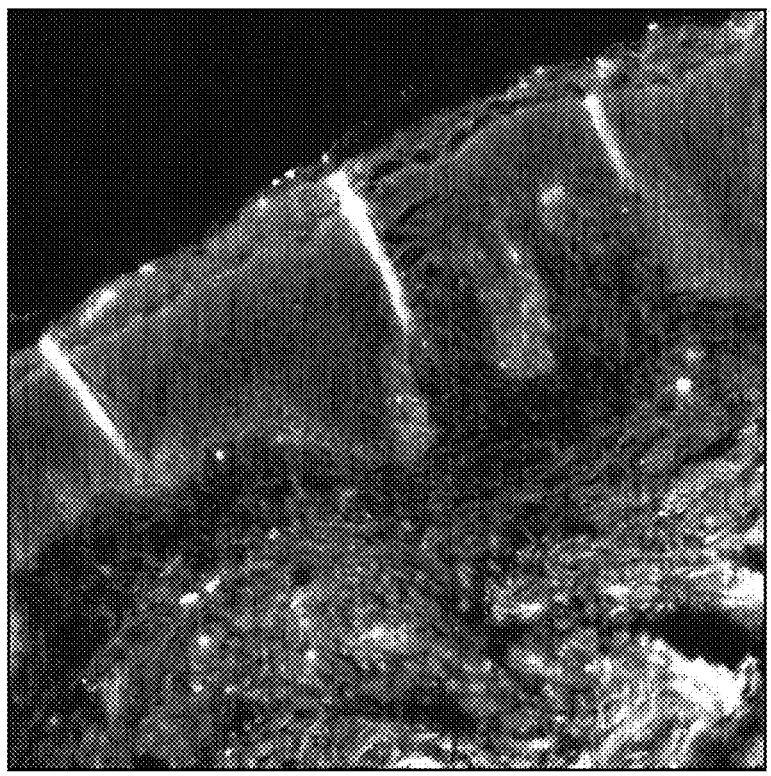
FIG. 32 shows a radiative contrast PARS image captured using a 532 nm excitation source.

The radiative relaxation and inelastic scattering of the two wavelengths broadly captures most common biomolecules such as collagen, elastin, myelin etc. There are slight variations in the response of each tissue to the respective 266 nm (FIG. 31) and 532 nm (FIG. 32) excitation. Particularly, FIGS. 31 and 32 reveal predominately connective tissues structures and dust contamination artifacts.

Figure 33:
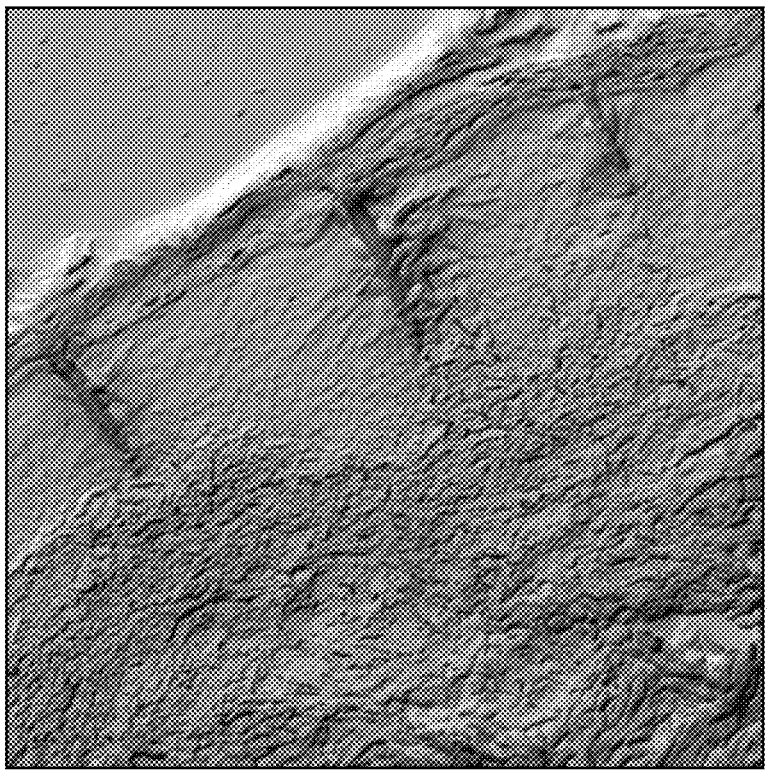
FIG. 33 shows an optical scattering contrast PARS image captured from a 405 nm detection source.
Figure 35:
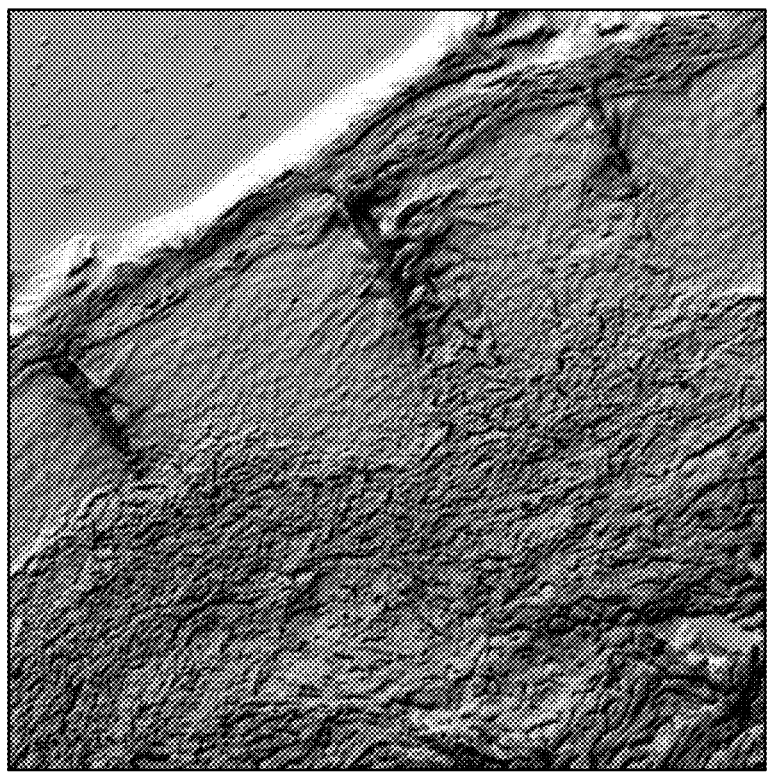
FIG. 35 shows an excitation scattering contrast PARS image captured from a 266 nm excitation source.

Finally, the PARS may also provide the optical scattering from each of the beams interacting with the sample. This includes both the excitation, and detection sources. Scattering images reveal predominately the structural morphology of the sample. An example of the optical scattering contrast attributed to the 405 nm detection source is shown in FIG. 33, which mostly captures the structural morphology of the sample. An example of excitation scattering contrast attributed to the 266 nm excitation source is shown in FIG. 35.

Figure 34:
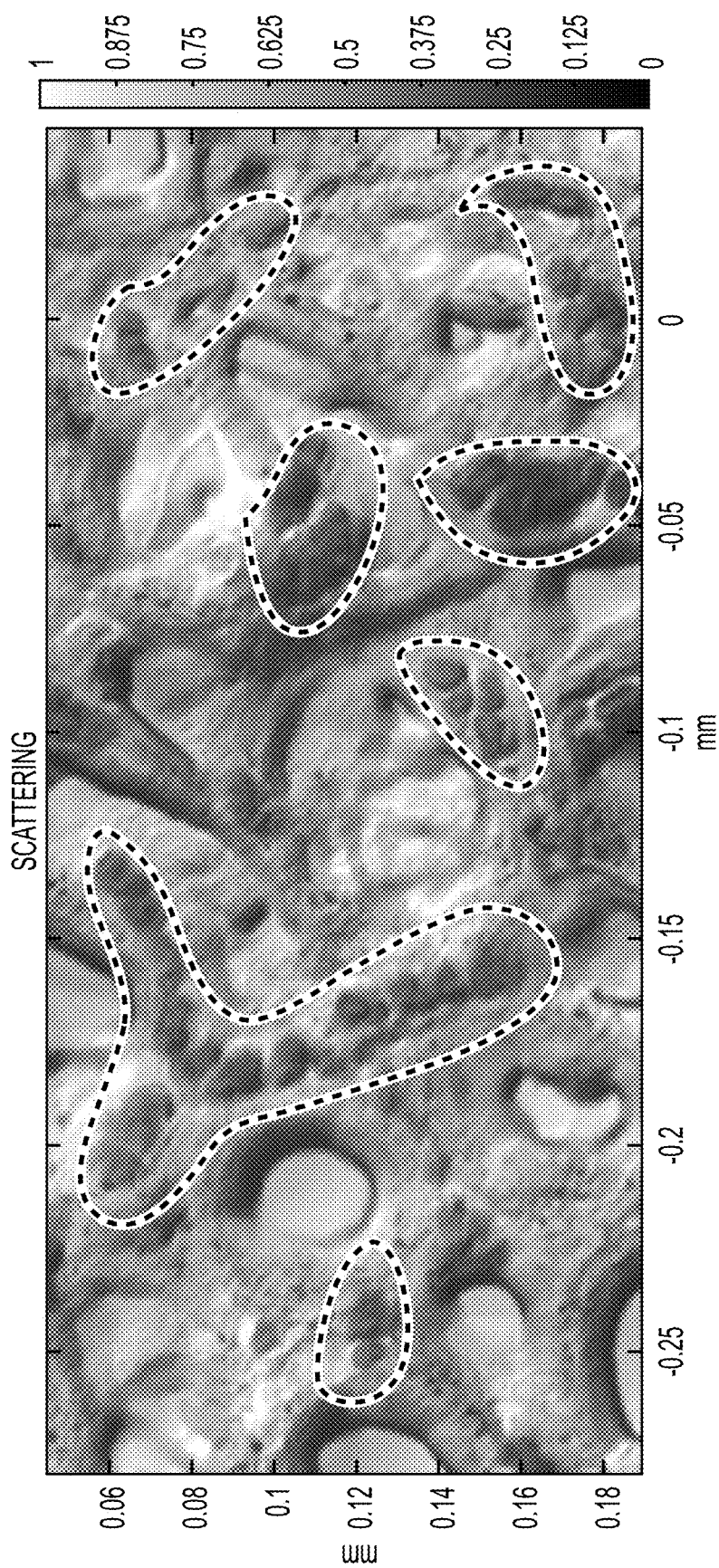
FIG. 34 shows an indirect absorption PARS image captured in the optical scattering contrast of a 405 nm detection source.

In addition to morphological information, the scattering may also carry indirect absorption detail. In some cases, the scattered intensity of the excitation and detection beams will have a small dependence on the sample's local absorption properties. As shown in FIG. 34, the red blood cells (encircled in the dashed outline) exhibit very high absorption of the 405 nm detection wavelength. Subsequently, they appear as slightly darker spots in the scattering image. Biomolecules or targets of interest may appear in optical scattering contrast images as relatively darker spots than surrounding non-absorbing media.

The invention claimed is:

1. An imaging apparatus for histological and/or molecular imaging of a tissue sample, the apparatus comprising:
    one or more light sources, wherein the one or more light sources are configured to generate:
        i) one or more excitation beams configured to be directed toward an excitation location being focused on the tissue sample, to generate signals in the tissue sample; and
        ii) one or more interrogation beams configured to be directed toward a detection location, wherein a portion of the one or more interrogation beams returning from the tissue sample is indicative of at least some of the generated signals;
    a photodetector configured to detect radiative signals from the tissue sample; and
    one or more processors configured to:
    generate an image of the tissue sample using only pressure (photoacoustic) signals from the generated signals;
    generate an image of the tissue sample using only temperature (photothermal) signals from the generated signals; and
    generate an image of the tissue sample using both photoacoustic signals and photothermal signals from the generated signals.

2. The apparatus of claim 1, wherein photoacoustic signals used to generate an image of the tissue sample are measured in the range of one picosecond to 500 milliseconds of an excitation event caused by the one or more excitation beams.

3. The apparatus of claim 2, wherein photothermal signals used to generate an image of the tissue sample are measured in the range of one microsecond to 500 milliseconds of the excitation event caused by the one or more excitation beams.

4. The apparatus of claim 1, wherein the one or more light sources includes a first excitation light source configured to emit light at a first wavelength, and a second excitation light source configured to emit light at a second wavelength different than the first wavelength.

5. The apparatus of claim 4, wherein the first and second wavelengths of light are configured to target unique radiative and non-radiative absorption properties of local biomolecules in the tissue sample.

6. The apparatus of claim 4, wherein the one or more processors are configured to generate images, based on photoacoustic and/or photothermal signals from:
   excitation using only the first wavelength; and
   excitation using only the second wavelength.

7. The apparatus of claim 4, wherein the one or more processors is configured to generate an absorption differential image based on relative differentials of 1) the photoacoustic signals and photothermal signals from excitation using only the first wavelength, and 2) the photoacoustic signals and photothermal signals from excitation using only the second wavelength.

8. The apparatus of claim 1, wherein the one or more processors is configured to generate a transmission and reflection attenuation map via optical scattering contrast image of the one or more interrogation or excitation beams.

9. The apparatus of claim 8, wherein biomolecules or targets of interest appear in the optical scattering contrast image as relatively darker spots than surrounding non-absorbing media.

10. The apparatus of claim 1, wherein the tissue sample includes one or more of freshly resected tissue specimens, preserved tissue specimens, prepared tissue specimens, extracted tissue specimens, or in vivo tissue.

11. The apparatus of claim 1, further including a temperature control device configured to regulate the temperature of the tissue sample.

12. The apparatus of claim 1, further including a slide for containing the tissue sample, wherein the slide includes a UV-transparent material configured to allow imaging through the slide.

13. The apparatus of claim 1, wherein the one or more processors is further configured to:
   calculate an intensity of the generated signals prior to excitation;
   subtract the calculated intensity prior to excitation from an intensity of the generated signals after excitation to determine a remaining modulation;
   integrate the remaining modulation is integrated; and
   use the integral to estimate a total absorption level of radiative or non-radiative signals.

14. The apparatus of claim 13, wherein the one or more processors are configured to apply de-noising or filtering prior to extracting the integral.

15. The apparatus of claim 1, wherein the one or more processors is configured to generate an image using all of the photoacoustic signals, the photothermal signals, and the radiative signals.

16. The apparatus of claim 1, wherein the one or more processors is configured to generate an image using a QER ratio of 1) the photoacoustic signals and the photothermal signals to 2) the radiative signals.

17. The apparatus of claim 16, wherein the one or more processors is configured to generate a combined QER-total absorption image using:
   i) the QER ratio to define colors of the combined QER-total absorption image; and
   ii) all of the photoacoustic signals, the photothermal signals, and the radiative signals to define an intensity of the combined QER-total absorption image.

18. The apparatus of claim 17, wherein the color provides information on a type of biomolecule in the combined QER-total absorption image, and the intensity of the combined QER-total absorption image provides information on a concentration of the biomolecule.

19. The apparatus of claim 1, wherein the one or more processors is further configured to extracted time domain characteristics to form visualizations that differentiate different biomolecules with different colors.

20. The apparatus of claim 1, further comprising a secondary imaging head, wherein the secondary imaging head is a camera-based detector configured to perform wide area, high resolution imaging at a high rate of speed.

21. The apparatus of claim 1, wherein the one or more light sources are one or more of the following:
   i) a white light source; and
   ii) an isolated wavelength;
   wherein the one or more light sources are configured to provide one or more of the following:
   i) brightfield images;
   ii) measurement of light attenuation within specimens; and
   iii) measurement of autofluorescence within specimens.

22. The apparatus of claim 1, wherein the one or more excitation beams and/or the one or more interrogation beams underfill an objective lens used for histological and/or molecular imaging of the tissue sample.

23. The apparatus of claim 1, wherein the one or more excitation beams and/or the one or more interrogation beams exactly fill or overfill an objective lens used for histological and/or molecular imaging of the tissue sample.

24. The apparatus of claim 1, the one or more processors further configured to generate an image using radiative signals detected by the photodetector, the radiative signals being autofluorescent.

25. The apparatus of claim 1, the photodetector configured to detect non-radiative signals dominated by temperature (photothermal) signals.

26. The apparatus of claim 1, the photodetector configured to detect non-radiative signals dominated by pressure (photoacoustic) signals.

* * * * *